US006831755B1

(12) United States Patent
Narushima et al.

(10) Patent No.: US 6,831,755 B1
(45) Date of Patent: Dec. 14, 2004

(54) PRINTER HAVING IMAGE CORRECTING CAPABILITY

(75) Inventors: Toshio Narushima, Kanagawa (JP); Yoshinori Tanaka, Kanagawa (JP); Hideaki Ohmuro, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/344,675

(22) Filed: Jun. 25, 1999

(30) Foreign Application Priority Data

| Jun. 26, 1998 | (JP) | 10-181254 |
| Aug. 26, 1998 | (JP) | 10-240475 |
| Sep. 14, 1998 | (JP) | 10-260465 |

(51) Int. Cl.[7] .............................. H04N 1/50; H04N 1/60; H04N 1/387; G06T 3/00
(52) U.S. Cl. ..................... 358/1.9; 358/504; 358/527; 358/530; 358/518; 382/286; 382/293
(58) Field of Search ................. 358/1.9, 3.26, 358/504, 518, 519, 520, 523, 527, 406, 3.24, 530, 537, 452, 528, 450, 451; 382/167, 289, 296, 286, 288, 293, 298

(56) References Cited

U.S. PATENT DOCUMENTS

| 4,656,524 A | | 4/1987 | Norris et al. | |
| 4,786,820 A | | 11/1988 | Ogino et al. | |
| 5,081,529 A | * | 1/1992 | Collette | 358/504 |
| 5,093,653 A | | 3/1992 | Ikehira | |
| 5,296,947 A | * | 3/1994 | Bowers | 358/527 |
| 5,345,315 A | * | 9/1994 | Shalit | 358/504 |
| 5,408,342 A | * | 4/1995 | Kumada et al. | 358/518 |
| 5,461,679 A | | 10/1995 | Normile et al. | |
| 5,563,725 A | | 10/1996 | Kumada et al. | |
| 5,585,841 A | * | 12/1996 | Hardin | 358/527 |
| 5,692,210 A | | 11/1997 | Mita et al. | |
| 5,828,461 A | | 10/1998 | Kubo et al. | |
| 5,877,746 A | * | 3/1999 | Parks et al. | 345/156 |
| 6,563,596 B1 | * | 5/2003 | Narushima | 358/1.9 |
| 6,608,927 B2 | * | 8/2003 | Ohta | 358/518 |

FOREIGN PATENT DOCUMENTS

| EP | 0 009 378 | 4/1980 |
| EP | 0 285 192 | 10/1988 |
| EP | 0 456 414 | 11/1991 |
| EP | 0 556 133 | 8/1993 |

OTHER PUBLICATIONS

Anthony D. Parkhurst, et al., Connectivity of the HP Deskjet 1200C Printer, Feb. 1994, Hewlett–Packard Journal (pp 85–97).
James C. Smith et al., Development of a Color Graphics Printer, Aug. 1988, Hewlett–Packard Journal (pp. 16–21).
Kevin M. Bockman et al., HP Deskjet 1200C Printer Architecture, Feb. 1994, Hewlett–Packard Journal (pp 55–66).

* cited by examiner

*Primary Examiner*—Scott Rogers
(74) *Attorney, Agent, or Firm*—Frommer Lawrence & Haugh LLP; William S. Frommer

(57) ABSTRACT

A printer in which difference in color tone or contrast between a picture displayed on a display and a picture printed by the printer device is suppressed to a minimum. The display is preferably integrated with the printer. The printer includes an image data inputting unit for receiving input image information, e.g., by reading image data from a digital storage medium or from film, and providing digital image data based thereupon. Display outputting circuitry outputs an image signal corresponding to the digital image data to the display. A picture printing unit prints an image corresponding to the digital image data on a recording medium. A characteristics correction unit corrects a display setting prescribing display image properties of the display and a printing characteristics setting prescribing printing picture properties of the printing unit, so that color tone and/or contrast of the displayed and printed pictures are equalized. The printer also preferably includes circuitry for automatically correcting a tilt of a picture, e.g., tilt of an object in a photograph.

46 Claims, 43 Drawing Sheets

| | CONTENTS PRE-SET PICTURE | SPECIFIED REGION (= REGION X) | PRESCRIBED REGION (= REGION Y) |
|---|---|---|---|
| (a) | FACE OF A (SOLE) PERSON (TO FRONT SIDE) | REGION X<br>INPUT PICTURE | MID POINT / GOLDEN RATIO<br>REGION Y  POINT Y<br>AS-CHANGED PICTURE |
| (b) | FACE OF A (SOLE) PERSON (TO LEFT SIDE) | REGION X<br>INPUT PICTURE | GOLDEN RATIO / GOLDEN RATIO<br>REGION Y  POINT Y<br>AS-CHANGED PICTURE |
| (c) | FACE OF A (SOLE) PERSON (TO RIGHT SIDE) | REGION X<br>INPUT PICTURE | GOLDEN RATIO / GOLDEN RATIO<br>POINT Y  REGION Y<br>AS-CHANGED PICTURE |

FIG.31

| | CONTENTS PRE-SET PICTURE | SPECIFIED REGION ( = REGION X ) | PRESCRIBED REGION ( = REGION Y ) |
|---|---|---|---|
| (g) | OBJECT HAVING VERTICAL COMPONENT | REGION X<br>INPUT PICTURE | GOLDEN RATIO — LINE Y, REGION Y<br>AS-CHANGED PICTURE |
| (h) | OBJECT HAVING TRAPEZOIDAL COMPONENT | REGION X<br>INPUT PICTURE | REGION Y<br>AS-CHANGED PICTURE |

FIG.33

PRINTER HAVING IMAGE CORRECTING CAPABILITY

BACKGROUND OF THE INVENTION

1. Field of the Invention

The present invention relates generally to printers, and more particularly, to a printer with image correcting capability in which difference in color tone or contrast between an image displayed on a display and an image printed by the printer is suppressed. This invention also relates to a printer that automatically corrects the tilt of a picture with respect to its frame.

2. Description of the Related Art

A number of methods have hitherto been commonly used to print pictures from natural picture data derived from photographs, digital cameras, etc. A first such method entails connecting an input device for inputting picture data to a universal computer connected to a printer. Picture data read into the computer from the input device is processed in a predetermined fashion on the computer to generate picture-printing data which is sent to the printer for printing. The input devices may be enumerated by, for example, a removable medium drive, such as a recording/reproducing apparatus for removable media; a NTSC (National Television System Committee) picture signal input substrate; a silver halide photo film scanner; or, a digital still picture camera.

A second known printing method involves directly interconnecting an input device, such as a scanner or digital still camera, to a printer without interposition of a computer. The printer is configured to receive picture data directly from the input device and to derive a picture therefrom for printing.

First Printing Method

Referring to FIG. 1, a block diagram of a system for implementing the above-noted first printing method is shown. The system is comprised mainly of a personal computer 1001, a printer 1002 and an input device 1003. Examples of input devices 1003 are as follows: a removable media drive (e.g., a disc drive for an optical disc as a CD-ROM or a rewritable magneto-optical disc as an MD-DATA disc); camcorders and the like for providing picture signals (including NTSC, PAL, RGB and S-terminal signal formats); digital still-picture cameras; scanners for silver halide photo films (35 mm film or so-called APS film having picture-related magnetic information); and original read-out scanners.

Printer 1002 employs a printer head 1004 effecting actual printing and a head driving circuit 1005 for driving the printer head 1004. Computer 1001 is mainly comprised of an interface 1006 for entering picture data from the input device 1003, a data processing unit 1007 for processing the picture data as picture-printing data, and a bi-directional printer interface 1008 for outputting the picture printing data to printer 1002. Data processing unit 1007 includes a device driver, adapted to these input devices and which is configured for controlling printer 1002, and application software designed for inputting and processing the picture data and to control the printer output. This software is configured to execute data processing via the data processing unit 1007. Computer 1001 further includes a display 1009, a command device 1010 such as a mouse or keyboard, and a picture memory 1011 (e.g., hard disc) for storage of picture data entered from the input device 1003. The input device 1003 is connected to computer interface 1006, and the computer's bi-directional printer interface 1008 is connected to printer 1002 to complete the connection.

During a printing operation, the following operations are executed. The application software for computer 1001, as well as a device driver associated with input device 1003, are activated to drive input device 1003 via interface 1006. This enables picture data to be read from input device 1003 and entered to computer 1001 via interface 1006. Based on a user command entered through command device 1010, the application software executes picture editing processing on the picture data in computer 1001. The editing may be accompanied by picture data processing performed by data processing unit 1007.

If the picture editing processing desired by the user is executed, and the picture to be printed is decided upon, the picture printing operation is commenced. Specifically, the application software controls the printer driver (which is typically implemented in software) to convert the processed picture data into printing data that can be output to printer 1002. At this time, computer 1001 determines the status of printer 1002 via bi-directional printer interface 1008.

The thus generated printing data functions as a printer control command, and is sent out via bi-directional printer interface 1008 to printer 1002. Printer 1002 then drives the print head 1004 by means of head driving circuit 1005, based on the received printing data (printer control command) to form a printed picture on a recording medium.

FIG. 2 is a block diagram illustrating a processing method as an example of data processing in the above-described operation. Slanted line segments attached to data flow lines in FIG. 2 (and in other figures herein) indicate that the data is 8 bit color data. RGB (red, green, blue) picture data input to a picture data inputting unit 1012 of computer 1001, is routed to a picture data processing unit 1013 for processing, if necessary. The picture data is stored as a picture file 1011a in picture memory 1011 if need be. The RGB picture data is sent from the picture data processing unit 1013 to a printer driver 1014 adapted to control the printer device 1002.

Printer driver 1014, which is typically implemented in software, consists mainly of an RGB-CMY (cyan, magenta, yellow) converter 1015 for converting RGB picture data into CMY printing picture data; a color correction unit 1016 for occasionally correcting the color; a black extraction unit 1017 for extracting black hue in addition to CMY; an output gamma correction/gradation correction unit 1018 for correcting characteristics of the printer device; and a sharpness correction unit 1019 for edge processing, etc. The RGB picture data from picture data processing unit 1013 is first converted into CMY printing data by conversion unit 1015 and subjected to color correction. The color-corrected data is converted into printing data which may contain black hue. In FIG. 2, the black picture-printing data is indicated as K. The printing data is corrected for characteristics peculiar to the printer 1002, and is sent out to printer 1002 after edge processing in sharpness correction unit 1019 to sharpen the edges of objects in the pictures. If printer 1002 is embodied as a bi-level printer (e.g., ink-jet) which reproduces a picture based on the presence or absence of the picture-printing dot, a convert-to-bi-level unit needs to be employed in conjunction with sharpness correction unit 1019. The convert-to-bi-level unit is unnecessary if printer 1002 is realized by a sublimation type printer that represents gradation within picture-printing dots.

Printer 1002 includes an output characteristics conversion unit 1020, the aforementioned head driving circuit 1005 and a printer head 1004. Characteristics conversion unit 1020 corrects output characteristics in accordance with the state of the printer and also suppresses fluctuations attributable to the printer. The CMY printing data sent from printer driver 1014 to printer device 1002 is sequentially forwarded via the output characteristics conversion unit 1020 to head driving circuit 1005 and to printer head 1004 for printing.

Second Printing Method

The above-noted second printing method will now be explained in detail. Referring to FIG. 3, a system for implementing this method includes a printer 1022 and a digital still picture camera 1021 operating as an input device to the printer. Camera 1021 is comprised of: a picture imaging unit 1023 for imaging an object; a command device 1024, such as a shutter, for inputting an external command; a picture memory 1025 for transient storage of an imaged picture; a picture data processing unit 1026 for effecting required data processing; and, a display 1027 for displaying an imaged picture. Printer 1022 consists mainly of an out put characteristics conversion unit 1028 for correcting output characteristics in accordance with the status of the printer, a head driving circuit 1029 for driving a printer head 1030, and a printer head 1030 for effecting actual printing.

The picture data can be transferred from digital still camera 1021 to printer 1022 via a hardwire connection therebetween, or alternatively by a radio path using IR-DA or the like. The data transferred may be in the form of digital data signals or analog picture signals. To print hard copies of the picture data, the following operations are carried out. In digital still picture camera 1021, picture signals of an object generated by a picture pickup unit 1023 are provided to picture data processing unit 1026 in a state of image preparation, that is, before the user activates a shutter to start the imaging. For these picture signals, picture data processing unit 1026 performs correction processing to correct for characteristics of picture pickup unit 1023 or imaging conditions. The picture, thus corrected, is displayed on a display 1027 to permit the user to check the imaging range of the object and the background etc. If an optical finder is provided in place of or in addition to display 1027, the user can make the above check using this optical finder.

The imaging operation is initiated by the user actuating a command device 1024, such as a shutter. This causes picture data captured by picture pickup unit 1023 and corrected by picture data processing unit 1026 to be saved in picture memory 1025. Data compression may be performed on the picture data by picture data processing unit 1026 to reduce the amount of data to be stored. If the picture saved in picture memory 1025 is to be printed, the user actuates the designated command device 1024 for printing, such as a key, to start the printing operation. Picture data processing unit 1026 then reads out pre-set, compressed picture data from picture memory 1025 and occasionally expands the picture data to prepare it for outputting to printer 1022. Depending on the interfacing system for camera 1021 and printer 1022, the data is transferred as digital or analog picture signals by a radio path or over a wire. Printer 1022 converts the picture signals in the output characteristics conversion unit 1028 depending on the printing output conditions prevailing at the time of printing, and printing is effected on a recording medium by a printer head 1030 driven by a head driving circuit 1029.

The user can perform picture editing, working (e.g., adjusting brightness, contrast, etc. of an image) and synthesis processing (e.g., adding subtitles, etc.). To do this, the user inputs commands to digital still camera 1021 via the command device 1024, while checking the picture(s) displayed on display device 1027. The editing/working/synthesis processing is carried out by picture data processing unit 1026.

FIG. 4 illustrates the data processing of the second printing method. The RGB picture data obtained in picture imaging unit 1023 of camera 1021 is processed by picture data processing unit 1026 and held in picture memory 1025. The processed RGB picture data is sent from picture data processing unit 1026 via picture data outputting unit 1031 to printer 1022. Printer 1022 has, in addition to the aforementioned output characteristics conversion unit 1028, head driving circuit 1029 and printer head 1030, an application similar to the printer driver 1014 shown in FIG. 2. That is, printer 1022 includes a picture data inputting unit 1032 to which picture data is entered from camera 1021; an RGB-CMY converting unit 1033 for converting RGB picture data from input unit 1032 into CMY picture data; a color correction unit 1034 for occasionally correcting the color; a black extraction removal unit 1035 for extracting black hue (designated as "K") in addition to CMY; an output gamma and gradation correction unit 1036 for correcting picture data in accordance with characteristics of the printer; and a sharpness correction unit 1037 for edge processing.

The RGB picture data entering input unit 1032 is first converted into CMY data and corrected for color. The picture data is then converted into printing data containing black; edge-processed, and corrected for printer characteristics of the printer. In this state, the picture data is routed to the output characteristics conversion unit 1028. If the printer is a bi-level printer, a convert-to-bi-level unit needs to be used in conjunction with sharpness correction unit 1037. If a sublimation type printer is used, the convert-to-bi-level unit is unnecessary. In any case, the CMYK picture printing data is sequentially sent via output characteristics conversion unit 1028 to head driving circuit 1029 and to printer head 1030 to effect printing.

The above-described first and second printing methods suffer from a number of drawbacks. In the first method, it is necessary to connect separate peripheral devices to a computer. The computer also needs to be equipped with disc drivers tailored to the peripheral equipment; these drivers are assembled into the computer by a laborious operation. Moreover, application software for performing processing operations such as picture inputting, picture editing, etc. needs to be installed in the computer. In a laborious operation, the application software and device drivers need to be set so that the peripheral devices will be controlled by the application software. Further, separate application software for controlling the respective peripheral devices is required. Hence, the user has to run plural application software programs and to transfer picture data therebetween, involving still more labor. Further, if a desk-top or tower type computer is used, a wide installment space is required for connecting the computer to the peripheral devices, another inconvenience.

Another limitation of the first printing method, as well as with the second printing method, is the resulting difference in the picture quality of the pictures printed by the printer and those displayed on the input device display and/or computer monitor. The main difference in picture quality is the difference in color tone and contrast between the printed and displayed pictures. In order to diminish this effect, a technique has been used in which the color tone of the displayed picture and that of a printed picture are measured with a colorimeter and these measured values are calorimetrically equated to each other. However, these measures are not fully satisfactory in that differences in color tone and contrast persist.

With the first printing method, multiple processing operations are executed by the application software on picture data. That is, the computer processor (CPU) sequentially reads out picture data from the picture memory, sequentially executes the target operation on the read-out data and re-writes the processed picture data in the picture memory. These operations are repeatedly performed. Hence, at any given time, the CPU is executing only one operation, which is not conducive to high speed processing. This problem is lessened by using a CPU which aims to increase processing speed by exploiting a pipeline structure. The parallel operation in this pipeline structure is simply the function of overlapping the consecutive process steps of the application software program just slightly by an amount corresponding to the number of pipeline steps, such that essentially the pixel data of the picture data are processed sequentially. The result is that, when executing the target processing, the larger the picture data size, the longer the time needed to complete the processing. As such, the more complex the processing contents are, the longer the time required for processing. If such processing is executed by the user with a universal computer, extra time is needed since the operator controls the start of various operations; until a particular operation is complete, the operator is kept waiting in the interim.

Depending on the processing contents, there are occasions wherein the user sequentially changes the processing parameters and checks the results to set optimum parameters. Since additional time is consumed until the processing for a sole parameter value comes to a close, it becomes difficult for an operator to compare the processing results for the respective parameters. This renders it difficult to set an optimum parameter value. This is a problem for both the first and second printing methods.

Moreover, with the first printing method it is possible to add application software for picture processing or to add certain functions to the existing application software. However, with either of these additions, since the application software for picture processing involves data communication with the above-mentioned peripheral devices, the application software or the device driver has to be re-set. Also, a device driver has to be assembled into the computer. In particular, if the application software for picture processing is universal, a variety of setting operations have to be implemented in advance. The operation methodology for this is complex, and therefore the desired processing cannot be easily performed.

In addition, in the above-mentioned software, the processing desired by an operator for a particular picture, such as editing, picture changing, synthesis, correction or printing, is executed on the basis of a specified command from the user. As such, instructions need to be issued sequentially for the picture being processed. To this end, the user has to specify the values of variable parameters for the respective processing operations. Hence, the user needs to comprehend the meaning of the variable parameters in the respective operations, as well as the degree of variation of the picture quality as a function of these parameters. The user also has to be well apprised of the method of using the application software.

In the application software, which has universal input/output functions in order to operate with common picture input devices and a majority of printer types, and which has the universal function for handling pictures at large without specifying the picture data to be handled, the method of using the application software, contents of the functions or the operating methods are difficult to comprehend, rendering it difficult for laypersons to use.

Further, the application software simply deals with the structure of the picture contents of the picture under the instructions of the user. If the user holds an image pickup device in one hand during imaging a picture such that a main portion of the resulting picture is offset or tilted to one side, the user has to correct the tilt for each picture in question. For example, if an ordinary user picks up an image of a straight road extending to the horizon or a horizontal line, as he or she holds a 35 mm silver halide film camera, there are occasions wherein the object is imaged with the camera at a tilted position due to personal habits of the user. The result is that the main portion of a picture on an imaged film is inclined with respect to the picture frame. As a result, if the object is displayed on a monitor or printed on a printer, an undesirable tilted image is produced. Although it may be possible for application software to be added to correct the tilted image, the aforementioned difficulties are present if application software is used. Therefore, with the common user not well trained in the method of operating the application software, only a tilted displayed image or a tilted print can be obtained.

As another example, if a non-expert is taking a photograph of a person using a 35 mm silver halide film camera, the usual tendency is for the face of the photographed person to be placed at the center of the finder. Thus, if the imaged picture is directly printed, the face of the person is placed at the center of the print, and the upper part of the print becomes unnecessary surrounding space. This means that it is difficult to realize a printed picture with well-balanced composition.

In the above-described second printing method, the possible processing operations such as picture inputting, editing, picture-changing/selecting, synthesis, correction or printing depend on the function of the input device, but the processing abilities of the input device are typically limited. The input device also needs to be provided with a function that allows it to be directly coupled to a printer. Moreover, the possible processing differs from one input device to another, such that the operating sequence is modified from device to device, making it non-user friendly. Also, current technology still does not permit a silver halide photo film scanner to be used as an input device with the second printing method. Further, the input device and the printer are interconnected in a one-to-one correspondence with current technology, whereby it is impossible to process and print picture data from plural input devices.

In the second printing method, since the possible processing operations such as picture inputting, editing, working, synthesis, correction or printing depend on the function of the input device, there are occasions wherein the user cannot perform the desired processing. It is also difficult to add new processing functions or to add a new function to a set of existing processing functions. Additionally, similar to the above-described first printing method, the operation of the processor (CPU) in the input device sequentially reading out picture data in the picture memory, sequentially performing the target processing on the read-out picture data and re-writing the processed picture data in the picture memory, has to be performed repeatedly, thus lengthening the time to complete the processing.

Also, with this method, it is difficult to perform the processing for arranging the picture contents in a satisfactory condition. Even if this is possible, it is up to the user to make the corrections sequentially for each picture in question.

Moreover, as in the first printing method, the input device generally does not have a picture tilt-correction function. Thus, in either of the above-described methods, it is difficult for the user to correct the offset or the tilt of the picture contents in each picture, rendering it difficult to realize a printed picture with a satisfactory orientation of the main portion of the picture.

SUMMARY OF THE INVENTION

It is therefore an object of the present invention to provide a printer device which permits various operations to be carried out easily, which can be handled easily, which can minimize the difference in contrast or color tone of a picture displayed on a display device from that of a picture printed by the printer device, which permits printing of a picture having an equivalent visual picture quality and in which the processing operations such as editing, working, synthesis or correction can be completed in a shorter time and addition of processing contents partially or wholly is facilitated.

It is another object of the present invention to provide a printer device which permits various operations to be carried out easily, which can be handled easily and which enables a printed picture of a sufficient composition of the main portion of the picture to be obtained easily.

It is general object of the present invention to provide an improved printing device.

In one aspect of the present invention, there is provided a printer that includes: a picture data inputting unit for receiving input image information and providing digital image data based thereupon; display outputting circuitry for outputting at least one image signal corresponding to the digital image data to a display means; a printing unit for printing an image corresponding to the digital image data on a recording medium; and a characteristics correction unit for correcting at least one of a display setting prescribing display image quality in the display means and a printing characteristics setting prescribing printing image quality in the printing unit.

The characteristics correction unit is preferably configured to correct the display setting in accordance with the printing characteristics setting, and vice versa. As a result, the displayed image and the printed image can be equalized in terms of color, contrast, etc.

Preferably, the display means comprises a display that is physically integrated on a main body of the printer. Further, the picture data inputting unit may include, among other things, a film input device by which an image stored on a roll of film is read and converted to the digital image data.

In another aspect of the invention, circuitry for implementing parallel processing of image data is provided to speed up the image data processing operation. To this end, there is provided a printer including: an image data inputting unit for receiving input image information and providing digital image data based thereupon; a printing unit for printing an image corresponding to the digital image data on a recording medium; and an image processing unit having plural image data calculating units for performing at least one of editing, working, synthesizing and correcting processing on the digital image data prior to printing thereof by the printing unit. The processing is performed in parallel by the plural image data calculating units. Each of the image data calculating units may perform a processing operation on a different portion of a single viewable image corresponding to the digital image data.

In yet another aspect of the invention, there is provided a printing system including: an image verifying unit for verifying image contents of digital image data by extracting and checking a predetermined image component which is at least one of a vertical image component and a horizontal image component, the vertical component being approximately in the vertical direction relative to an image frame of the digital image data, the horizontal component being approximately in the horizontal direction relative to the image frame. The image verifying unit verifies an angle between at least one of the extracted image components and the vertical direction or the horizontal direction of the image frame. An input position adjustment unit generates the digital image data in a picture data inputting unit by rotating and moving an inputting position for input analog image signals on the basis of the verified angle. A printing unit prints an image corresponding to the digital image data on a recording medium.

The printing unit, the picture data inputting unit, the input position adjustment unit, and the image verifying unit are all preferably physically integrated into a unitary body.

In still another aspect of the invention, there is provided a printing system that includes: an image verifying unit for verifying image contents of digital image data by extracting and checking a predetermined image component which is at least one of a vertical image component and a horizontal image component, the vertical component being approximately in the vertical direction relative to an image frame of the digital image data, the horizontal component being approximately in the horizontal direction relative to the image frame, the image verifying unit verifying an angle between at least one of the extracted image components and the vertical direction or the horizontal direction of the image frame; an image data calculating unit for generating adjusted digital image data by rotating and moving the digital image data relative to the image frame on the basis of the verified angle; and a printing unit for printing an image corresponding to the rotated and moved digital image data on a recording medium. With this printing system, the image data calculating unit may generate the adjusted digital image data by controlling the image contents of a sliced predetermined portion of the digital image data on the basis of the verified angle.

In still another aspect of the invention, a printing system comprises: an image verifying unit for determining whether or not predetermined image contents of digital image data are provided in a specified range of the digital image data; an image rearranging unit for rearranging the digital image data by controlling the predetermined image contents provided in the specified range so as to be comprised within a prescribed region; and a printing unit for printing an image corresponding to the rearranged digital image data on a recording medium.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein:

FIG. 31 depicts an example of correspondence between pre-set picture contents and specified and prescribed regions;

FIG. 33 shows still another example of correspondence between pre-set picture contents and specified and pre-scribed regions;

DETAILED DESCRIPTION OF PREFERRED EMBODIMENTS

Figure 5:
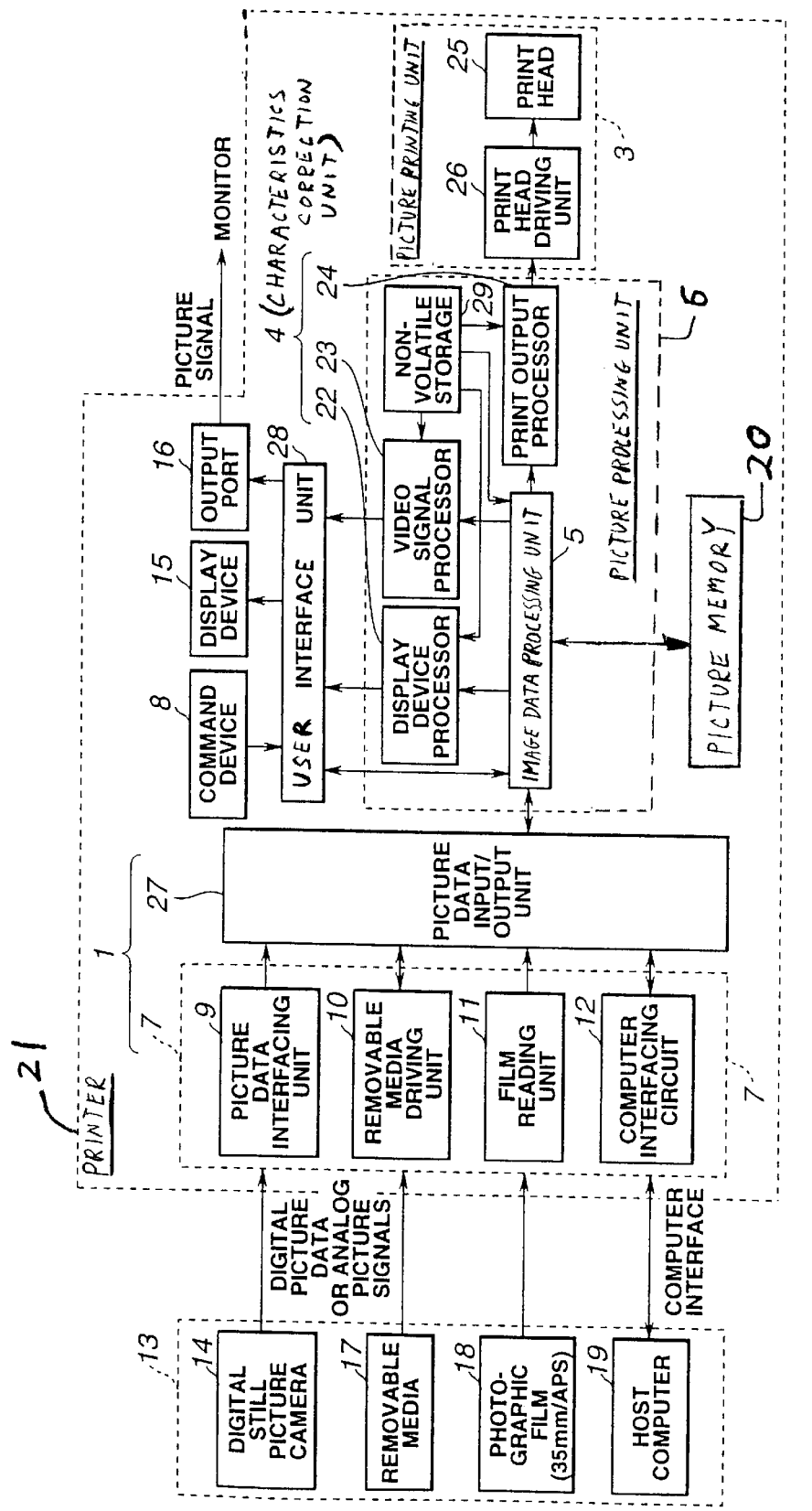
FIG. 5 is a block diagram illustrating an embodiment of a printer device according to the present invention.

Referring to FIG. 5, a first embodiment of a printer, 21, in accordance with the present invention is illustrated in a block diagram. Briefly, printer 21 is designed to convert externally supplied picture data or analog picture signals into an image which is displayed on a display 15 and also printed on a printing medium by a picture printing unit 3. The printer includes a printing properties correction unit 4 that corrects the display settings prescribing the display image quality, as well as the printer settings prescribing the printing image quality. The display settings correction can be made responsive to the printing settings correction, and vice versa. Printer 21 also includes processing means to automatically straighten a tilted input picture.

A detailed description of the components and operation of printer 21 will now be presented. Printer 21 includes an image data inputting section 1, comprising a picture inputting unit 7 and a picture data input/output (I/O) unit 27, for receiving input image information in the form of digital picture data or analog picture signals. The image information is received from an external storage device 13 such as a digital still camera 14, a removable medium 17 such as a tape or floppy disc, photographic film 18, or a host computer 19. Depending on the design of printer 21, the capability of interfacing with one or more of these types of external devices can be included. Accordingly, picture inputting unit 7 includes one or more of a picture data interfacing unit 9 for receiving image data from digital still picture camera 14; a removable media driving unit 10 for reading data and/or analog picture signals from removable media 17; a film reading unit 11 for scanning photographic film 18 and generating image data therefrom; and a computer interfacing circuit 12 for receiving image data from host computer 19. Picture data I/O unit 27 converts digital image data or analog image signals provided by picture inputting unit 7 to appropriate format for application to an image data processing unit 5 of picture processing unit 6. If analog picture signals are received, an analog to digital converter (not shown) within picture inputting unit 7 or within I/O unit 27 converts the analog signals to digital image data for application to picture processing unit 6. The digital picture data supplied to picture processing unit 6, hereafter referred to as "first" digital image data, are occasionally edited, worked on (e.g., to adjust brightness or contrast of the corresponding image), synthesized or corrected in image data processing unit 5, to thereby provide processed digital image data (hereafter referred to as "second" digital image data). The first and second digital image data (or alternatively, just the second digital image data) are output via characteristics correction unit 4 to display 15 and picture signal output port 16 and/or to picture printing unit 3 to display and/or print a picture. Characteristics correction unit 4 is considered to be formed by a display processor 22, a video signal processor 23 and a print output processor 24.

Characteristics correction unit 4 corrects at least one data value of the first and/or second digital picture data to provide characteristic corrected data (hereafter referred to as "third" digital image data). It is noted here that reference continues to be made to the first image data distinct from the second image data, because in some cases, the first data is not edited, etc. by data processing unit 5, and is instead supplied in its original form to characteristics correction unit 4 for correction therein. Note also that a predetermined range of an entire portion of the first or second digital picture data can be corrected by characteristics correction unit 4 into the third digital image data. Examples of a range of image data are: one or more rows or columns of data; a pixel block of a predetermined size; or a single picture of data among many pictures. Thus, correction unit 4 may operate on one range of image data at a time.

Printer 21, by virtue of characteristics correction unit 4, corrects the display characteristics settings of display 15 (and/or of an external monitor connected to output port 16) prescribing the display picture quality. This display setting correction is done in accordance with printing characteristics settings prescribing the picture quality in picture printing unit 3. Therefore, a change in printing settings will be mirrored by a change in display settings. Similarly, correction unit 4 corrects the printing settings of printing unit 3 in accordance with the display settings of display 15. The result is that the displayed picture in display 15 (and/or the monitor) and the printed picture in printing unit 3 are represented as being of visually equivalent picture quality.

Picture processing unit 6 is preferably configured with parallel processing hardware to speed up the image processing operations. That is, picture processing unit 6 preferably contains plural image data processing elements for effecting predetermined editing, working, synthesizing and correcting operations on the digital image data. Each of the image data processing elements (hereafter, "processing elements") may be designed to perform the same, multiple processing operations. (The picture data processing elements will also be referred to herein interchangeably as picture data calculating circuits. Also, the terms "image" and "picture" are used herein interchangeably.) A predefined portion of each of the respective processing elements can be adapted to correspond to a pre-set range (e.g., pixel block, column, etc.) of the digital image data. This allows multiple blocks of data to be processed simultaneously and in the same manner by each of the processing elements. For instance, multiple data blocks may be simultaneously processed for editing at a given instant of time.

In an alternative configuration, each of the image data processing elements can be allocated to perform a different processing function. These function-specific processing elements can likewise be broken down into different portions, with each portion operating on one range of image data at any given time to achieve parallel processing. Thus, the parallel processing in this configuration is performed by the different processing elements, each of which is performing a different type of processing operation. The parallel processing with either of the above two approaches can significantly shorten the overall image processing time, thereby reducing the time during which the user is kept waiting.

The overall processing time can be reduced even further if the processing contents of the plural processing elements are changed between the above-described three patterns (i.e., one or more columns, a block of data, or an entire screen of data). With this approach, an optimum pattern can be utilized for the image data at hand, thereby lessening the overall processing time.

To facilitate the parallel processing operations, picture processing unit 6 preferably includes a picture data transfer unit (considered part of data processing unit 5) for inputting and outputting the digital picture data in a predetermined sequence to and from the plural image data processing elements. It is also desirable to deploy a controller in the picture processing unit 6 (e.g., as part of processing unit 5) for controlling the respective processing elements. The controller may be adapted to control the processing elements comprehensively, or, separate controllers may be provided for the processing elements to afford individual control of each. Preferably, control software with variable contents is provided for the controller to enable variable controller operations to be carried out. In other words, the control software is actually comprised of a number of different control programs stored in non-volatile memory 29, and one of these control programs can be selected depending on the type of image data to be input to printer 21. On start-up, before commencing the processing of the digital image data in the picture processing unit 6, or upon reception of a command from command device 8, the control contents of the control software can be selected or modified from its previous contents if so desired. It is also possible to load new control software into memory 29, or update the current software.

If a separate controller is provided for each of the image data processing elements to individually control the processing elements, the executing functions in the respective processing elements can be modified by changing the contents of the control software in the controller even if the internal structure of the processing elements remains unchanged. It is also possible to modify the sequential execution of different, non-simultaneous processing operations. By modifying the control software, only necessary processing operations can be selected and executed sequentially.

With continuing reference to FIG. 5, printer 21 includes a command device 8 which functions as an input means for inputting an external command. Command device 8, which connects to a user interface unit 28, may be embodied as a built-in keyboard or the like which forms part of the physical make-up of the printer. Printer 21 further includes a program data inputting unit (not separately shown) for inputting a program file and/or parameter data, which are then stored in memory 29. The various components of picture processing unit 6 as well as the command device 8 are controllable on the basis of this program file and/or parameter data. The program data inputting unit is preferably included as part of picture data inputting unit 1. For instance, removable media drive unit 10 may function as a program data inputting unit to read program files and parameter data from a floppy disc, CD-ROM or the like. Optionally, a separate removable media drive unit dedicated exclusively to reading program files can be included. This dedicated drive unit would connect to I/O unit 27 or picture processing unit 6. With any of these hardware configurations, the program file and/or parameter data associated with specified picture data can be specified easily to facilitate the processing changes in accordance with the type or the size of the picture data. Once the program file and parameter data are loaded and stored in memory 29, the control methods for the characteristics correction unit 4 and/or the picture processing unit 6 and/or the command device 8 are updated, rewritten or supplemented.

The program loading function of the program data inputting unit (e.g., drive unit 10) is controlled by a control program. This control program either cannot be changed, or, the order of change priority of the control program of the program loading unit is lower than the order of change of the program file and the parameter data. With this hierarchy, the control program for the program loading unit may be prevented from being damaged when reading the program file and the parameter data from the program data inputting unit.

It is desirable for a common format to be used for the program file and for the parameter data, and that a discriminating indicia is provided in the common format for distinguishing the program file from the parameter data. Also, in controlling the characteristics correction unit 4, the picture processing unit, and/or command device 8 based on the program file and/or the parameter data, the starting and ending methods of the program file, as well as the accessing information and/or the form of description of the parameter data, are preferably standardized. By so doing, the respective program files are executed in a similar fashion, and the program files can use the respective parameter data as the occasion may demand.

The operation and features of the various components for printer 21 will now be explained in detail. Beginning with picture inputting means 7, this part includes one or more of picture data interfacing unit 9, operating as an analog picture signal inputting port or as a digital picture data inputting port; removable medium driving unit 10, as a disc drive or a memory drive; a film reading unit 11, as a scanner having a photoelectric transducing element; and a computer interfacing unit 12, operating as a digital picture data input port. Picture inputting means 7 connects to external input devices 13.

Picture data interfacing unit 9 interconnects a digital still picture camera 14, a digital video camera, or an original reading scanner processing an object, original photograph, etc. as picture data, with picture data input/output unit 27. Picture data interfacing unit 9 not only operates as a physical connecting unit but also as a device for controlling an external connection equipment 13 and for receiving digitized picture data, i.e., as a digital picture data input port. The connection to the external connection equipment 13 is typically a wired connection but may also be realized by a radio path, such as with infra-red rays or electromagnetic waves.

Picture data interfacing unit 9 may be configured for receiving analog picture signals, such as NTSC picture signals, PAL picture signals, RGB picture signals or S-terminal picture signals. In other words, it may operate as an analog picture signal input port, and also include A/D conversion means for digitizing the analog picture signals to generating picture data. If the input picture is a continuous picture, i.e., a moving picture such as analog picture signals or a picture imaged by a digital video camera, the moving picture can be directly outputted as picture signals to display device 15 or to an external monitor connected to an output port 16. When the user issues a command via command device 8 to select a desired picture, a moving picture selected by picture data interfacing unit 9 is captured as picture data, i.e., as a digitized still picture, under the control of user interface unit 28, which will be explained subsequently. The picture data, thus captured, is routed via picture data input/output (I/O) unit 27 to data processing unit 5. Alternatively, the picture data may be routed in the order in which it is captured, or the picture data may be sequentially routed in terms of a block of a pre-set data volume as a unit. Still alternatively, the picture data may be routed in terms of data of a completed picture frame as a unit.

Removable media driving unit 10 drives a removable medium 17 to read or write picture data. Removable medium 17 may be exemplified by a magnetic card, a magnetic disc, an optical disc, a magneto-optical disc, a flash memory or an IC memory card constituted by a ROM or a RAM. Removable media driving unit 10 is also designed to drive-control a physical mechanism of the medium that needs to be actuated. Picture data read by driving unit 10 is routed to data processing unit 5 in the same manner as described above for interface unit 9.

If removable medium 17 contains picture data representing plural pictures, the picture data may be outputted sequentially or in a contracted state to the display 15 or to a monitor connected to port 16 as picture signals. If the user issues a command for selecting a desired picture via command device 8, removable media driving unit 10 routes the selected picture data to the picture data I/O unit 27, under control of user interface unit 28 to cause data processing unit 5 to process the data in a predetermined fashion. Conversely, processed picture data can be written onto removable medium 17 by means of the picture data processed by data processing unit 5 being routed via picture data I/O unit 27 to the removable media driving unit 10, under control of user interface 28. Removable media driving unit 10 then writes and stores the data on removable medium 17.

Film reading unit 11 reads a photographic film 18 and connects the read-out data into picture data. Film 18 can be ordinary 35 mm film or so-called AUTOMATIC PRINTING SYSTEM (advanced photo system) film, having magnetic information corresponding to a picture, a large-sized roll type film or a sheet-type film. Film reading unit 11 is mainly comprised of a photoelectric transducing element for reading out picture data in a film, a driving element for drive-controlling the photoelectric transducing element and a driving controller for drive-controlling the film so that the targeted picture will be in registration with the photoelectric transducing element. The transducing element can be a CCD line sensor, a photodiode, a phototransistor, a CCD image sensor or a CMOS image sensor. The image in the film is read out by the photoelectric transducing element and thereby transduced into digital picture data. The picture data, thus captured, is routed via picture data I/O unit 27 to data processing unit 5. The picture data may be sequentially routed in the order in which it is captured, sequentially routed in terms of a block of a pre-set data volume as a unit, or may be routed in terms of data of a completed picture frame as a unit.

If plural pictures are recorded in a film, each read-out picture may be outputted directly, in a high density state, to display 15 or to the monitor. Optimally, the picture can be read out and displayed roughly at a low read-out density by setting a rough read-out pitch. In either case, if the user issues a command in command device 8 for selecting a desired picture, film reading unit 11 routes the corresponding picture data to picture data input/output unit 27, under control of user interface unit 28, to cause data processing unit 5 to process the picture data. If the picture is routed as the rough read-out picture, it is read again at the usual (high density) read-out pitch. If, in film reading unit 11, the film is tilted relative to the read-out range of the photoelectric transducing element, or the composition of the main portion of the picture in the film is improper, the film setting position or the read-out position of the photoelectric transducing element may be automatically corrected for re-reading, in accordance with a user command or software processing under control of user interface 28.

Film reading unit 11 may also have the function of correcting the characteristics of the photoelectric transducing element and the function of correcting characteristics of the illumination used for photoelectric conversion.

If in particular, film reading unit 11 has the capability of reading APS film by means of its photoelectric transducing element, a magnetic head is additionally provided in film reading unit 11 to allow magnetic imaging data recorded on the APS film to be read out simultaneously with picture read-out. This magnetic data is displayed on display 15 or used for data processing by image data processing unit 5, under control of user interface 28, as imaging data pertinent to the picture data, so as to be saved along with the picture data.

Accordingly, by incorporating film reading unit in printer 21 in the above-described manner, printing photographs stored on photographic film 18 can be realized without the need for a universal computer. This represents a distinct advantage over prior art techniques for printing image data stored on film, all of which require a universal computer as described above.

It is noted that a computer interfacing unit 12, akin to that described earlier, serves to interconnect a host computer 19 with picture data I/O unit 27. Interface unit 12 may be exemplified by a high-speed interface, such as Bi-Centronics, IEEE-1394, USB or SCSI. This computer interfacing unit 12 effects controls for each interface and a variety of protocol controls including control of commands and responses, used for bidirectional transmission/reception of picture data, with the aid of the interfaces. The picture data, thus transmitted or received, are handled on the line basis, block basis or on the plane basis.

In prior art systems, to print a computer-displayed image on a printer, a variety of processing operations for printout need to be performed on a printer driver provided within the computer. Conversely, with the present printer device 21, in which print processing operations are performed by the data processing unit 5 and characteristics correction unit 4, the processing performed by the printer driver of host computer 19 is reduced significantly. That is, the time consumed in processing by host computer 19 is shortened to permit host computer 19 to execute operations other than printing immediately. This frees up the CPU of the host computer to perform other tasks. Also, with printer 21 the picture data inputted from picture input units 7 described above may be processed in a variety of ways by data processing unit 5, the resulting data being then routed to host computer 19 and processed in a variety of ways by other software programs of host computer 19 to be saved in host computer 19.

Although four types of means have been described in the foregoing as the picture inputting means 7, these are merely illustrative and the picture inputting means 7 may be configured differently without departing from the scope of the invention.

Picture data input/output (I/O) unit 27 is a portion of printer 21 responsible for transferring picture data between picture inputting means 7 and picture processing unit 6. That is, I/O unit 27 functions to transfer to data processing unit 5 the first digital picture data obtained from digital input data or via A/D conversion of analog picture signals. Picture data I/O unit 27 also has the function of adjusting the picture data transfer timing and the relationship between the source and the destination of transfer to prevent collision between different picture data. Additionally, I/O unit 27 has the functions of making adjustments to enable picture data inputted from a variety of picture inputting means to be handled in a similar fashion.

I/O unit 27 receives picture data from the picture data interfacing unit 9 and the film reading unit 11 of the picture inputting means 7, while transmitting/receiving picture data to or from the removable media driving unit 10 and the computer interfacing unit 12. That is, the picture data input unit 1 operates as a data inputting/outputting unit. The transmitting/receiving timing of picture data or selection of picture data in the picture data input unit 1 is controlled on the basis of a command from user interface 28, as later explained, if the command from the user is to be followed. The above-described control may also be performed automatically under control of data processing unit 5.

In printer 21, each picture inputting device 7 of picture data input unit 1 may also be caused to operate as a program data input unit. That is, the program file and/or the parameter data may be entered from each picture inputting device 7. In this case, the program file and/or the parameter data can be directly inputted to each portion allocated to input picture data as digital signals. Also, in each portion where a picture drawn on a silver halide film or a recording medium is read and converted by analog/digital conversion into first digital picture data, the program file and/or the parameter data can be read by the photoelectric transducing element as in the case of a two-dimensional bar code or an OCR reading mark sheet system for conversion into digital data. Inputting may also be effected by addition to APS magnetic data on the magnetic recording layer on an APS film.

Moreover, the program file and/or the parameter data may be associated with specified picture data. That is, by using a common input device to serve as both the program data inputting portion and the picture data inputting portion, the program file and/or the parameter data associated with specified picture data can now be specified to render it possible to change the function of printer 21 depending on factors such as the type or size of the specified picture data. In this case, the totality of the functions of printer 21 can be changed by the input program file and/or the parameter data. Also, in this case, conversion of the externally inputted digital picture data and/or analog picture signals and inputting of the program file and/or the parameter data may be effected by the same picture inputting unit 7 or by different picture input units 7.

Figure 10:
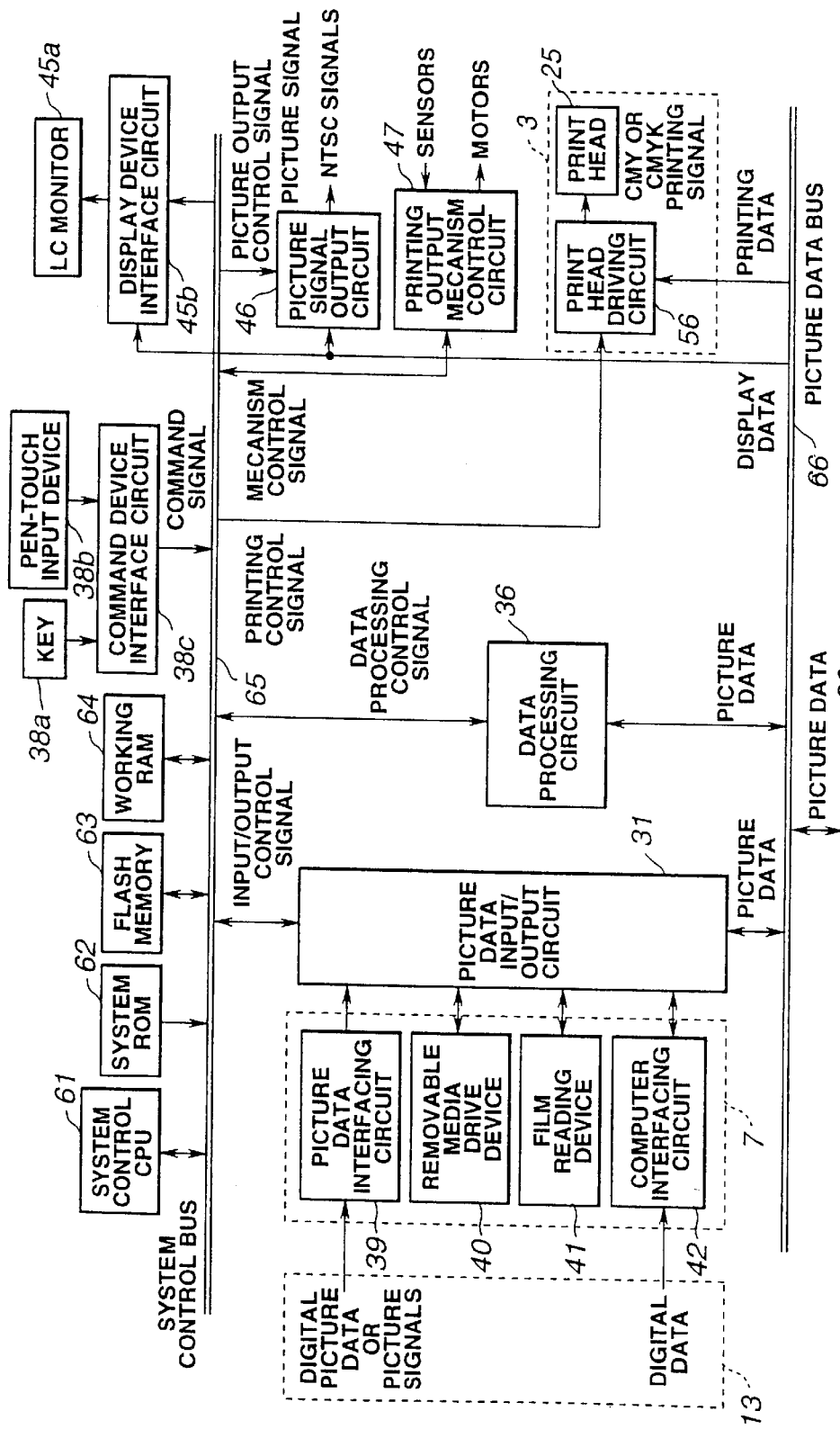
FIG. 10 is a block diagram showing the structure of a printer device according to the present invention.

As mentioned earlier, the program loading unit of the program data inputting unit (e.g., drive unit 10) is controlled by a control program which is stored and held in a system controlling CPU 61, a system ROM 62 or in a flash memory 63 (FIG. 10). Among the methods for changing the control program of the program loading unit are the following: changing the program solely by changing the program ROM; setting the password to permit the program change on inputting the password; and, permitting the program change such as program rewriting/updating solely by manufacturer setting, service setting or supervisor setting. This prevents the control program of the program loading unit from being damaged when reading the program file and/or the parameter data from the program data inputting unit.

As stated earlier, it is preferred that the program file and the parameter data have a common format and are provided with a discriminating indicia for demarcation between the two. Also, the starting and terminating methods of the program file and/or the form of stating the parameter data are preferably standardized when one or more of the characteristics correction unit 4, picture processing unit 6 and command device are to be controlled on the basis of the program file and/or the parameter data inputted from the program data inputting unit or which are stored and held in memory 24. By so doing, the program files can be executed in a similar fashion, while the respective program files can use the respective parameter data whenever the necessity arises. Moreover, the program file or the parameter data can be easily developed even if the relation to other portions of printer 21 is unknown, such that these can be inputted from the program data inputting unit to execute the functions of printer 21. Therefore, if the starting and terminating methods of the program file of printer 21 as well as the accessing information are disclosed, the user is able to develop the program file or the parameter data easily.

If the program file or the parameter data are stored, and a recording medium in which data can be inputted is furnished from the data inputting unit, the functions of printer 21 can be easily updated, changed or supplemented easily.

Moreover, in the present printer device, the picture input units 7 can be operated as an inputting unit for inputting the control software responsible for performing control on the controller configured for controlling the plural picture data processing elements in the picture processing unit 6, which will be explained subsequently. It is possible in this case to directly input the control software in each portion dedicated to input picture data as digital signals. Also, in the respective portions configured for reading a picture recorded on a silver halide film or a recording medium and for A/D converting the read-out picture to generate first digital picture data, it is possible to read the control software by a photoelectric transducing element such as with a one-dimensional or two-dimensional bar code or in the case of the OCR read mark sheet system. Inputting can also be effected by supplementing the APS magnetic data of the magnetic recording layer on the APS film.

The control software may be adapted to operate with specified picture data. That is, the control software associated with the specified picture data can be specified to differ according to such factors as the type or the size of the specified picture data, to thereby change the functions as the printer device. In this case, it is of course possible to change the totality of the functions of printer 21 by the input control program. It is noted that conversion of externally inputted digital picture data and/or externally inputted analog picture signals into first digital picture data and inputting of the control software can be effected either by the same or different picture inputting units 7.

Printer 21 includes the aforementioned display 15, and an output port 16, operating as an analog picture signal data output port and/or a digital picture signal data output port. Output port 16 is connectable to an external monitor serving as an external connection. Display device 15 consists mainly of: 1) a full-color display unit for displaying picture data and the information concerning the user interface unit 28, as later explained; and, 2) a corresponding driving unit. A flat panel display represented by a liquid crystal panel is preferred for display 15. The display 15 may also be provided with one or more status display unit, such as an LED, representing the operating state.

Command device 8, operating as a means for inputting an external command, may be enumerated by a mouse, a track ball, a keyboard, a touch panel provided on the display device 15, and a pen-touch input panel for data input by a pen point. Command device 8 also is a portion to which a command by the user is inputted responsive to the control by user interface unit 28 as later explained. With the touch panel or the pen-touch input panel provided on display 15, the display of an image of an actuating key on a display device and the range of the inputting operation for the key image displayed on the touch panel or the pen-touch panel represent the same or related position. If chattering is likely to be produced, as in the case of a key, the processing for avoiding the malfunction due to chattering from occurring is performed by an electric circuit or by control software.

As a method for using command device 8, a command accepting range may be displayed on an external monitor, under control by user interface unit 28, while a pointer indicating the display position of command device 8 is displayed on an external monitor display screen arranged to display a picture signal output from output port 16. The pointer is moved in the range by the command device 8 and selected to enter the user command.

User interface unit 28 has the functions of: outputting picture data outputted from picture processing unit 6 (as explained later) on display 15 and/or the external monitor; selecting a picture or reading out picture data in accordance with an input command by the user via command device 8; setting various parameters for editing, working, synthesizing or correcting the picture data in data processing unit 5; performing a setting operation for correcting display output characteristics prescribing the display picture quality in display 15 and/or the monitor via characteristics correction unit 4 and/or for correcting the printing characteristics prescribing the printing picture quality in picture printing unit 3; and, performing a setting operation to correct the picture data in the characteristics correction unit 4 and for controlling printer 21 under the command by the user. User interface unit 28 synthesizes key display, slide volume display or menu picture display necessary for operations to the picture data for the output port 16 and for the display device 15 processed by the picture processing unit 6 to output the synthesized data on display 15 or to an external monitor via output port 16.

In the above configuration, display contents different from those on display 15 may be displayed on the external monitor. For example, it is possible to display picture data and a picture synthesized by user interface unit 28 on display 15 and to output only picture signals to the output port 16 to display only the picture data on the external monitor. Specifically, the entire printing range of the recording medium may be displayed on display 15, while only selected picture data may be displayed on the external monitor. The contents to be outputted to display 15 and to the output port 16 and the contents of the acceptance command corresponding to the outputted contents are determined by the operating state of printer 21 and by the processing contents in the picture processing unit 6.

Picture processing unit 6 is comprised mainly by data processing unit 5 and characteristics correction unit 4, as described above. If the picture data inputted by picture data input unit 1 is not of ideal picture quality characteristics, data processing unit 5 corrects the input picture data in order to improve the picture quality of the display picture on display 15 or on the external monitor or the picture printed by the picture printing unit 3. Data processing unit 5 receives the user command from the command device 8 via the user interface unit 28 and accordingly edits, works on, synthesizes, corrects or converts the first digital picture data from the picture data input unit 1 to produce second digital picture data.

Data processing unit 5 is configured for performing accessing control to a picture memory 20, so that picture data can be written or read out, under control by data processing unit 5 whenever the necessity arises. The picture data to be stored is the data edited, worked on, synthesized or corrected by data processing unit 5. If there is any information pertinent to the picture data, such pertinent information is also saved. The data saved in picture memory 20 may be in a compressed form, in a reversibly compressed form or in an irreversibly compressed form, depending on such factors as: whether or not the data is in a format that can be easily handled by the picture processing unit 6 or the picture quality deterioration on repeated compression and restoration operations is tolerable; the amount of picture data to be saved in the picture memory 20; maximum capacity, readout/write speed of the picture memory 20, etc. If the processing speed, picture quality deterioration or data handling is taken into account, the data is preferably stored in picture memory 20 in a non-compressed form. Picture memory 20 is preferably of such a capacity as to permit several frames of the picture data to be kept in the non-compressed form. It is also possible to use a portion of the picture memory 20 as a working memory for picture data in the course of the processing in the picture processing unit 6. If, when accessing picture data in picture memory 20, the picture data is stored therein in compressed form, the picture data is re-written in picture memory 20 after compressing the picture data in data processing unit 5. Of course, the compressed data is expanded on readout in data processing unit 5.

Since data processing unit 5 performs accessing control to picture memory 20, it performs control operations to effect time-divisional accessing if the write timing of picture data in picture memory 20 is likely to collide with the readout timing from picture memory 20, or performs a control operation to delay the write timing or the readout timing. By detecting the effective capacity of the picture memory 20 by configuring the picture memory 20 so that its capacity can be increased or decreased, it is possible to perform normal addressing control to the picture memory 20.

If, in imaging or reading out picture data, the correcting processing characteristic of input units to the picture data interfacing unit 9 or to the film reading unit 11 are not executed, it is possible for data processing unit 5 to effect digital processing on the picture data.

In data processing unit 5, the picture data is mainly handled in digitized form. If the digitized picture data read from the picture data input unit 1 is processed while the number of bits for calculation of each data block remains equal to that of the input picture data, the calculation accuracy is gradually reduced. It is therefore crucial for guaranteeing the picture quality of the printed picture to increase the number of bits of each data block by, e.g., two to four bits to prevent the deterioration of the calculation accuracy as far as possible.

If the user edits, works on, synthesizes or corrects the first digital picture data inputted via picture data input unit 1 in a desired manner, the picture data is outputted and displayed on display 15 or the external monitor (to produce, in either case, what will hereafter be referred to as a "displayed picture"). The displayed picture is displayed under control by user interface 8, based on the command from command device 8, to permit the user to check if the processing operation is the desired one. If the user has effected the desired processing on the first digital picture data to generate second digital picture data, and a command is issued to print it, the second digital picture data is sent via a printing output processing unit 24 (as explained later) to picture printing unit 3.

The processing executed in data processing unit 5 such as editing, working, synthesis or correction, may be configured to permit late addition or updating of the software for each processing task and parameters used in each processing task from removable medium driving unit 10 or computer interfacing unit 12. This permits new functions to be added to the printer device. Specifically, the various processing tasks executed by data processing unit 5 may be configured to be added to or updated, responsive to the program file and/or the parameter data from a program data input in picture data input unit 1, as discussed previously. That is, the processing of editing, working, synthesis, correction or conversion on picture data in data processing unit 5 is executed in accordance with the program file and/or the parameter data inputted from the picture data input unit 1 or stored and held in memory 29.

Similarly, the processing performed by the components of characteristics correction unit 4, namely, display device processing unit 22, picture signal processing unit 23 and printing output processing unit 24, is executed in accordance with the program file and/or the parameter data inputted from picture data input unit 1 or stored in memory 29. It is noted that the picture data input unit 1 either has its original functions, or functions subsequently updated, rewritten or supplemented, that is, the function of the program data input unit. In other words, it is possible to update the functions of the program data input unit itself by loading certain update software.

The functions that can be updated, changed or supplemented responsive to the program file and/or the parameter data inputted from the program data input unit may encompass any of the functions performed by printer 21 (i.e., aside from those allocated to picture processing unit 6). Specifically, the above functions may encompass the contents of correction by the characteristics correction unit 4, the contents of editing, working, synthesis, correction and conversion of data processing unit 5, the contents of processing by user interface unit 28 and data processing unit 5 or the entirety of the functions of printer 21. Further, the control in accordance with the program file and/or the parameter data stored in storage unit 29 can naturally be executed by other than data processing unit 5. That is, the executable functions of the present printer device can be updated (version upgrading), rewritten or supplemented.

In characteristics correction unit 4, display device processor 22 corrects the first digital picture data or the occasionally processed second digital picture data, in accordance with the characteristics of display 15, in order to display the corresponding pictures via user interface unit 28 on display 15. Video signal processing unit 23 corrects the first digital picture data or the occasionally processed second digital picture data in accordance with characteristics of an external display equipment, such as an external monitor, and also in accordance with characteristics of standard picture signals outputted to the display equipment, in order to display images corresponding to the picture data via user interface unit 28 on the external display equipment. The picture data outputted from display device processing unit 22 and from video signal processor 23 to user interface 28 are occasionally synthesized with other data in user interface 28 so that the synthesized picture data will be displayed on display 15 or on an external monitor. In this case, the synthesized picture data may be synthesized with display or letters requesting a user command or a pattern generated in data processing unit 5.

Printing output processing unit 24 is responsible for effecting the conversion and correction in preparation for printing by the picture printing unit 3 and routing the converted or corrected data to picture printing unit 3. Usually, the first digital picture data or the occasionally processed second digital picture data are RGB signals with 8 bits or more for each color. However, three colors of CMY or four colors of CMYK (where K represents black) are used as inks in a printer head 25 used in the picture printing unit 3. Thus, printing output processor 24 converts the RGB signals into these colors, while effecting color correction for correcting color shift of the print output attributable to the non-optimum spectroscopic sensitivity of each of the recording inks of the respective colors or toners. Processor 24 also performs conversion correction processing related to environmental conditions prevailing at the time of recording, such as the conditions of printer head 25, inks, toner or coloration characteristics of the recording medium.

Further, printing output processor 24 re-arranges the picture data transferred to printer head 25 in the printing sequence actually used in printer head 25. To this end, a transient buffering RAM for printing data may be provided in printing output processor 24. Alternatively, when data processing unit 5 reads out the picture data from picture memory 20, the read-out addresses may be controlled in accordance with the printing sequence in printer head 25.

In printer 21, the picture displayed on display 15 or on the external monitor is represented as being of visually equivalent picture quality to the picture printed by printing unit 3. To this end, the setting of the display output characteristics prescribing the display picture quality in display 15 or the external monitor is corrected by display device processor 22 and/or video signal processor 23 in association with the setting of printing characteristics prescribing the printing picture quality in picture printing unit 3. Conversely, the setting of printing characteristics prescribing the printing picture quality in picture printing unit 3 is corrected by printing output processor 24 in association with the setting of the display output characteristics prescribing the display picture quality.

Moreover, in the present printer device, display device processor 22, picture signal processor 23 and the printing output processor 24, constituting the characteristics correction unit 4, are provided with picture correction means (e.g., dedicated hardware circuitry and/or software) for correcting data values (or at least one data value) of the first digital picture data or data values of the occasionally processed second digital picture data in a predetermined fashion to provide third digital picture data. Of course, the above-mentioned picture correction means is capable of performing predetermined correction of pre-set ranges of the first digital picture data or the second digital picture data and the first digital picture data or the second digital picture data in their entirety. That is, the third digital picture data is displayed and outputted by the picture display outputting unit and printed on a recording medium by the picture printing unit.

In printer 21, the correction procedure to generate the third digital picture signals by the picture correction means of characteristics correction unit 4 is preferably a correction that converts the color to the reproduction color felt to be optimum by an average viewer. Also, the correction by the picture correction means corrects specified contents in the picture data in accordance with an average stored color. It is also desirable that the viewing conditions such as an average light source used for viewing the displayed picture and the printed picture printed by printing unit 3 (hereafter, just "the printed picture") are presupposed and the correction is performed in accordance with the presupposed conditions. It is possible in this case to extract a specified pattern in picture data to make corrections on the pattern or pre-set ranges.

As stated previously, in printer 21, correction is performed so that the displayed picture will be represented as being of the visually equivalent picture quality to the printed picture. However, it is nevertheless difficult to realize a picture desired by the viewer. This tendency is apparent in reproduction of the color defined by brightness, color hue and saturation, among a variety of characteristics of the picture quality. This will be now be explained with reference to the following two articles, each of which are incorporated herein by reference: Bartleson, C. J. and Bray C. P., "On the Preferred Reproduction of Flesh, Blue-Sky, and Green Grass Colors", Photogr. Sci. Eng. 6,19 (1962); Imaging Part 1, published by SHASHIN-KOGYO on Jan. 20, 1988, entitled "Physical and Subjective Aspects of Picture Evaluation".

To simplify the discussion, it is assumed that an object is imaged by certain inputting means and corrected in a manner optimum for input characteristics typical of the inputting means, whereby picture data having colorimetric values equal to those of the object at the time of imaging are obtained. If, when this picture data is displayed on display 15 or the external monitor or printed on a recording medium by the picture printing unit 3, the colors exhibited by the picture data are directly corrected in accordance with respective output characteristics, and the picture data, thus corrected, are displayed and printed to make color reproduction close to the calorimetric values. The picture obtained and viewed by viewers at large has a picture quality of non-vivid impression different from an actual object. This phenomenon occurs substantially similarly even in cases wherein the viewer is not directly aware of the actual object for the reason that the desirable or optimum color for a particular printed picture is distinct from the color of the object being imaged due to such factors as the color memorized by the individual viewers and the colors liked by the different viewers.

For convenience in the ensuing discussion, the color ordinarily recollected by viewers for a given commonplace article is termed a memory color, and the color which the viewer feels to be optimum for the article is termed a preferred reproduction color. The memory color means the color ordinarily recollected by viewers for a given commonplace article. With an average memory color, the color hue shifts in a direction presumed to be the direction proceeding towards the most impressive color attribute, with the saturation and brightness tending to be increased. The preferred reproduction color means a color that a person feels is desirable for the article, and is influenced not only by factors of the picture itself, such as picture contents, but also by the personal taste of the viewer, light source type and so forth.

The article may be enumerated by one common to the viewer or to which the viewer directs special attention, such as skin color, grass color or the blue sky color. Of particular interest is the skin color. Examples of the factors generated by the preferred reproduction color for the skin color include:

i) factors on the side of the picture itself, such as:
   a) sex, age or the like personal difference of the object;
   b) status of the background scene;
   c) proportion of the object in the entire picture;
   d) light source at the time of imaging etc.
ii) factors on the side of the viewer, such as:
   a) personal liking of the viewer (differing with the generation);
   b) light source; and
   c) viewing distance etc.

The characteristics on the color coordinates of the preferred reproduction color for the skin color include the following:
   a) movement towards a white point;
   b) tolerance is lowered in the direction of rotation of the color hue;
   c) tolerance becomes broader in the direction of the increasing saturation.

The preferred reproduction color is known to be affected only to a limited extent by the type of the light source. In a photographic picture, the preferred reproduction color is said in general not to be coincident with the memory color.

Figure 6:
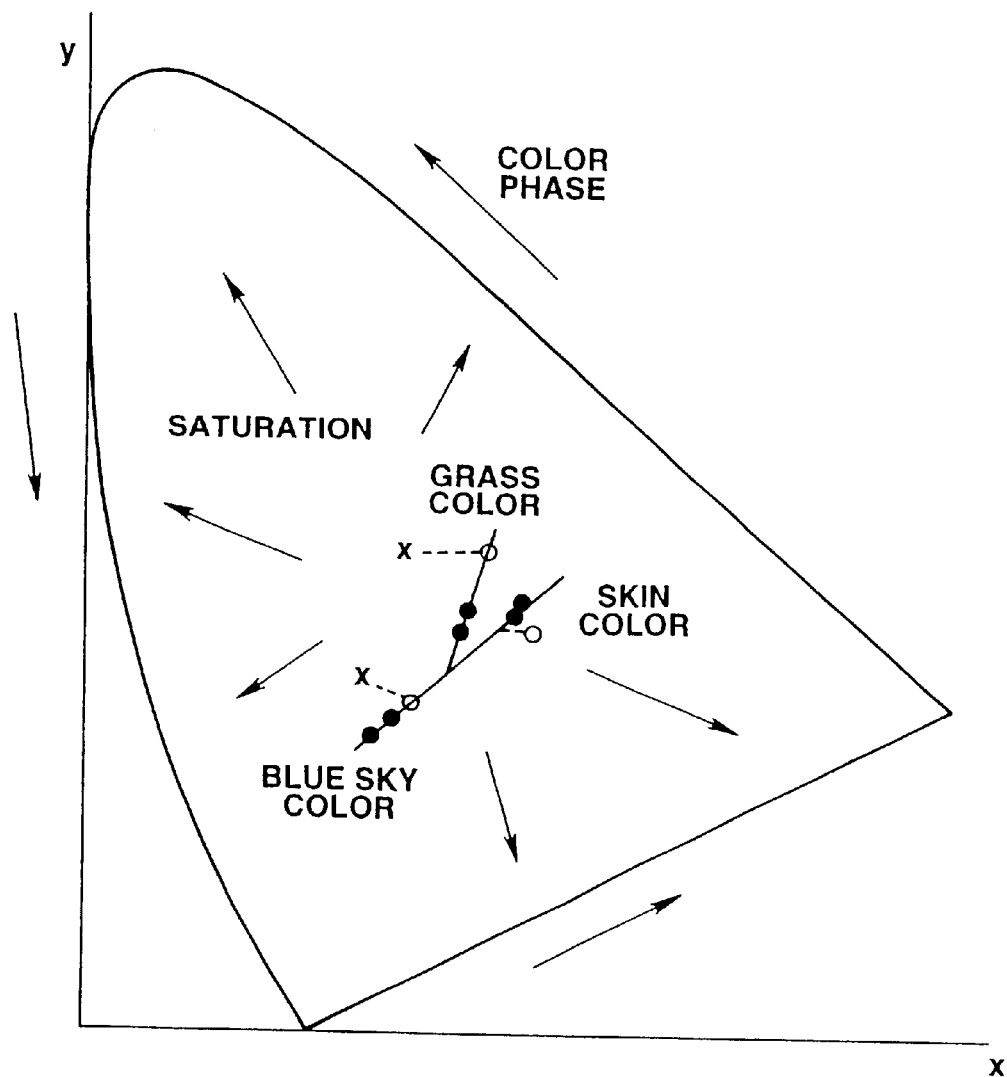
FIG. 6 is a graph showing an example of desirable color regeneration on a CIE color coordinates.

FIG. 6 shows a typical preferred reproduction color on the CIE color coordinates from the reference material 1. In particular, FIG. 6 shows the relationship between the color of the object, indicated by a clear circle "O", the average memory color, indicated by "x" and the average preferred reproduction color indicated by a darkened circle, for the skin color, blue sky color and the grass color. FIG. 6 shows changes in the color hue and saturation, with the color hue being rotated along the side of the drawing and with the saturation increasing from the center towards the rim of the drawing. Thus, it is seen from FIG. 6 that the preferred reproduction color and the average memory color deviate from the color of the object depending on the type of the object.

There is also a desirable reproducing method for an element other than color reproduction, such as sharpness of a picture. As far as sharpness is concerned, a picture exhibiting extremely high sharpness is not necessarily pleasant to the viewer; in a portrait or a figure, a picture with different sharpnesses is more desirable. Thus, it is recommendable to vary the sharpness in dependence on the picture contents.

It will be seen that if input picture data is simply corrected in accordance with the display output and printing characteristics to output and display a picture from a picture outputting unit, and the output picture is recorded on the recording medium by the picture printing unit, the resulting picture quality falls short of the picture quality desired or liked by the viewer. Thus, in actually displaying and printing a picture on the present printer device 21, it is desirable not only to execute displaying, outputting and the correction proper to the printing characteristics, but also to execute correction for preferred reproduction in accordance with the contents of the picture data.

Specifically, the display device processing unit 22 and the picture signal processing unit 23 execute the above-mentioned pre-set correction on at least one data value of the first digital picture data, at least one data value of the second digital picture data, pre-set ranges of the first digital picture data and the second digital picture data or on the picture data in its entirety, to provide the third digital picture data. A pattern in the picture data can be extracted and, if the pattern is a predetermined pattern, picture data in the range of the pattern is selectively converted. Alternatively, if the data value of the pixels making up the picture pattern is in a pre-set range, it suffices if the picture data is converted selectively.

The correction may be effected in a predetermined manner. It is effective to implement predetermined converting correction of the preferred reproduction color or the average memory color for a specified region or a specified range in the picture data. In addition, the picture displayed on the display device 15 and the picture of the external monitor by output signals of the output port need to be substantially the same as the picture printed by the picture printing unit 3. Therefore, it is also effective to postulate the viewing conditions, such as an average light source, under which the viewer sees the picture displayed on the picture display outputting unit or the picture printed by the picture printing unit, as discussed above, and to effect the correction in accordance with the postulated conditions.

If the printed picture on the recording medium is compared to the display on the display device 15 or on an external monitor, there frequently occur cases wherein difference is caused in the analytic selecting method for obtaining the desirable picture quality for the same user (viewer) and in the corresponding converting correcting method. This is ascribable to the difference in characteristics between the hard copy obtained on copying on the recording medium (co-existence of the additive color mixing and subtractive color mixing) and the soft copy obtained on displaying on the external monitor (additive color mixing) and also to the difference in output characteristics proper to the respective output devices.

The result is that the processing method carried out in the display device processor 22 and in the video signal processor 23 differs from that carried out in the printing output processing unit 24. That is, the processing method which permits the picture to be viewed similarly to the printed picture on the recording medium in picture quality is used in the display device processor 22 and in the video signal processor 23. The selective correcting processing method in display device processor 22 and in video signal processor 23 may be rewritten or one of plural pre-set methods may be selected depending on the using conditions.

The contents in the display device processing unit 22 and in the video signal processing unit 23 are also rewritten/ selected in keeping with those of the printing output processing unit 24. If the type of the printer head 25 constituting the printing output processing unit 24 is changed, the setting of the printing output processing unit 24 is also changed, while the setting of the display device processing unit 22 and the picture signal processing unit 23 is also correspondingly changed and corrected. If the display characteristics of the display device 15 or the type of the external monitor are changed, the setting of the display device processing unit 22 and the video signal processing unit 23 is correspondingly changed. These settings are preferably assembled from the outset.

The converting correcting method for the display device processing unit 22 and the video signal processing unit 23 and the selecting method of the range have been described as being independent from each other. Alternatively, these methods may be unified to a common method if part or all of the functions can be used in common. Turning now to the printing output processing unit 24, at least one data value of the first digital picture data, at least one data value of the second digital picture data, pre-set ranges of the first and second digital picture data and the picture data in its entirety are corrected in a pre-set fashion as described above, to provide third digital picture data.

Specifically, if a pattern in picture data is extracted, and if the pattern is the pre-set pattern, it suffices if pixel data in the pattern is selectively converted. On the other hand, if data values of the respective pixels making up the picture pattern are within the pre-set specified range, it suffices if the pixel data are selectively converted.

It suffices if this conversion is effected by a pre-set method. For improving the picture quality of the printed picture, it is effective if the converting correction is effected in a pre-set fashion using pre-set preferred reproduction color or pre-set average memory color.

If, in the picture correction unit in the printing output processing unit 24, the picture data is analyzed to select the range of execution of the correcting processing, the following methods may be used as the method for analysis and selection:

1) The contents of the input picture pattern are extracted and, if these are within pre-defined specified pattern, the inside range of the pattern is selected. If, for example, the sky color portion is set to be corrected from the outset, a targeted portion, herein the shape of the skin-color portion of a human being, such as a face or an arm, is extracted on pattern recognition.

2) If data of each pixel of the input picture data is within a pre-defined specified range, these pixels are extracted. If, when the skin color portion is pre-set to be corrected, respective pixel data in the picture data are in a range showing the pre-defined skin color, these pixels are extracted.

If, when 1) and 2) are combined together, and each pixel data in an area judged to be a skin color portion of a human being on pattern recognition are within a range exhibiting the skin color, the pixels of the area are analyzed and selected, it is possible to prevent errors in the pattern recognition.

The area and the range, analyzed and selected by the printing output processing unit 24, are converted in a manner as now explained.

a) The contents of a picture on analysis and selection are converted to the reproduction color felt to be optimum by an average viewer. As a typical example, the conversion for the skin color of the human being is as follows: A large number of persons are queried as to which skin color is most desirable when recording a face of a human being. The data range of the skin color thus found is set and pixels of the skin color area of the face analyzed and selected from the picture data are converted into pre-set skin color data. Of course, if there is a width of change, such as gradation, in the analyzed and selected skin color, the change width or gradation needs to be maintained in a similar fashion in the as-converted skin color.

b) In lieu of the preferred reproduction color, discussed in a), an average memory color is found and a corresponding data range is set. Based on this value, the skin color area of the face analyzed and selected from the picture data is converted to the average memory color rather than to the preferred reproduction color. In this case, the contents of the picture obtained on analysis and selection are converted to the as-set average memory color itself, or the color of the ultimate conversion is found from the respective pixel data of the picture data and these setting values.

c) The above method a) and b) are combined, and an optimum method is selected from a) and b) depending on the pre-defined pattern or the data range.

In addition to the conversion based on the preferred reproduction color or on the average memory color, it is also effective to postulate the viewing conditions under which a viewer observes the picture printed by the picture printing unit, such as the color temperature of the average light source, illuminance on the recording medium or the reflectance on the recording medium and to effect the correction depending on the postulated conditions.

Figure 7:
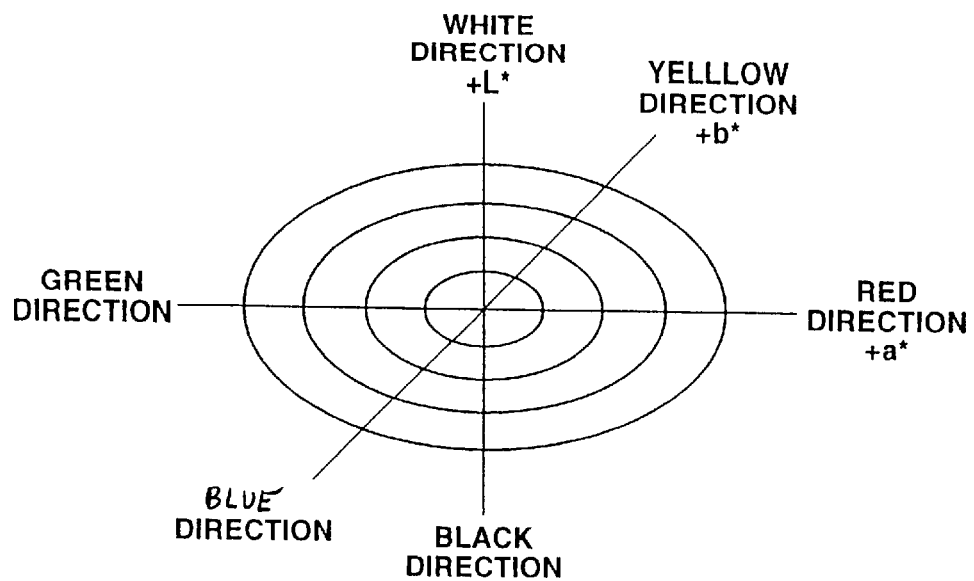
FIG. 7 is a schematic diagram showing a CIEL*a*b* uniform color space coordinate system.

By way of an example of a method for effecting conversion correction suited to the specified area and the range selected on analysis, input picture data are transiently converted into uniform color space coordinates represented by CIE L*a*b* shown in FIG. 7 to effect targeted conversion and correction based on these coordinates.

Figure 8:
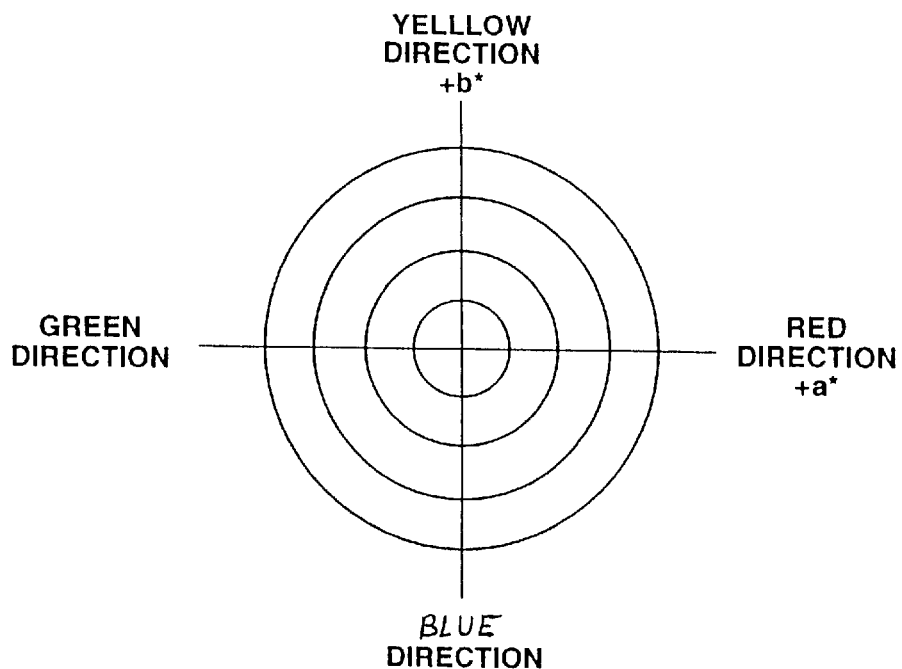
FIG. 8 schematically illustrates a plane of the uniform color space coordinate system.

Since the color system typified by the CIE L*a*b* system is inherently a three-dimensional coordinate system, conversion and correction can be effected in a specified plane passing through a point of origin in the three-dimensional space in order to simplify the calculations. As an example, processing can be done in the a*b* plane shown in FIG. 8 or in a plane passing through the L* axis and which crosses the a*b* plane.

Figure 9A:
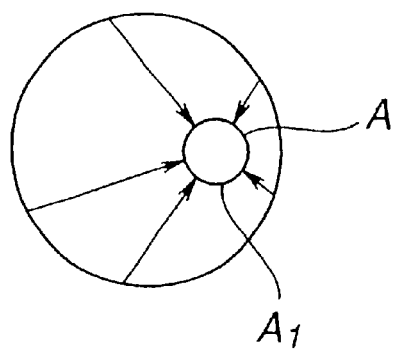
FIGS. 9A–9C are schematic diagrams illustrating a method for color conversion.
Figure 9B:
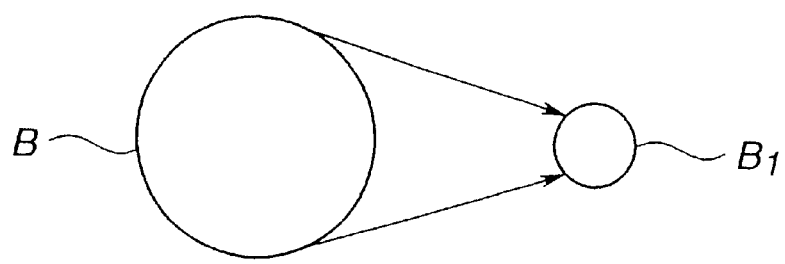
Figure 9C:
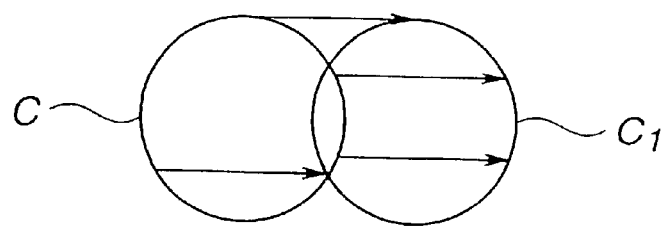

An illustrative conversion in the three-dimensional plane or in a two-dimensional plane is to convert a three-dimensional area or a two-dimensional area occupying a specified area and range of picture data inputted to the printing output processing unit 24 by a method schematically shown in FIG. 9. Specifically, there are a method for converting an original spatial area A into a spatial area A1 occupying its portion, as shown in FIG. 9a, a method for converting an original spatial area B into a spatial area B1 distinct from the area B, as shown in FIG. 9B, and a method for converting the original spatial area C into a spatial area C1 partially overlapping with the area C.

If the conversion to a preferred reproduction color etc is done in this manner in the printing output processing unit 24, the conversion is then from the uniform color space coordinate system to the coordinate system of the original coordinate data, usually the RGB system. Then, processing transfers to the next step.

It is also effective to execute the aforementioned preferred reproduction color processing in the conversion from RGB to CMYK executed in the printing output processing unit 24. Specifically, cessation of mixing the BK components into bright skin color may be recited as a preferred processing for beautiful representation of the skin color.

If the processing method or sequence in the conversion and correction processing in the printing output processing unit 24 as discussed above preferably can be rewritten since these can then be rewritten at the time of shipment from the plant depending on the particular destination of the printer device or subject to possible changes of the user. In addition, the method or the parameters can be changed with advantage at the option of the user responsive to changes with lapse of time.

Alternatively, plural conversion methods can be set in advance for selection depending on the conditions of use.

If special features are produced in the picture quality depending on input characteristics of the picture data in the picture data input unit 1, the variable parameters can be varied depending on these features.

The reciprocal relation among the data processing unit 5, display device processing unit 22, picture signal processing unit 23 and the printing output processing unit 24 is hereinafter explained. In these units, the conversion correction processing operations, possibly affecting the picture quality, as will be explained subsequently, are performed.

First, if picture data inputted via the picture inputting means 7, such as picture data interfacing unit 9 or film reading unit 11, is of input characteristics affecting the picture quality characteristic of the respective input means at the time of imaging or readout, the data processing unit 5 executes the processing depending on the input characteristics to cancel or alleviate the characteristics. If the input characteristics ultimately can be exploited at the time of printing on the recording medium or display on the display device 15 or on the external monitor, the data processing unit 5 effects the processing of conversion and correction of the input characteristics to moderate values. By parameter setting in the data processing unit 5, it is possible to change the contents of the processing to be executed and the ratio of the conversion and correction. If equivalent functions can be executed not only in the data processing unit 5 but also in the picture data interfacing unit 9 or in the film reading unit 11 when reading picture data from the external connection equipment 13, the functions include the conversion and correction processing. In this case, the functions can be executed by parameter setting at the time of reading picture data, for example, by gain setting when capturing signals from the photoelectric transducing element.

On the other hand, the display device processing unit 22 and the video signal processing unit 23 effect display characteristics conversion and correction, in accordance with display output characteristics of the display device 15 or the external monitor, so that the picture quality of the display output will be optimum for the user (viewer). The contents of the processing executed and the ratio of the conversion and correction may be rendered variable by setting the parameters affecting the picture quality. This processing may also be executed by setting an analog deriving unit to a display device etc to vary the amplification factor etc instead of by using digital data processing.

Moreover, the printing output processing unit 24 executes the processing of converting and correcting printing characteristics, depending on the printing characteristics of the printer head 25 for the recording medium, so that the picture quality of the display output will be optimum for the user (viewer). The contents of the processing executed and the processing sequence may be rendered variable by setting the parameters affecting the printing picture quality. Instead of executing the processing by digital data processing, the various settings may be rendered variable in an analog driving unit in the print head driving unit.

In determining the processing contents, processing sequence or parameter setting values in the input characteristics conversion and correction, display output characteristics conversion and correction and in printing output characteristics conversion and correction, the display output characteristics conversion and correction, prescribing the display picture quality, are set and varied, in accordance with the setting of printing characteristics prescribing the printing picture quality, while the display output characteristics conversion and correction, prescribing the display picture quality, are set and varied in accordance with changes in the setting of the printing characteristics. Also, the printing output characteristics conversion and correction, prescribing the printing picture quality in the picture printing unit, are set and varied, in accordance with the change in the setting of display characteristics prescribing the display picture quality, while the printing characteristics setting conversion and correction processing, prescribing the printing picture quality in the picture printing unit, are set in accordance with the change in the setting of display characteristics prescribing the display picture quality.

By setting and changing the display output characteristics and the printing characteristics in relation to each other for setting characteristics of the display device in accordance with, for example, the printing gamma characteristics or setting the display color reproduction characteristics in accordance with the printing color reproduction characteristics, the user (viewer) is able to recognize that the display picture on the display device 15 or on the external monitor is of the visually equivalent picture quality to the printed picture on the recording medium. If the display output characteristics or the printing characteristics are varied with changes in the element used or chronological changes, the setting of one of the characteristics can be varied by changing the setting of the other. If also the input characteristics of the picture data are taken into consideration, the display output characteristics or the printing characteristics can be maintained at optimum values, despite switching to a picture inputting means 7 having different input characteristics, on the condition that the printing output conversion and correction influencing the printing picture quality and/or the display output conversion and correction influencing the display output picture quality are set and varied in accordance with the input characteristics picture correction processing influencing the picture quality of the picture data. Thus, the user (viewer) can have the impression that the display picture in the display device 15 or the external monitor a and the printed picture on the recording medium are of visually equivalent picture quality.

Preferably, the various settings that can be changed can be inputted from external input means, such as the command device 8, at the time of shipment from a plant, and can also be inputted if, after shipment, characteristics have been changed significantly.

Preferably, the setting of printing characteristics in the picture printing unit 3 and the setting of display characteristics of display 15 and the external monitor are selected from a number of pre-assembled settings.

The picture printing unit 3 is mainly comprised of a print head driving unit 26 and the printer head 25. If a picture for printing is selected by user interface unit 28, and a printing command is issued, printing data processed with conversion and correction processing necessary for printing in the printing output processing unit 24 in the picture processing unit 6 is routed to the print head driving unit 26. The print head driving unit 26 converts the printing data into driving voltage, driving current and the driving waveform sufficient for driving the printer head 25 in accordance with the driving timing of the printer head 25 to output the converted printing data to the printer head 25.

Specifically, the operation of the print head driving unit 26 occurs in synchronism with the operation of the printing mechanism producing the printing operation of the printer head 25, movement of the printer head 25 and the recording medium, maintenance processing for the printer head 25 and with the ink supplying operation. There are occasions wherein, for effecting optimum printing in keeping with the environment status for printing, optimum correction is executed by an analog electric circuit configuration, based on the input from detection elements, such as temperature sensors. If this correction processing can be executed by digital processing, it may be executed in the printing output processing unit 24 in the picture processing unit 6. The print head driving unit 26 is constructed and operated in keeping with the types and the number of the printer head 25 in use and with the configuration of the printer mechanism.

The printer head 25 is responsible for actually emitting the recording ink on to the recording medium or depositing the recording toner on the recording medium for printing. The printer head may be enumerated by an ink jet printer head disclosed in Japanese Laying-Open Patent H-7-164656 or in Japanese Laying-Open Patent H-8-336990, in particular a flying recording material type printer head or a two-liquid mixing type printer head. Other examples of the printer head include a dye diffusion type thermal head, a picture forming portion of a laser beam printer and so forth. Of these, the flying recording material type printer head or the two-liquid mixing type printer head, capable of full-color half-tone recording, are preferred in that these printer heads can realize full-color printing to high picture quality. The line printer head and the serial printer head can be constructed depending on the width of the printer head. In the case of the line printer head, the printing time can be reduced because it suffices for the recording medium to be moved on one direction with respect to the line printer head. In the case of the serial printer head, the recording medium and the serial printer head need to be moved relative to each other in two directions.

In the present embodiment, the picture data input unit 1, picture processing unit 6, picture memory 20, command device 8, display 15 and the picture printing unit 3 are constructed unitarily to constitute a main body portion 21. Alternatively, the picture inputting means 7 of the picture data input unit 1 may be isolated from the main body portion 21. For example, the film reading unit 11 may be connected to the main body portion by a bidirectional interface. If, in this case, the signals from the photoelectric transducing element or control signals of the read-out mechanism are transmitted/received in two directions, the function equivalent to that in case the film reading unit 11 is assembled into the main body portion 21 can be achieved. In this case, a universal interface, such as IEEE-1394, may be used as the interface. By using this universal interface, transmission/reception with other picture input units 7 via this interface may be realized if the other picture inputting means 7 is used in place of the film reading unit 11 and the software configuration controlling the communication therebetween is used.

If the picture inputting means 7 is provided in isolation from the main body portion 21 to permit separation from the main body portion 21, it becomes possible to connect only the required portions of the picture input unit 7 to the main body portion 21 to permit size reduction of the printer device and saving in the mounting space.

The display device 15, assembled into the main body portion 21, is preferably movable on the main body portion 21. For example, the display device 15 is preferably held on the casing-like main body portion 21 via a support for rotation within a pre-set range to assure facilitated viewing and recognition by the user. The display device 15 may be mounted in isolation from the main body portion 21 and preferably has a physical or electrical coupling mechanism with respect to the main body portion 21 to permit viewing and recognition by the user even from remote places. That is, since the picture characteristics, such as color tones, of the displayed picture on the display device 15 are susceptible to ambient environments, the display device 15 is preferably mounted for movement on the main body portion 21 or in isolation therefrom to facilitate viewing and recognition under a condition in which the display device 15 is less susceptible to ambient environments.

The command device 8 may also be arranged separate from the main body portion 21 in which case the user is able to actuate the printer device from remote locations.

For printing by the printer head, the following operation, for example, is performed. First, for prompting the user to input a picture, user interface unit 28 causes the display device 15 and/or the external monitor to display icons which will permit the user to select the particular picture input means 7 to be used to input picture data. The user accordingly selects the particular portion of the picture input means 7 to be accessed, using the command device 8, in order to capture a picture desired to be printed. If the computer interfacing unit 12 is selected, selection may be made using the host computer 19 in place of the command device 8. The selected picture input means 7 then converts the externally inputted accessible digital picture data and/or analog picture signals by analog/digital conversion into first digital picture data which is routed via picture data input/output unit 27 to the picture processing unit 6.

The aforementioned first digital picture data are inputted to the data processing unit 5 in the picture processing unit 6 where picture data is stored, if necessary, in the picture memory 20. If the first digital picture data is not of ideal picture quality characteristics, the data is corrected for improving the picture quality of the display picture on display 15 or on the external monitor or the picture quality of the picture printed by the picture printing unit 3. If the first digital picture data is of specified picture characteristics, it is corrected or otherwise processed for improving the picture quality.

The picture data, corrected as described above, is output to display 15 or to the external monitor to display the picture. If there are plural picture data that can have access to the picture data input unit 1, these picture data may be displayed on the display device 15 or on the external monitor via picture data input unit 1 and picture processing unit 6 to prompt the user to select the picture data he or she is interested in under control by the user interface unit 28. If a picture is selected, and if the picture data selected by the picture memory 20 have not been inputted, the picture data input unit 1 is accessed to capture the picture data into the picture processing unit 6.

The user interface unit 28 then inquires the user if he or she performs editing and working on the selected picture. If the user desires the processing, execution of the processing is selected to execute the necessary processing to generate the second digital picture data in the picture processing unit 6.

If, after the completion of the totality of the desired processing operations, the user selects the execution of printing under control by the user interface unit 28, the processing for conversion to the preferred reproduction color of the edited and worked second digital picture data and the printing and outputting the picture of the preferred reproduction color are executed in the picture processing unit 6 to generate third digital picture data which then are converted to printing data. The printer head 25 then is driven by the print head driving unit 26 of the picture printing unit 3 to print a picture corresponding to the printing data. During the printing, the recording operation by the printer head 25 and the operation of the recording medium are performed in synchronism with each other.

The present printer device is configured for correcting the setting of display output characteristics prescribing the printing picture quality in display 15 and the external monitor in accordance with the printing picture quality in the picture printing unit 3 or correcting the setting of the printing characteristics prescribing the printing picture quality in the picture printing unit 3 in keeping with the setting of the display output characteristics in accordance with the setting of the display output characteristics prescribing the display picture quality of the displayed picture, by the characteristics correction unit 4, so that the printed picture by the picture printing unit 3 will be perceived as visually equivalent to the displayed picture, as discussed previously.

The processing in accordance with characteristics of picture data, the processing for displaying a picture on a picture display outputting unit with the visually equivalent picture quality as the printed picture by the picture printing unit, the contents and sequence of the processing for converting the picture into the preferred reproduction color and printing the resulting picture, and the variable parameters, are set and saved at the outset or for each change.

FIG. 10 shows a circuit configuration of a printer device of the present embodiment. The circuit configuration is similar to the configuration shown in FIG. 5 and includes an external connection equipment 13, picture input means 7, a picture data input/output unit 27, a picture processing unit 6, a display 15, output port 16, a command device 8 and a picture printing unit 3. Specifically, the picture input means 7 includes a picture data interface circuit 39, a removable medium driving device 40, a film reading unit 41 and a computer interfacing unit 42, while the picture data input/output unit 27 is arranged as a picture data input/output circuit 31.

The picture processing unit 6 is arranged as a data processing circuit 36 having, internally, a data processing unit, a display device processing unit, a video signal processing unit and a printing output processing unit.

The command device 8 includes plural keys 38a, arranged on the present printer device to permit inputting by the user, a pen-touch input device 38b, as a pen-like tapered input device, formed on a liquid crystal monitor 45a arranged as the display device 15, to permit inputting by the user, and a command device interfacing circuit 38c to permit inputting to a circuit corresponding to the user interface unit 28 as later explained. This command device interfacing circuit 38c, adapted to prevent mistaken input attributable to a chattering phenomenon etc, deems that, if the same portion of the key 38a or the pen-touch input device 38b is thrust continuously for a pre-set time, the operation has been done plural times, and transmits an input to the circuit corresponding to the user interface unit 28 by the same plural times.

For display 15, there is provided the liquid crystal monitor 45a, while there is also provided a display device output circuit 45b, to which picture data in the picture memory 20 is transferred and which synthesizes a menu picture frame displayed on the liquid crystal monitor 45a and an operating display picture frame for the pen-touch input device, based on the transferred picture data and a display control signal from the circuit corresponding to the user interface unit 28, for conversion into driving signals that can be displayed on the liquid crystal monitor 45a.

There is also provided a picture signal outputting circuit 46 which, based on the transferred picture data and a display control signal from the circuit corresponding to the user interface unit 28, synthesizes a menu picture frame displayed on the external monitor and a operating display picture frame for the pen-touch input device, for conversion to standard picture signals that can be displayed on the external monitor, such as NTSC signal. In this case, the picture displayed on the liquid crystal monitor 45a and the picture displayed on the external monitor may be the same or distinct from each other.

There are also provided a print head driving circuit 56 and a printer head 25, as the picture printing unit 3. There is also provided a print output mechanism control circuit 47 which, based on mechanical control signals from the software by a system control CPU 61, configured for performing comprehensive control of a mechanism required for forming a printed picture on a recording medium, such as a recording sheet, with the aid of the printer head 25, drives various motors, clutches or head maintenance mechanisms, accepts the input from various sensors used for detecting the movement of the recording medium and the printer head, drives the mechanism required for printing, such as advising the system control CPU 61 of the input reception, and detects the driving state.

The printer device also includes the above-mentioned system control CPU 61 employing a working RAM 64 by the control software in the system ROM 62 or the flash memory 63. This system control CPU 61 performs the comprehensive control of the entire printer device and operates as a circuit corresponding to the aforementioned user interface unit 28.

Therefore, the aforementioned respective units or circuits are interconnected by a system control bus 65, to which are also connected the picture data input/output circuit 31, data processing circuit 36, command device interfacing circuit 38c, display device output circuit 45b, picture signal outputting circuit 46, print output mechanism control circuit 47 and the picture printing unit 3. Of these, the picture data input/output circuit 31, data processing circuit 36, display device output circuit 45b, picture signal outputting circuit 46 and the picture printing unit 3 are also connected to a picture data bus 66 of the picture memory 20.

The control software in the flash memory 63 can be exchanged from the removable medium driving device 40 or the computer interfacing unit 42 via the picture data input/output circuit 31.

If a control software is uniquely required for the operation of the data processing circuit an 36, and there lacks the ROM or the non-volatile memory in the data processing circuit 36, the software required in the data processing circuit 36 may be configured to be transferred from the system ROM 62 or the flash memory 63 to the data processing circuit 36. It is preferred in this case to input the software required in the data processing circuit 36 from the removable medium driving device 40 and the computer interfacing unit 42 for storage transiently in the flash memory 63 or in the working RAM 64 for subsequent transfer to the data processing circuit 36.

There are the following types of control executed by the system control CPU 61 by the control software in the system ROM 62 or in the flash memory 63. First, there is the comprehensive control of the printer device. Other types of control include, for example, driving control for the picture data interfacing circuit 39, removable medium driving device 40, film reading unit 41 and the computer interfacing unit 42 via the picture data input/output circuit 31, control on handling of input picture data and editing, working, synthesis and correction for picture data entered under the above-mentioned driving control, picture display control on the liquid crystal monitor 45a and on the external monitor, user interface control for controlling the input of an operational command from the pen-touch input device 38b and the output to the liquid crystal monitor 45a and to the outside monitor, comprehensive control of the picture printing unit 3 by the control of the print head driving circuit 56, printer head 25 or the print output mechanism control circuit 47, and other auxiliary control operations. In particular, in the present printer device, there is a control of inputting program file and/or the parameter data from the picture data interfacing circuit 39, removable medium driving device 40 and the computer interfacing unit 42 via the picture data input/output circuit 31 to store and save the program file and/or the parameter data in the flash memory 63.

It is seen from the above that, in the mechanism control software by the system control CPU 61 and the print output mechanism control circuit 47, if the configuration and the operating method of the printer head 25, such as the line head or the serial head or the operating method for the recording medium, are changed, the software contents and the circuit contents are changed. Stated differently, the control software and the control circuit are determined by the mechanical structure of the printer head 25.

Also, the flash memory 63, corresponding to the non-volatile storage unit 29 in FIG. 5, is adapted to hold the inner data even if the power source of the present printer device is turned off, and may be comprised of an S-RAM or a NOV-RAM backed up by batteries. Alternatively, the inner data may be receded, when turning off the power source of the present printer device, to a removable medium inserted into the removable medium driving device 40 or to other non-volatile storage sites, with the receded inner data being read for execution when turning on the power source. The flash memory 63 is assumed to be outside the data processing circuit 36 in FIG. 10 for convenience.

By so doing, the function of updating, changing and supplementing the operational contents and sequence of the printer device of the present invention via the user interface unit may be implemented in addition to the function provided in the data processing circuit 36, that is the function of correcting the printed picture of the picture printing unit 3 and the displayed picture on the picture display output unit so that these will be perceived as being of equivalent picture quality, and the function of executing the processing of editing, working, synthesis, correction and conversion as desired by the user.

If, in addition to the control software inputted from the picture data input unit, the control software for other than the picture processing portion of the present printer device is inputted and stored in the flash memory 63, it is possible to update, change or supplement the entire functions of the present printer device.

For printing, the following control is performed. The picture data or picture signals, inputted from the external connection equipment 13 in FIG. 10, are converted by the picture data interfacing circuit 39, removable medium driving device 40, film reading unit 41 and the computer interfacing unit 42, corresponding to the picture input means 7, into first digital picture data, which are inputted to the picture data input/output circuit 31 corresponding to the picture data input/output unit 27.

The first digital picture data are then routed via picture data bus 66 to the data processing circuit 36 under control by the input/output control signals from the system control bus 65. The system control CPU 61, of course, is controlling the timing etc.

The data processing circuit 36 performs pre-set processing to produce second digital picture data, which is stored, if necessary, in the picture memory 20. In this case, pre-set processing signals are routed from the key 38a or the pen-touch input device 38b via the command device interfacing circuit 38c to the data processing circuit 36. The system control CPU 61, of course, is gain controlling the timing etc.

The second digital picture data, processed in a pre-set fashion by the data processing circuit 36, is routed to the display device output circuit 45b, picture signal outputting circuit 46 and to the print head driving circuit 56 for displaying or printing a picture. It is noted that the system control CPU 61 again is controlling the timing etc. while the respective devices discussed so far are also performing their respective functions.

Figure 11:
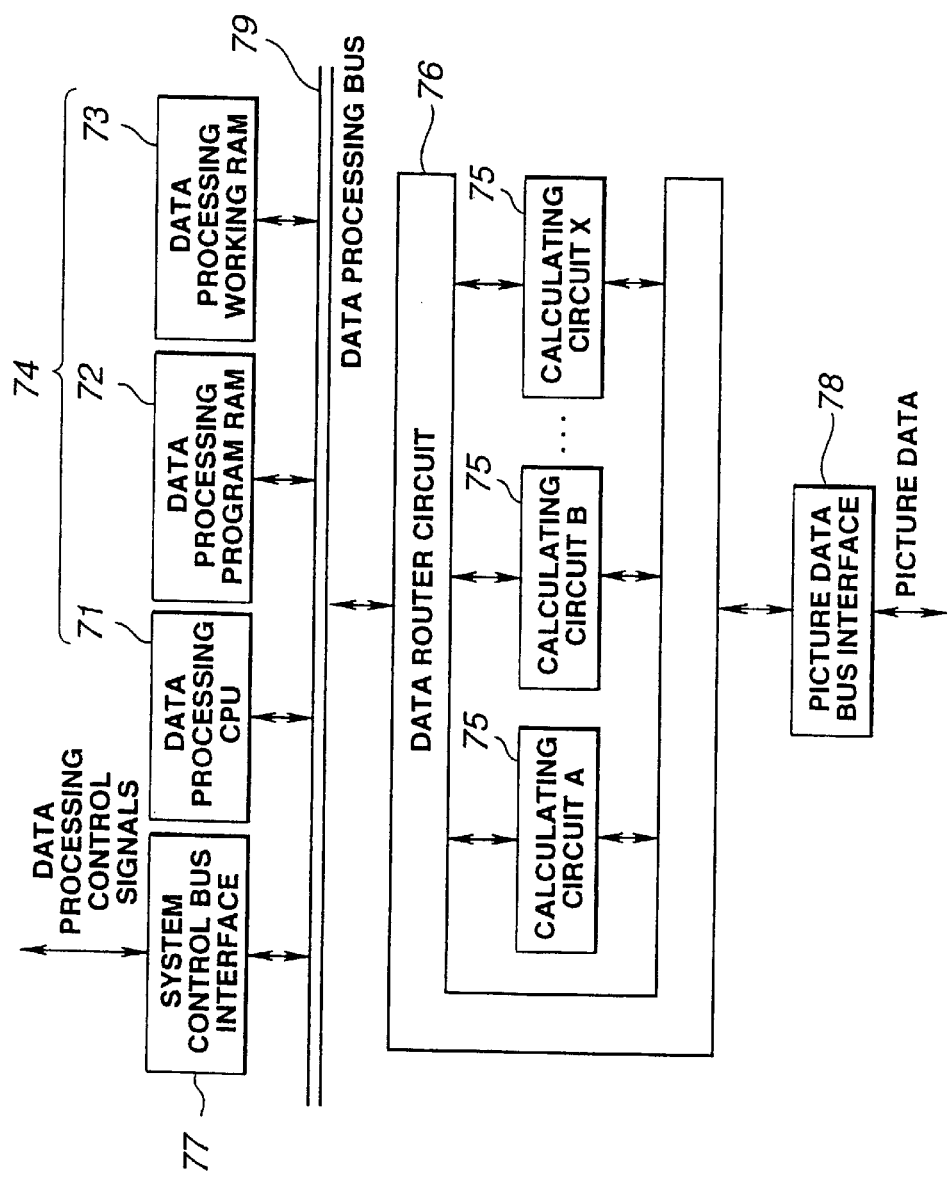
FIG. 11 is a circuit diagram showing an embodiment of a data processing circuit of a printer device according to the present invention.

A specified embodiment of the above-described data processing circuit 36 is hereinafter explained. A first embodiment is shown in FIG. 11. That is, the data processing circuit uniquely includes a data processing control system 74, plural calculating circuits 75, each having the function of picture data calculating units, and a data router circuit 76 operating as a picture data transfer unit for routing the data to the calculating circuits 75 and for controlling the destination of routing the data outputted by the calculating circuits 75. The data processing control system 74 is mainly constituted by a data processing CPU 71, a data processing program RAM 72 and a data processing working RAM 73 and operates as a controller for controlling the calculating circuits 75, operating as picture data calculating units. The data router circuit 76 is controlled by the data processing control system 74. The control from the system control CPU 61 shown in FIG. 6 is accepted by a system control bus interface 7. The data processing control system 74, data router circuit 76 and the system control bus interface 77 are interconnected by a data processing bus 79. The data processing circuit 36 also includes a picture data interface 78 for data inputting/outputting between the picture data bus 66 connected to the picture memory 70 as shown in FIG. 10 and the data router circuit 76. The picture data interface 78 is controlled by the data processing control system 74 via data router circuit 76.

That is, the control from the system control CPU 61 is accepted by the control bus interface 77 and transmitted to the data processing CPU 71, from which the information such as that the operating state is routed from the data processing CPU 71 to the system control CPU 61. The above-described data processing circuit executes the data processing in the following sequence. The operation in which data processing is executed on picture data held in the picture memory 20 and again stored in the picture memory 20 is now explained.

First, the control software to be executed (data processing software) is transferred from the flash memory 63 or the system ROM 62 in the system control CPU 61 via the system control bus interface 77 to the data processing program RAM 72. That is, the flash memory 63 or the system ROM 62 of the system control CPU 61 operates as a non-volatile memory for storing and saving the contents of the control software in the controller adapted to control the picture data calculating units.

The specified transfer timing may be start-up time when the power is turned on, before the first digital picture data starts to be processed in the picture processing unit or when a command is inputted by inputting means. A specified example of the command input timing by the input means is the time when the processing executed by the data processing circuit 36 is selected by e.g., the pen-touch input device 38b subject to a user command. If there is no control software (data processing software) for execution in the data processing program RAM 72 of the data processing control system 74 operating as a controller, or if the control software (data processing software) is to be changed, the above transfer can be executed to change the contents of the control software (data processing software).

The system control CPU 61 commands the data processing CPU 71 to start the execution of data processing via system control bus interface 77. The data processing CPU 71 determines the function of execution of the calculating circuits 75, based on the transferred control software (data processing software), while also determining the input/output to the calculating circuits 75 executed in the data router circuit 76 operating as a picture data transfer unit and the input/output sequence of the input/output for the picture data interface 78.

When the specified processing is started, the data processing CPU 71 reads out the picture data for processing, stored in the picture memory 20, via picture data interface 78, based on the transferred control software (data processing software), to input the read-out picture data in a specified one of the calculating circuits 75 via data router circuit 76. The calculating circuits 75 execute the data processing on the input picture data, based on the control software (data processing software) to write the resulting picture data in the picture memory 20 via the data router circuit 76 and the picture data interface 78.

That is, the editing, working, synthesizing, correcting and converting processing operations, executed by the plural calculating circuits 75, are executed responsive to the original functions of the originally stored software, or, to subsequently updated, rewritten or supplemented functions, namely the control software inputted by the picture data input unit 1.

The control software (data processing software) can also control the functions of the display device processing unit 22, picture signal processing unit 23 and the printing output processing unit 24.

If the next calculations are to be made in succession, picture data are inputted via the data router circuit 76 to the next specified calculating circuit 75. By sequentially reading out picture data in the picture memory 20 to execute the calculation processing to write the resulting data as picture data in the picture memory 20, data processing is executed in accordance with the control software (data processing software).

During processing of picture data or after the end of the processing of the totality of picture data, the data processing CPU 71 apprises the system control CPU 61 of the processing state or the resultant state via the system control bus interface 77 to enable the system control CPU 61 to comprehend the process and the result of the data processing being executed. The data processing working RAM 73 is used for holding data processing parameters routed from the system control CPU 61 and for holding the operating states of the data processing CPU 71.

The plural calculating circuits 75, operating as the picture data calculation means, are used differently in the following manner.

For example, it suffices if the plural calculating circuits 75 perform the same operations, respective pre-set ranges of the calculating circuits 75 and the first digital picture data are associated with each other and if the respective pre-set ranges of the first digital picture data are processed identically by the associated respective calculating circuits 75.

Also, it suffices if the plural calculating circuits 75 perform different operations, respective pre-set ranges of the calculating circuits 75 and the first digital picture data are associated with each other and if the respective pre-set ranges of the first digital picture data are processed differentially by the associated respective calculating circuits 75.

In these cases, it suffices if the above pre-set ranges are not less than one row or not less than one column, a range specified by a block in the first digital picture data or a range determined by the picture contents in the first digital picture data.

For example, if the respective calculating circuits 75 perform the same processing, and the pre-set range corresponds to one row or one column in the first digital picture data, it suffices if the processing of the row or column of the first digital picture data is executed by a calculating circuit A of the plural calculating circuits 75, while the processing of the row or column of the second digital picture data is executed by a calculating circuit B of the plural calculating circuits 75.

For example, if the respective calculating circuits 75 perform different processing, and the pre-set range is a range determined by the picture contents of the first digital picture data, it suffices if the a picture pattern in a picture is deciphered and a specified picture pattern is processed by a calculating circuit A of the plural calculating circuits 75, while the processing of the remaining portions is executed by a calculating circuit B of the plural calculating circuits 75.

For example, if the respective calculating circuits 75 perform different processings, and the pre-set range is the range determined by picture contents in the data of the first digital picture data, it suffices if a left side one-third portion of a picture pattern in the picture is processed by a calculating circuit A, the center one-third portion of the picture pattern in the picture is processed by a calculating circuit B and a right side one-third portion of a picture pattern in the picture is processed by a calculating circuit C.

In this case, required processing operations are executed simultaneously by the plural calculating circuits 75, thus reducing the time required for effecting pre-set processing on the picture data.

If the required processing operations are executed in this manner simultaneously by the plural calculating circuits 75, and the processing results are displayed for the respective ranges associated with the calculating circuits 75, the processing results can be checked from plural points, thus facilitating the ascertainment of the user.

Also, in the present printer device, the calculating circuits 75 may perform different processing operations, while the respective calculating circuits 75 may perform different processing operations sequentially on the entire data of the first digital picture data.

By so doing, the sole picture data read out from the picture memory are processed a plural number of times in order to perform different plural processing operations, thus decreasing the number of accessing operations to the picture memory to reduce the time required in the pre-set processing operations.

Thus, the time which elapses since the user issues an operation start-up command until the end of the operation is reduced to reduce the time during which the user is kept waiting.

In the present printer device, if the processing contents of the plural calculating circuits 75 can be changed between the above-mentioned respective patterns, and an optimum pattern is used depending on the processing contents for the picture data, the overall processing time is advantageously reduced.

Although the foregoing embodiment is configured so that the calculating circuits 75 operate in concert, it is also possible for the calculating circuits 75 to perform respectively different processing operations.

For example, if suffices if the calculating circuit A of the calculating circuits 75 performs correction so that the printed picture printed by the picture printing unit will be of visually equivalent picture quality as the picture displayed on the display/monitor, and if the calculating circuit A of the calculating circuits 75 performs processing operations, such as editing, working, synthesis, correction or conversion, as desired by the user, in accordance with the user command.

Also, it is possible for the calculating circuit A of the calculating circuits 75 to perform printing and outputting for a picture and for the calculating circuit B of the calculating circuits 75 to perform processing operations, such as editing, working, synthesis, correction or conversion, as desired by the user, in accordance with the user command.

It is also possible for a certain number of plural calculating circuits 75 to be operated in a correlated fashion, with the remaining circuits performing respective independent processing operations.

The methods for using these calculating circuits 75 may be determined from the outset, or may be varied by setting by a data processing program of a control software (data processing software). The number of the calculating circuits 75, connected parallel to one another, may be suitably selected and set depending on the required processing speed, complexity in processing, size of picture data and the scale of the circuitry constituting the respective calculating circuits 75.

If a variable number of the calculating circuits 75 is used as picture data calculating units, it suffices if the number of the calculating circuits 75 is set depending on the extent of the targeted processing contents, such that it becomes possible to offer high-grade, medium-grade and low-grade printing device types to the market.

Figure 12:
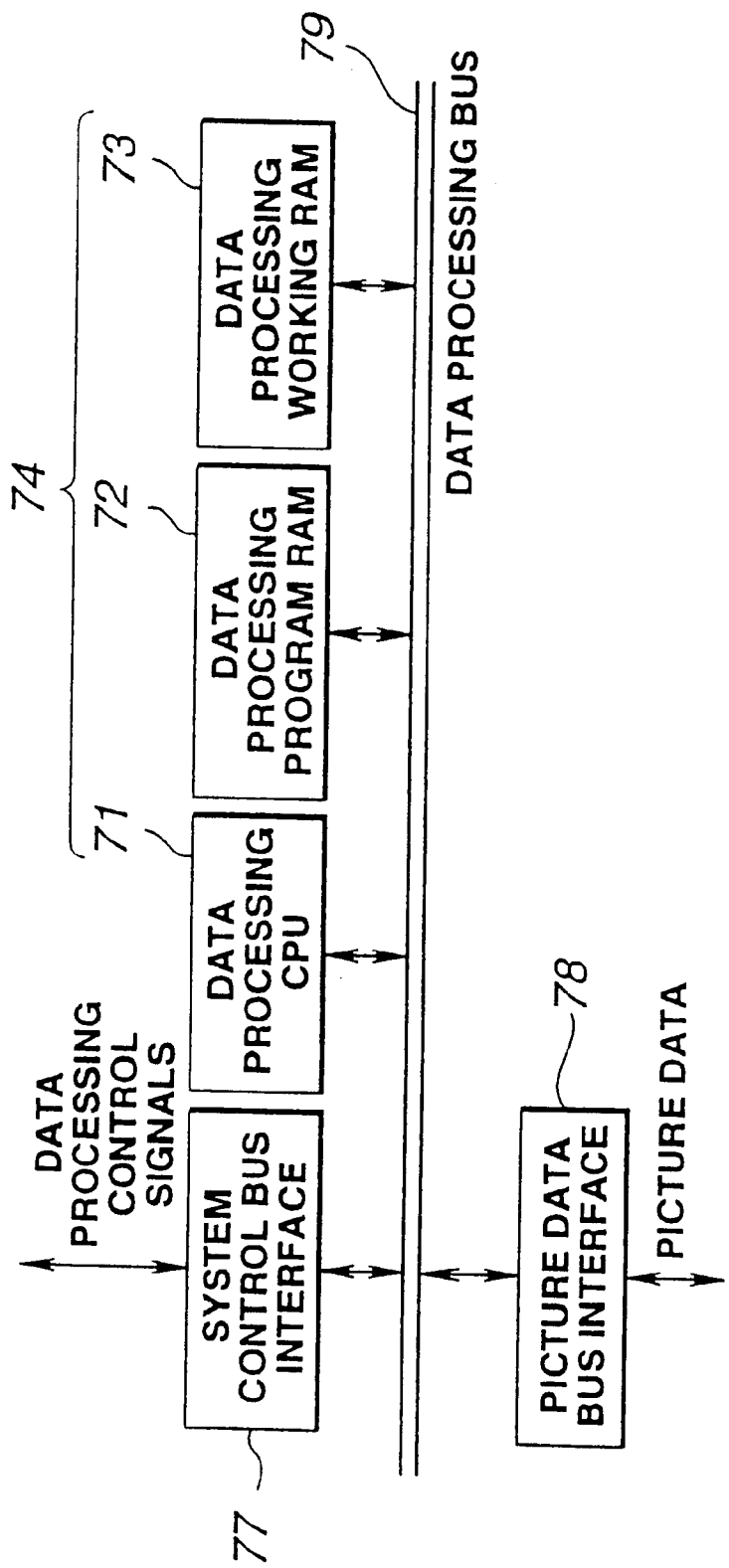
FIG. 12 is a circuit diagram showing another example of a data processing circuit of a printer device according to the present invention.

The data processing circuit may be configured as shown in FIG. 12. The data processing circuit, shown in FIG. 12, is similar to the circuit of FIG. 11 less the calculating circuits 75 and the data router circuit 76 and hence the same reference numerals are used to depict similar parts and the corresponding description is omitted.

However, as the data processing CPU 71, a device which enables high-speed processing is used. Thus, a DSP, RISC CPU or a dedicated data processing CPU is used. In this data processing circuit, the data processing CPU 71 operates as the picture data calculation unit and as picture data transfer unit. That is, if the control software (data processing software) is time-divisionally multiplexed, a pseudo-operation similar to that of plural calculating circuits 75 shown in FIG. 11 may be executed.

Figure 13:
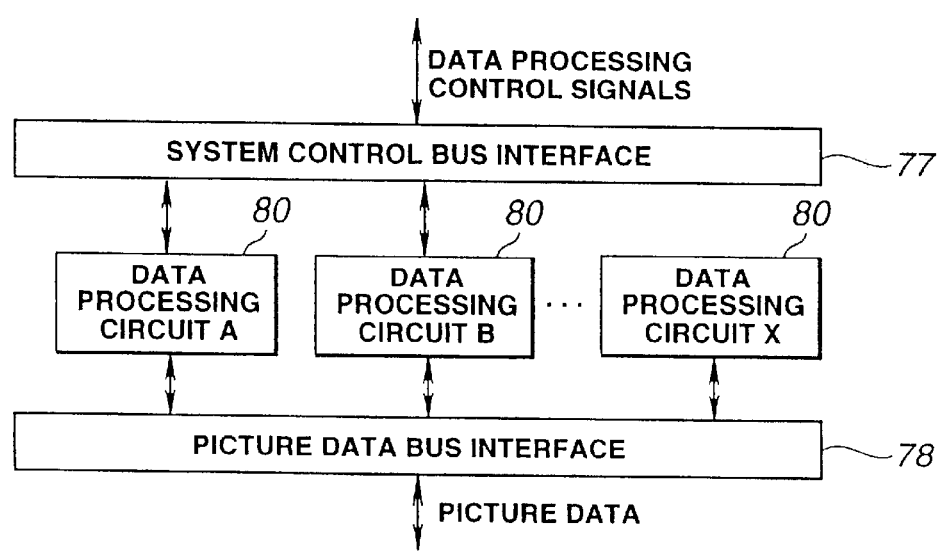
FIG. 13 is a circuit diagram showing still another example of a data processing circuit of a printer device according to the present invention.

FIG. 13 shows another embodiment of the data processing circuit. In FIG. 13, plural data processing circuits 80 are arranged parallel to one another, and are connected via system control bus interface 77 to a control system for the entire device including the system control CPU 61, while being connected via the picture data interface 78 to the picture data bus 66. Each data processing circuit 80 may be constituted by a dedicated calculation circuit, by a universal calculating circuit and a universal calculation control circuit, or solely by a universal calculation control circuit. The control software by the system control CPU 61 is transferred via system control bus interface 77 to each data processing circuit 80 to cause the data processing to be executed on the picture data in the picture memory 20. That is, the plural data processing circuits 80 operate as the picture data calculating units and as picture data transfer units. Each data processing circuit 80 may be configured to perform the same or different processing operations depending on the data arranging manner as in the case of the calculating circuits 75 shown in FIG. 11.

The control software in the flash memory 63 can be exchanged by inputting via the picture data input/output circuit 31 from the picture data interfacing circuit 39, removable medium driving device 40, film reading unit 41 and the computer interfacing unit 42, as discussed previously. In this case, the control software may be inputted from outside by controlling the picture data input/output circuit 31, picture data interfacing circuit 39, removable medium driving device 40, film reading unit 41 and the computer interfacing unit 42, by the control program stored and held in the system control CPU 61, and the control program of the program loading unit stored and held in the system ROM 62 and in the flash memory 63.

In this case, the control program of the program loading unit is arranged to be unalterable, or the change priority sequence of the control program of the program loading unit is arranged to be lower than the change sequence of other software.

Specifically, the control program of the program loading unit is arranged to be altered only by changing the program ROM. Alternatively, the control program is arranged to be changed by being rewritten or updated only on setting and inputting a password, or only on performing a specified setting, such as manufacturer, service or supervisor setting.

By so doing, it is possible to prevent the control program of the program loading unit from being damaged during reading of an external control software.

Also, the program file and/or the parameter data can be inputted from the program data input unit via the picture data input/output circuit 31, picture data interfacing circuit 39, removable medium driving device 40, film reading unit 41 and computer interfacing unit 42.

It is possible in this case to control the picture data input/output circuit 31, picture data interfacing circuit 39, removable medium driving device 40, film reading unit 41 and computer interfacing unit 42 by the control program of the program loading unit stored and held in the system control CPU 61, system ROM 62 or in the flash memory 63 to input the program file and/or the parameter data from outside.

In this case, the control program of the program loading unit is arranged to be unalterable, or the change priority sequence of the control program of the program loading unit is arranged to be lower than the change sequence of the program file and/or the parameter data.

Specifically, the control program of the program loading unit is arranged to be altered only by changing the program ROM. Alternatively, the control program is arranged to be changed by being rewritten or updated only on setting and inputting a password, or only on performing a specified setting, such as manufacturer, service or supervisor setting.

By so doing, it is possible to prevent the control program of the program loading unit from being damaged during reading of a control software from outside.

Moreover, in the printer device of the present invention, it is desirable that the format for the program file and that for the parameter data are unified into a common format and that a discriminating indicia is provided in the common format for distinguishing the program file from the parameter data.

More specifically, it is desirable that the format for the program file and that for the parameter data are unified into a common format and that the discriminating indicia (ID) is provided in a predetermined portion in the common format for distinguishing the program file from the parameter data.

By so doing, in actual inputting in accordance with the control program of the program loading unit of the aforementioned program data input unit, it can be judged whether the input file or data is the program file or the parameter data, or for which function the updating, rewriting or addition is to be made, if the ID of the common format is first checked, such that the file or data can be assembled into an optimum portion for execution in the present printer device.

Moreover, in the present printer device, in controlling the characteristics correction unit 4 and/or the picture processing unit 6 and/or the command device 8 as input means based on the program file and/or the parameter data inputted via the program data input unit or stored and held in the non-volatile storage unit 29, the starting/terminating method for the program file and the accessing information are preferably unified, whereby the program file can be executed by the printer device of the present invention. Moreover, since the parameter data are unified in the form of description, it is possible to effect the processing of the present printer device based on each program file by occasionally having reference to the respective parameter data.

In addition, it is possible to develop the program file or the parameter data easily even if the user is not informed of the pertinence to other portions of the present printer device, such that these can be inputted from the picture data input unit to carry out the functions of the present printer device.

Therefore, if the starting and terminating methods of the program file of the present printer device and the accessing information are disclosed, it is possible for the user to develop the program file or the parameter data easily.

Also, if the program file or the parameter data are stored, and a recording medium to which inputting may be made from a program data inputting unit is furnished, the functions of the present printer device can be updated, changed or supplemented easily.

Figure 1:
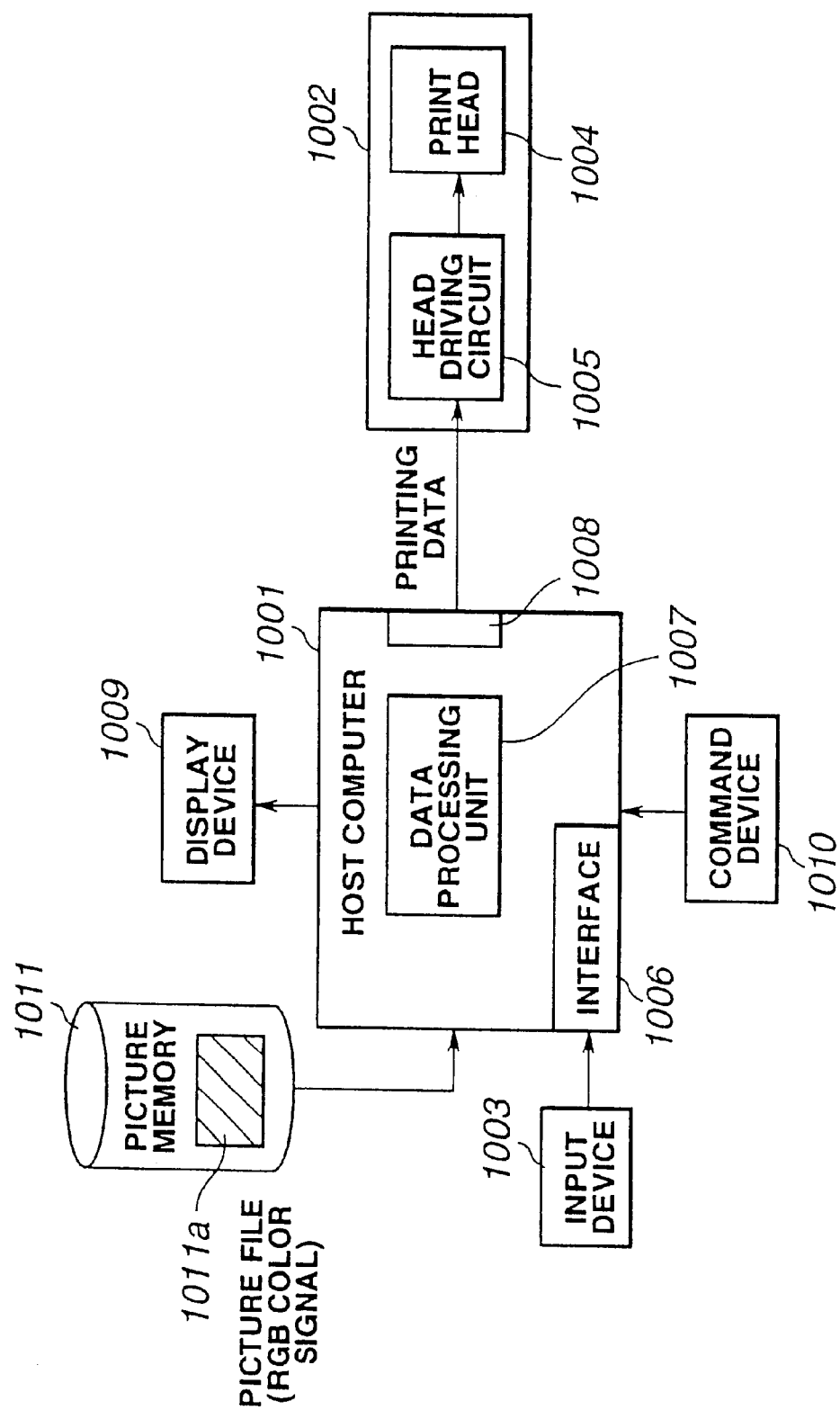
FIG. 1 schematically illustrates a conventional system and method for printing picture data.
Figure 2:
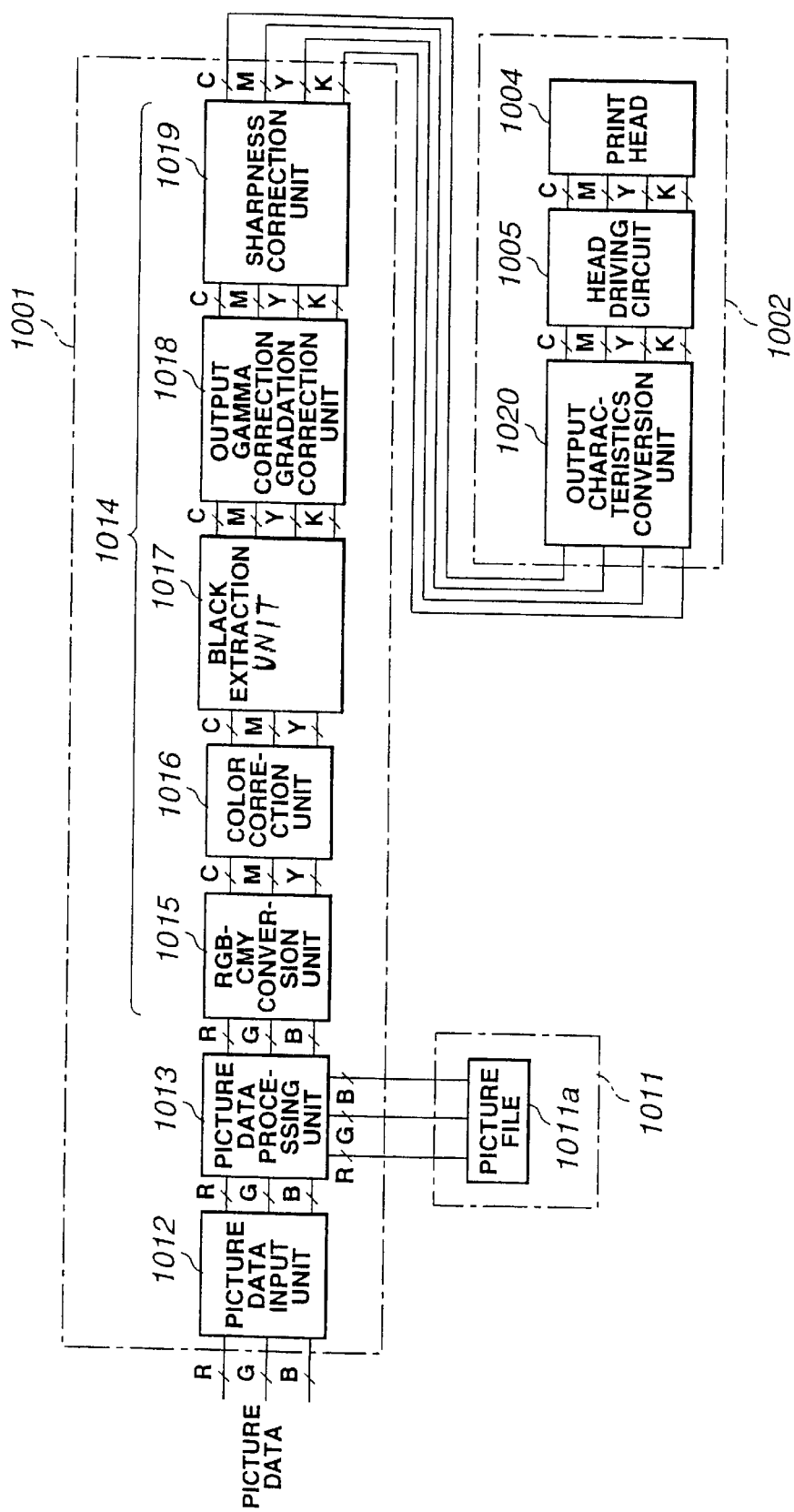
FIG. 2 is a diagram illustrating data flow in a conventional picture data printing method.
Figure 3:
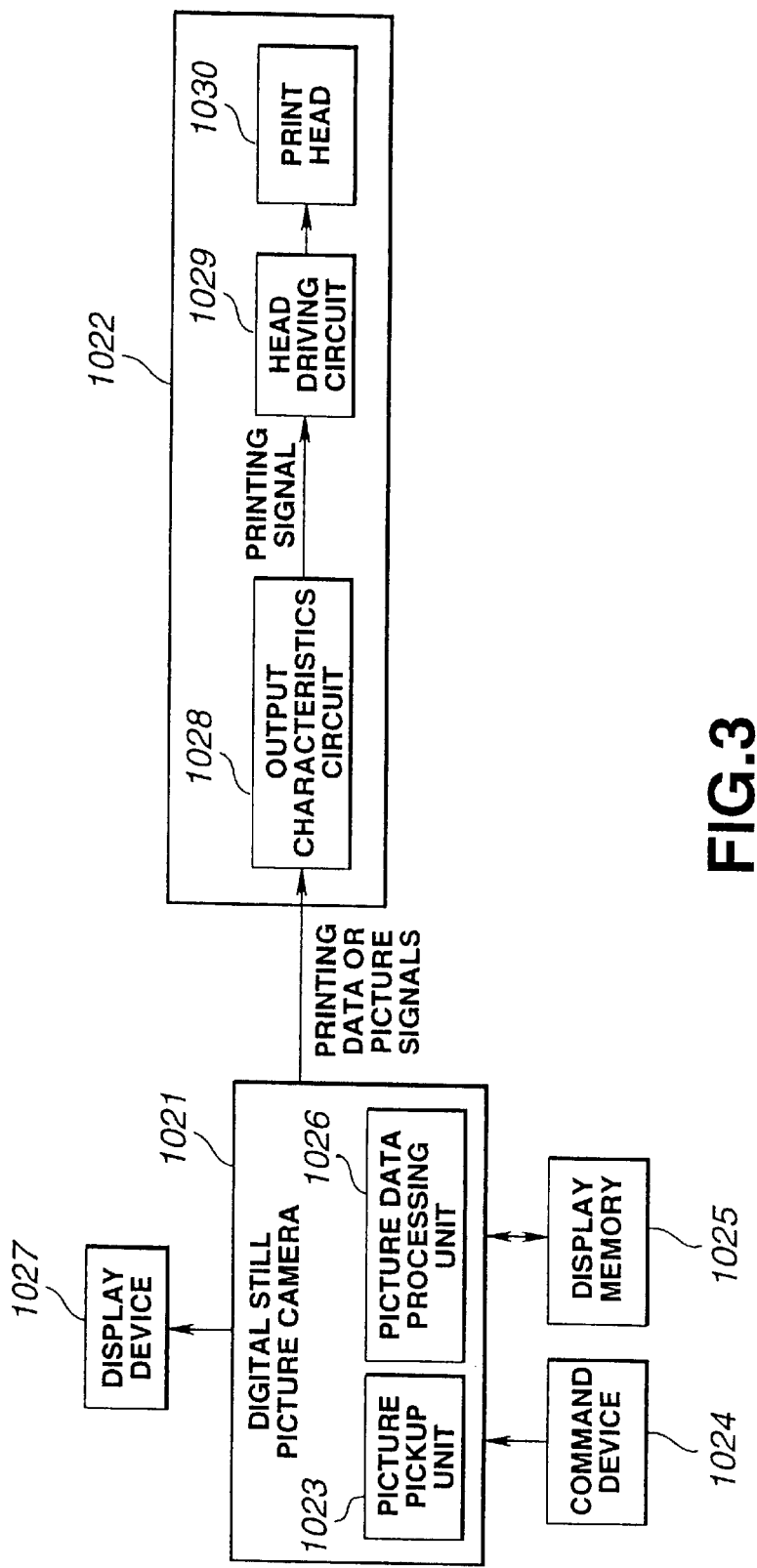
FIG. 3 is a block diagram illustrating another example of a conventional picture data printing method.
Figure 4:
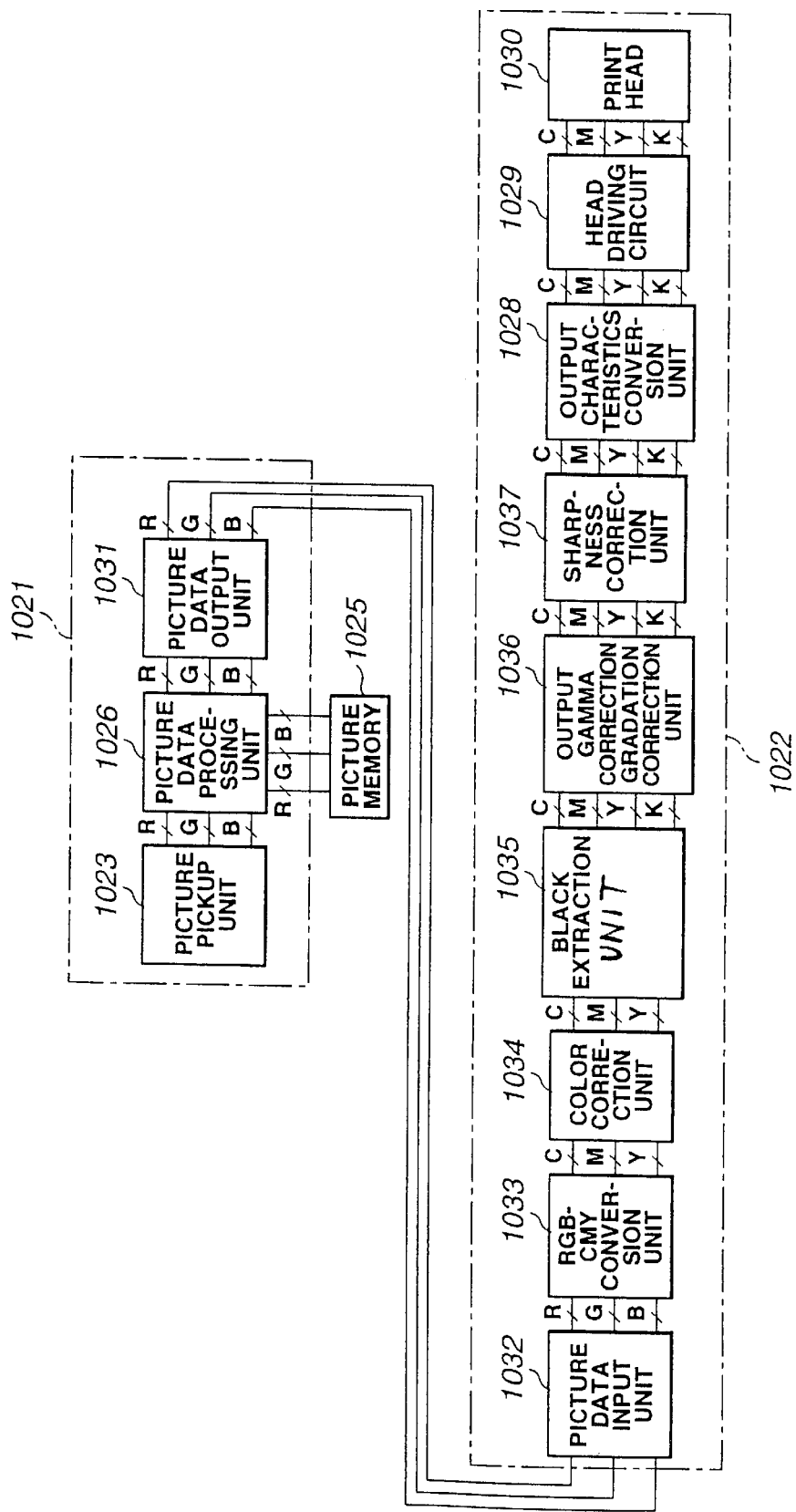
FIG. 4 is a block diagram showing still another example of the conventional picture data printing method.
Figure 14:
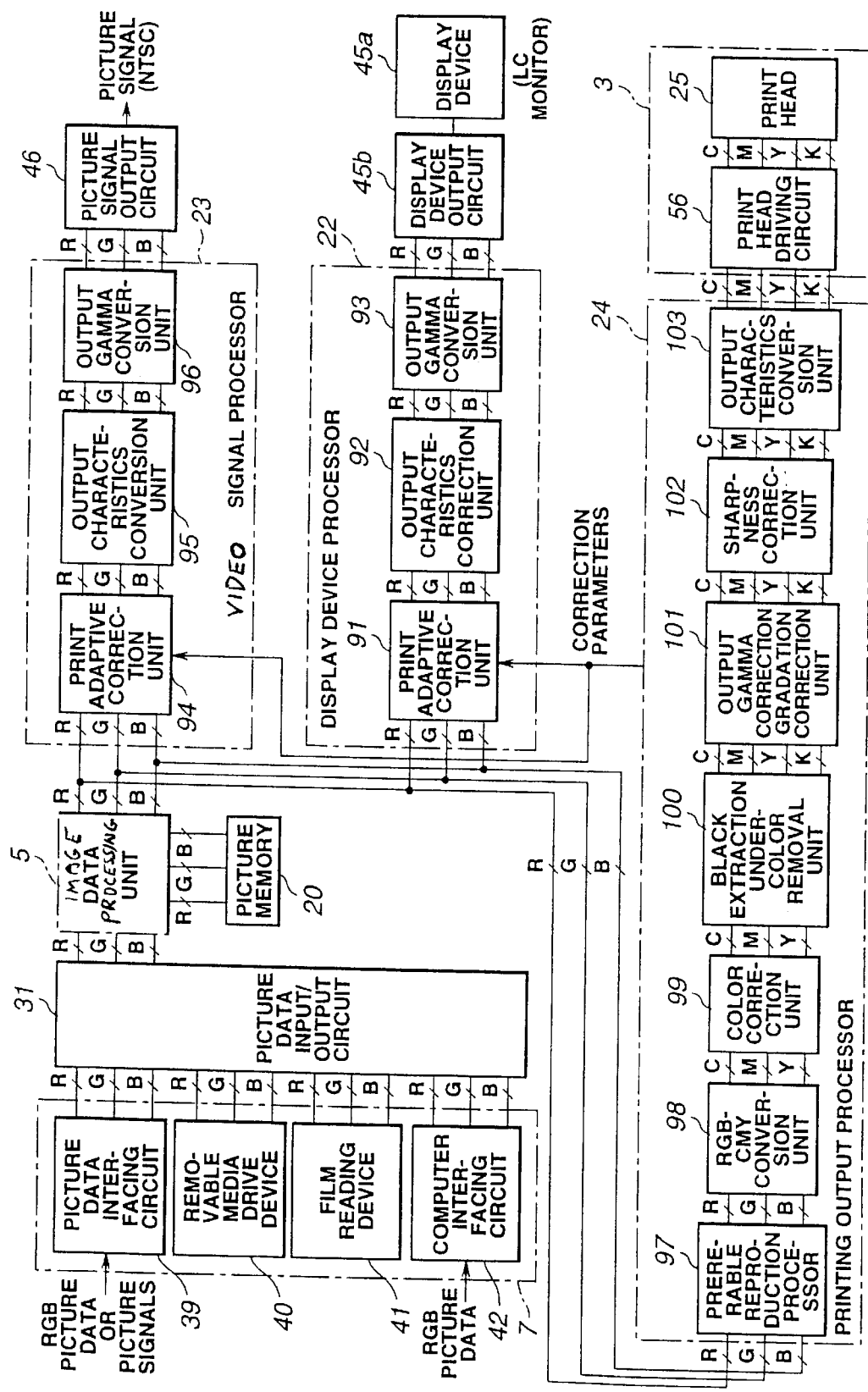
FIG. 14 is a circuit diagram showing an example of data processing flow of a printer device according to the present invention.

Next, the data processing flow in the present printer device is explained with reference to FIGS. 14 and 15, in which slanted line segments attached to the data flow lines in FIG. 4 indicate that the corresponding data is 8 or more bits/color data. As explained previously with reference to FIGS. 5 and 10, RGB picture data externally inputted to the computer interfacing unit 42 of the picture input means 7 of FIG. 14 are outputted as RGB picture data to the picture data input/output circuit 31. In the picture data interfacing circuit 39, removable medium driving device 40 and the film reading unit 41, in the picture input means 7, read-out picture data or video signals are outputted as RGB data to the picture data input/output circuit 31.

The picture data input/output circuit 31 processes picture data from the picture input means 7 so that these data can be handled equivalently to output the resulting data to the data processing unit 5.

Figure 15:
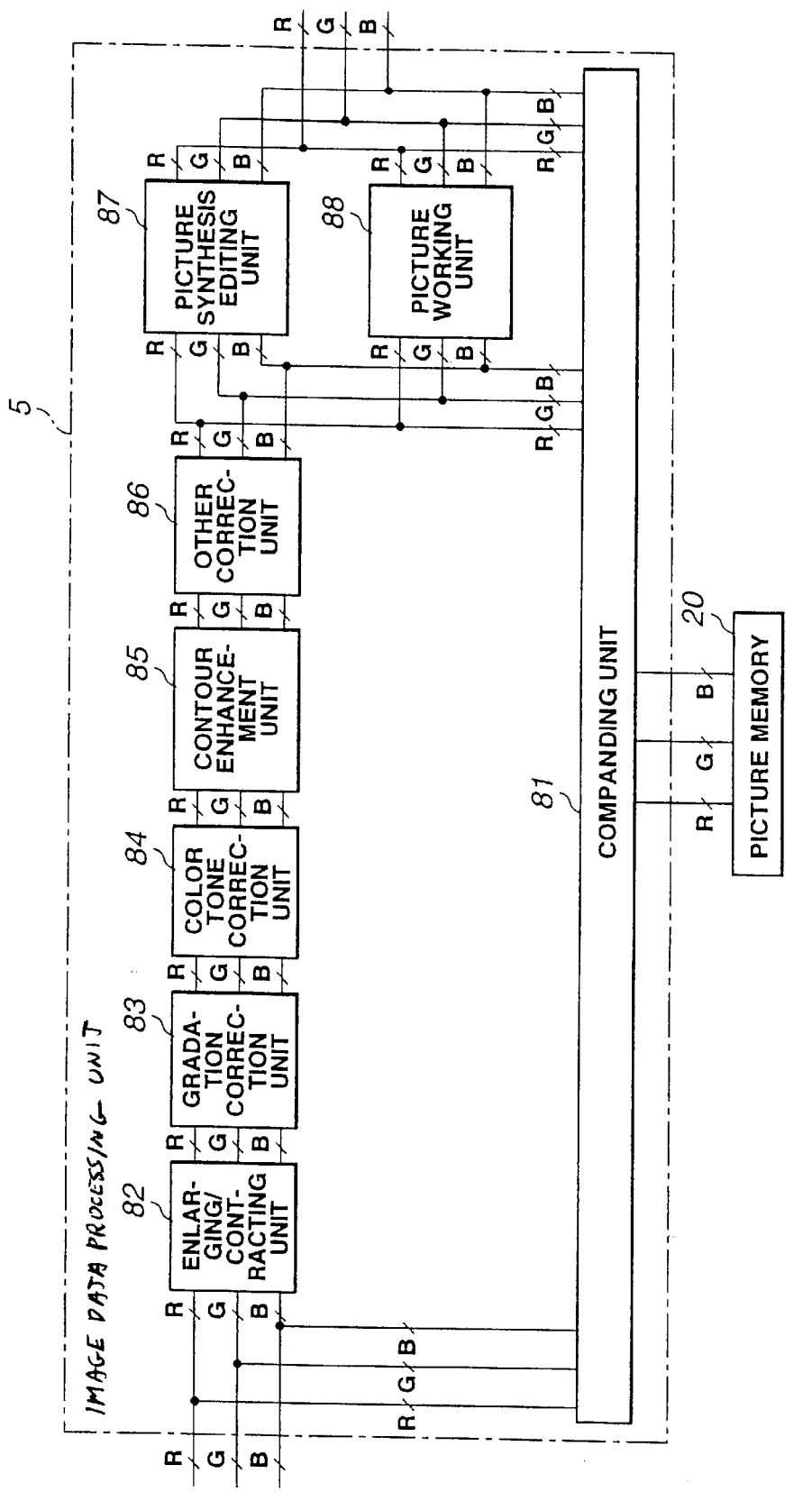
FIG. 15 is a circuit diagram showing a data processing flow in a data processing portion of a printer device according to the present invention.

Referring to FIG. 15, the data processing unit 5 is made up of a compression/expansion unit 81, an enlarging/contracting 82, a gradation correcting unit 83, a color tone correction unit 84, a contour enhancing correcting unit 85, an additional correction unit 86, a picture synthesis editing unit 87 and a picture working unit 88. The data processing unit 5 corrects picture data for improving the picture quality of the picture displayed on the display device 45a or the picture printed by the picture printing unit 3, unless the picture data inputted from the picture data input/output circuit 31 is of ideal picture quality characteristics. The data processing unit 5 also performs processing for improving the picture quality, if the picture data has characteristic properties.

The compression/expansion unit 81 is required for holding the picture data in the picture memory 20 in a reversibly or irreversibly compressed form. The RGB picture data inputted to the data processing unit 5, processed RGB data and occasionally RGB data between respective processing stages, are compressed and held in the picture memory 20 as compressed picture data. The compression/expansion unit 81 also has the function of reading out and expanding picture data compressed and held in the picture memory 20 to execute various operations on the expanded picture data as non-compressed RGB picture data to output the resulting data to respective portions in the data processing unit 5.

When inputted to the data processing unit 5, the RGB picture data are inputted to the enlarging/contracting 82. The enlarging/contracting 82 operates for enlarging or contracting picture data if the input picture data is outside the size range that permits handling by the data processing unit 5 of the present printer device.

The RGB picture data from the enlarging/contracting 82 are inputted to the gradation correcting unit 83 operating for correcting the gradation characteristics of the input picture data for improving the picture quality of the printed and outputted picture if the gradation characteristic histogram of the input picture data exhibits significant excursions. In particular, if the exposure light volume is not optimum at the time of imaging the object, the gradation correcting unit 83 operates for improving the gradation characteristics of the entire picture by correcting the entire picture which tends to become too dark or too bright. The gradation correcting unit 83 also corrects gamma characteristics of the input picture data if such correction is possible.

The RGB picture data from the gradation correcting unit 83 is then inputted to the color tone correction unit 84. The color tone correction unit 84 operates for correcting the color tone characteristics of the input picture data for improving the picture quality of the printed and outputted picture, such as when the input picture data exhibits significant excursions in the color tone characteristics, as in the case of the above-mentioned gradation correcting unit 83. If specified color tones, in particular the color tone of the skin color or the gray color, are deviated from optimum ranges, the color tone correction unit 84 can also make corrections to optimize the deviated portions, in addition to making comprehensive color tone corrections.

The RGB picture data from the color tone correction unit 84 are inputted to the contour enhancing correcting unit 85. This contour enhancing correcting unit 85 operates for correcting the contour for contour enhancement to optimize the contour of the image if the input picture data exhibits unclear contour or is emphasized excessively.

The RGB data from the contour enhancing correcting unit 85 are inputted to the additional correction unit 86. The additional correction unit 86 operates if there is added the processing for improving the input picture quality in addition to the above-mentioned processing operations.

Although the foregoing has described an embodiment of sequentially processing input picture data in the respective processing units, unneeded processing can be omitted, while the processing sequence can, of course, be changed.

The RGB picture data, processed as described above, is then entered to the picture synthesis editing unit 87 and to the picture working unit 88. These units process the input picture in a variety of ways, based on a user command from the user interface unit and synthesize/edit plural input pictures to generate an ultimately printed picture.

In these units, picture patterns provided from the outset in input picture data can be synthesized. Moreover, it is possible to input a picture pattern desired by the user by a command device, such as a pen-touch interfacing unit, under control by the user interface unit in the course of the editing operation, to synthesize the picture pattern and the input picture pattern.

The control software doing the synthesis, editing and working of the picture data and the picture pattern provided from the outset can be configured to be entered newly from a removable medium driving device and a computer interfacing unit.

The RGB signals, outputted by the data processing unit 5, are inputted to the display device processing unit 22, video signal processing unit 23 and to the printing output processing unit 24.

The display device processing unit 22 executes the processing for correcting the display output properties characteristic of the display device 45a if the display device 45a has characteristic display output properties, such that, if picture data outputted by the data processing unit 5 is directly displayed by the display device 45a, neither high quality display nor even the display comparable to the picture quality obtained on printing can be obtained because of the display output properties on the display device 45a. This display device processing unit 22 is made up of a print adaptive correction unit 91, as later explained, an output characteristics correction unit 92, as later explained, and an output gamma conversion unit 93, adapted for correcting output gamma characteristics proper to the display device.

The video signal processing unit 23 executes processing of converting output picture data of the data processing unit 5 into standard picture signals represented by NTSC signals and outputting the resulting converted signals. This video signal processing unit 23 is made up of a print adaptive correction unit 94, as later explained, an output characteristics conversion unit 95 for performing necessary corrections other than that of output gamma characteristics as later explained and an output gamma conversion unit 96, arrayed in this order. In the video signal processing unit 23, if the representable characteristics range of picture data differ from the range of representation prescribed by standard picture signals, the representable range of the picture signals is converted into a range of representation of standard picture signals. Meanwhile, it is possible with the video signal processing unit 23 to turn standard picture signals into picture signals conforming to the standard picture signals. In particular, enlarging the saturation, that is increasing brightness, in comparison with that of the standard picture signals, is executed to make a more beautiful representation of a picture.

The printing output processing unit 24 converts picture data to signals that can be inputted to the print head driving circuit 56 (printing data) in order to record picture data outputted by the data processing unit 5 from the printer head 25 on the recording medium. The processing in the printing output processing unit 24 is implemented by conversion processing by a lookup table (LUT), calculation processing exploiting a calculation circuit that is able to perform product sum processing at an elevated speed, calculation processing by a software having high speed processing algorithm, or processing by a dedicated conversion circuit. If, in sequentially executing the calculation processing, the same number of bits as that of each data in the input picture data is used, the effective precision of each data tends to be lowered. In such case, the number of bits for each data is set during calculation so as to be higher than the number of bits in the initial picture data and is decreased in the last processing to avoid the effective precision from being lowered.

The printing output processing unit 24 is made up of a preferred reproduction color processing unit 97, as later explained, an RGB-CMY conversion unit 98, a color correction unit 99, a black extraction under-color removing unit 100, an output gamma correction gradation correction unit 101, a sharpness correction unit 102 and an output characteristics conversion unit 103, arrayed in this order. This, however, is merely illustrative such that any other suitable configuration may also be used.

The RGB-CMY conversion unit 98 converts the RGB picture data into data of inks or toners of respective colors of C (cyan), M (magenta) and Y (yellow) used in the printer head 25. This conversion is realized by gray level log conversion, complementary color conversion or by linear masking conversion.

The picture data, converted as described above into CMY picture data, is inputted to the color correction unit 99. The color correction unit 99 corrects the excursion, especially the color hue and the saturation, of the picture printed by the picture printing unit 3, caused by the fact that spectroscopic absorption characteristics of the inks or toners of CMY following conversion into CMY picture data differ from ideal characteristics proper to the subtractive color mixing method.

The color correction unit 99 is realized by conversion by the look-up table (LUT) and calculations, linear masking calculations and by non-linear masking calculations. It is a frequent occurrence that the representable maximum characteristic range of the picture data differs from the representable maximum range of printed picture on the recording medium by the printer head 25. In this consequence, if the maximum range by the picture data is broader than the maximum range by printing, the portion of the representable range of picture data exceeding the representable range of printing cannot be reproduced, if no countermeasures are used. Therefore, in the color correction unit 99, it is necessary to compress the picture data in its entirety or convert the picture data by clipping in order to represent this exceeding portion on the printed picture. There are occasions wherein a conversion method is used to avoid excursions in the color tone otherwise caused by this clipping conversion.

The CMY picture data then are inputted to the black extraction under-color removing unit 100. The black extraction under-color removing unit 100 performs the processing in which, if there is an ink or a toner of a black color, referred to below as BK, in the printer head 25, and the respective data of CMY have a BK component, the portion of the BK component is replaced by a BK ink or a BK toner. The BK components in the CMY data, replaced by BK, are removed from the data value of the CMY picture data.

There are a variety of techniques for converting the BK component in CMY into the BK ink or toner, such as a method of totally replacing the BK component into a BK ink or toner, a method of replacing a pre-set proportion of the BK component into a BK ink or toner, or replacing the BK component into a BK ink or toner in an area higher than a pre-set gray level. By representing the BK component in the CMY data with the BK ink or toner, the black level in the CMY data, that can be reproduced only insufficiently by respective inks or toners of the CMY system, can be realized to a sufficient level. It is noted that the BK component data is indicated as K in FIG. 14.

Meanwhile, the BK component data is indicated as K in FIG. 14.

The CMY picture data then are inputted to the output gamma correction gradation correction unit 101, which is configured for performing output gamma correction and gradation correction suited to printing output characteristics proper to the recording ink or toner and the half-tone reproducing method in the picture reproducing characteristics on the recording medium of the printer head 25. This output gamma correction gradation correction unit 101 effects conversion on the original picture data such as to optimize the gradation reproduction on printing the original picture data.

The CMYK picture data is then inputted to the sharpness correction unit 102 which is configured for effecting contour enhancement and smoothing to improve the printing picture quality.

The CMYK picture data are inputted to the output characteristics conversion unit 103 which is configured for effecting characteristic correction depending on the types of the printer head 25, driving method of the printer head 25, type of the recording medium and characteristic correction proper to the type of the ink or the toner to improve the picture quality. Specifically, the output characteristics conversion unit 103 effects ambient temperature correction at the time of printing, hysteresis correction and correction of fluctuations of the respective elements of the printer head 25. Of these correcting operations, those preferably performed in the print head driving circuit 56 can be optimally performed in the print head driving circuit 56.

In the printing output processing unit 24 of the present printer device, there are built-in the preferred reproduction color processing unit 97, as described above. This preferred reproduction color processing unit 97 is configured for converting the picture printed on the recording medium such that the picture printed on the recording medium will be perceived as being beautiful to a majority of viewers.

If, in picture representation specified by the values of the original picture data, in particular in color representation, the picture data is simply converted into CMY data so that the picture data will be equivalent simply calorimetrically, that is only on the basis of colorimetric values obtained by a color meter, and the converted picture data is directly printed on the recording medium, the resulting picture is such a one having reproducibility of colors (color hue, brightness and saturation) not felt to be desirable by a majority of viewers and which is low in saturation, that is low in impressiveness. Thus, the preferred reproduction color processing unit 97 analyzes the data contents of the RGB picture data inputted from the data processing unit 5 to convert picture data of specified picture areas and data ranges in accordance with the above-mentioned preferred reproduction color or average memory color.

That is, the printing output processing unit 24 performs the above-mentioned processing operations on the RGB picture data, previously converted by the preferred reproduction color processing unit 97 in accordance with the preferred reproduction color or the average memory color, with the resulting processed picture data being then printed by the picture printing unit 3 to produce the printed picture. If the processing by this preferred reproduction color processing unit 97 is omitted, the input picture data are processed directly.

The printer device of the present embodiment is configured for correcting the setting of the display output characteristics, and for prescribing the display picture quality in the display/monitor in accordance with the setting of the printing characteristics prescribing the printing picture quality in the picture printing unit 3, in order to render the display picture on the display device 45a and on the external monitor visually equivalent in picture quality to the printed picture by the picture printing unit 3.

Specifically, correction parameters indicating the contents of the correction to be effected by the display device processing unit 22 and by the video signal processing unit 23 in order to visually equate the picture quality, are inputted to the print adaptive correction unit 91 of the display device processing unit 22 and to the print adaptive correction unit 94 of the video signal processing unit 23 in accordance with the desired change of the printing characteristics of the printing output processing unit 24 and with the processing contents.

That is, in the display device processing unit 22, the RGB picture data has the correction parameters in the print adaptive correction unit 91 to which it is inputted first. The processing proceeds in this state and the result of processing is displayed on the display device 45a.

The same applies for the video signal processing unit 23, that is, the RGB picture data has the correction parameters in the print adaptive correction unit 94 to which it is inputted first. The processing proceeds in this state and the result of processing is displayed on the external display.

The result is that the picture displayed on the display device 45a is equivalent in picture quality to that printed by the picture printing unit 3.

This processing is carried out in the printing output processing unit 24 on the picture processed by the preferred reproduction color processing unit 97 or on the picture not processed by the preferred reproduction color processing unit 97.

In the above-described embodiment, the display output characteristics of the display device processing unit 22 and the video signal processing unit 23 are corrected in accordance with the processing contents by the printing output processing unit 24 to visually equate the picture quality of the displayed picture by the picture display output unit and that of the picture printed by the picture printing unit. It is however possible to match the printing characteristics of the picture printing unit 3, specifically the processing contents of the printing output processing 110 unit 24, to the display output characteristics of the display device processing unit 22 and the video signal processing unit 23.

Figure 16:
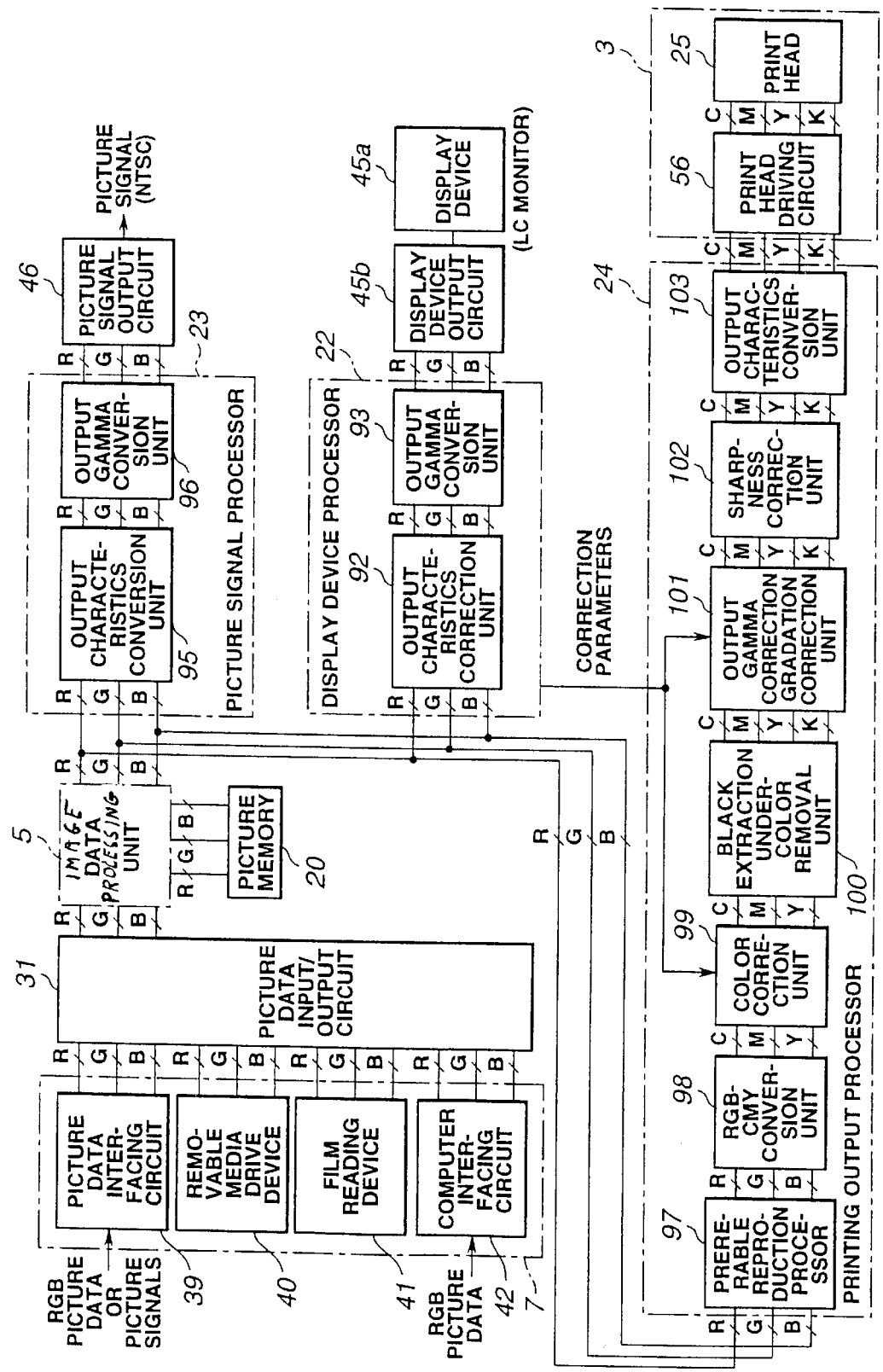
FIG. 16 is a circuit diagram showing another example of data processing flow of a printer device according to the present invention.

That is, the data processing flow may be set as shown in FIG. 16, which differs from FIG. 14 only in that the display device processing unit 22 lacks in the print adaptive correction unit 91 and the video signal processing unit 23 lacks in the print adaptive correction unit 94, so that there is no indicating line for correction parameters from the printing output processing unit 24. Therefore, the other portions are indicated by the same reference numerals and the corresponding description is omitted for clarity.

However, if the data processing flow is as indicated in the method of FIG. 16, the correction parameters specifying the contents of the correction to be performed by the printing output processing unit 24 to visually equate the picture quality are inputted to the color correction unit 99 and to the output gamma correction gradation correction unit 101 of the printing output processing unit 24, in accordance with changes in the display output characteristics of the display device processing unit 22.

That is, in the printing output processing unit 24, the RGB picture data has the correction parameters in the color correction unit 99 and the output gamma correction gradation correction unit 101, which substantially govern the picture characteristics.

The processing proceeds in this state and the results of the processing are printed by the picture printing unit 3. The result is that the picture quality of the displayed picture on the display device 45*a* is visually equivalent to that of the printed picture by the picture printing unit 3.

Figure 17:
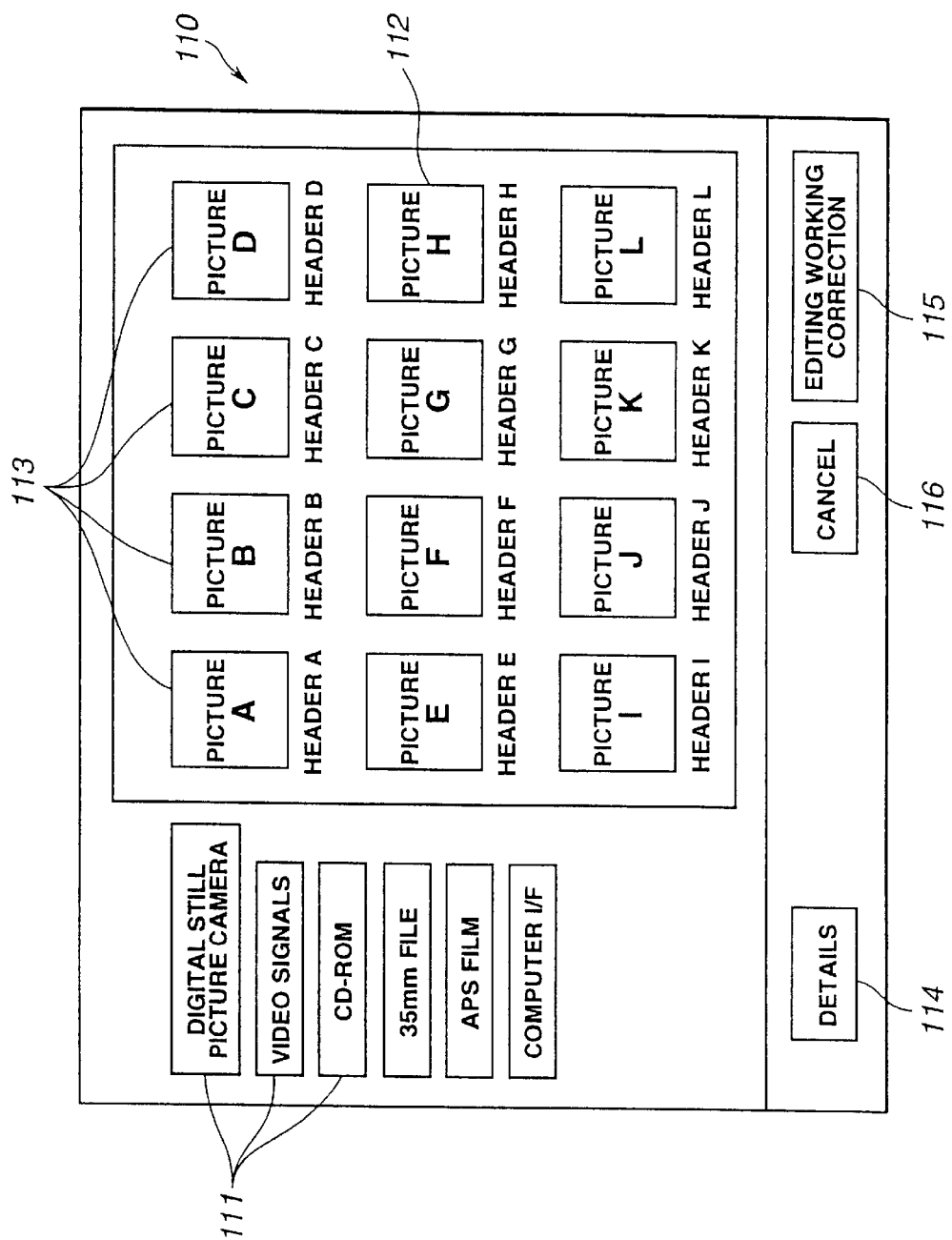
FIG. 17 is a schematic view showing an example of a picture displayed on a display device or on an external monitor of a printer device according to the present invention.

Preferably, a non-volatile memory is preferably provided in the display device processing unit 22, video signal processing unit 23 and in the printing output processing unit 24, and the correction parameters are held in the rewritable state, since then the processing can be prosecuted at all times using optimum correction parameters. A specified display example of displaying a menu picture etc. on the display device 15 or on the external monitor, discussed previously, is hereinafter explained with reference to an operating sequence. The initial picture among these pictures is a menu picture 110 shown as an example in FIG. 17. It is assumed here that a pre-set portion on the picture is directly touched for inputting. On the picture, plural selection keys 111, indicating the names for selecting the external connection equipments and picture inputting means, are displayed, while a picture display area 112 is mainly displayed, as shown in FIG. 17. If an external connection equipment and picture inputting means are selected by the selection key 111, a picture 113 accessible in the selected means is displayed in the picture display area 112 as a reduced-size picture.

On the picture 110, there are also displayed a detail setting key 114, used for selecting the picture 113 under a specified condition, an editing/working/correcting key 115 used for editing or working the selected picture 113 and a cancellation key 116 for aborting the processing.

If the user selects and specifies one of the external connection equipment and picture inputting means by the selection key 111, plural pictures 113 that can now be read are displayed in the picture display area 112. If there is the ancillary information to the information of the picture 1113, for example, the header information, the information is displayed in association with the respective pictures 113.

If then the user selects the desired picture 113 from among the plural displayed pictures 113, the selected picture is displayed in a manner indicating such selection.

Preferably, conditions etc. can be configured to be inputted on selection of the detail setting key 114 so that the user can select the picture 113 under specified conditions of the imaging time and data or the imaging sequence.

Also preferably, pre-set editing, working, synthesis or correction can be configured to be effected on selection of the editing/working/correcting key 115 so that the user can perform desired processing on the selected picture 113.

Figure 18A:
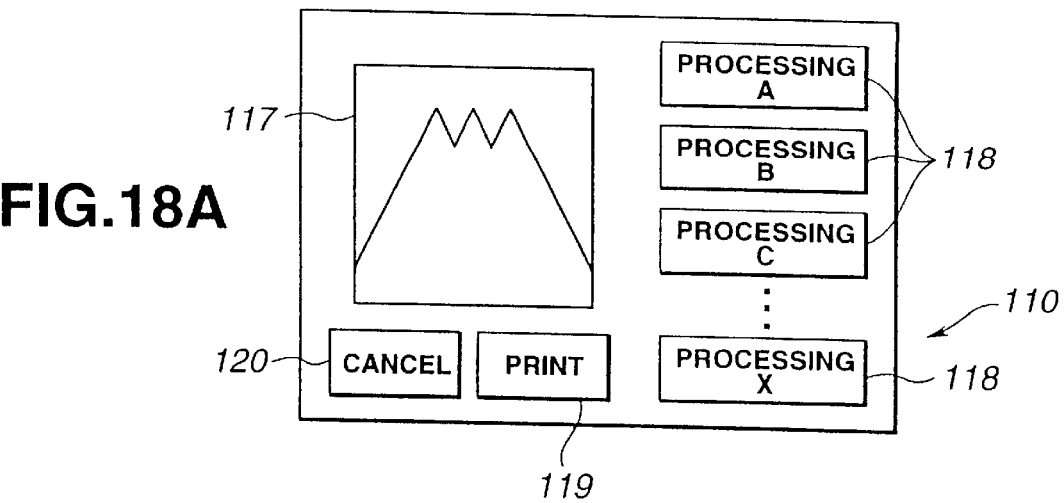
FIG. 18 is a schematic view showing another example of a picture displayed on a display device or on an external monitor of a printer device according to the present invention.

A picture for processing is desirably displayed on the picture selected as described above. That is, a selected picture 117, plural processing selection keys 118 indicating the names of the different types of processing operations A, B, . . . , X, a printing key 119 commanding the start of the printing and a cancellation key 120 for commanding aborting the processing, as shown in FIG. 18A. That is, the user selects the processing selection keys 118 to execute the desired processing operation for the picture 117, e.g., to perform picture editing as one processing operation, or adjust brightness of the image as a different processing operation, etc. At this time, the fact of the processing being executed and the picture indicating the results of the processing are displayed in the picture 117.

If a specified portion in the picture 117 is specified as a processing start point, it is preferred that the indication of an area in which processing has come to a close is gradually changed to the post-processing indication, since then it can be confirmed to which portion in the picture 117 the processing has been executed.

In effecting the processing, the processing may be assumed to the a processing having variable parameters and a processing not having variable parameters.

It is assumed that the processing A has variable parameters. If such processing is selected, it is sufficient if a picture 110 is displayed which includes a picture 117, a processing display portion 121 indicating the current processing, a selection key 122 indicating reversion to the previous picture (picture shown in FIG. 18A), a cancellation key 123 indicating the aborting of the processing, a variable parameter selecting portion 126 and a decision key 127 for establishing the processing, as shown in FIG. 18B.

Figure 18B:
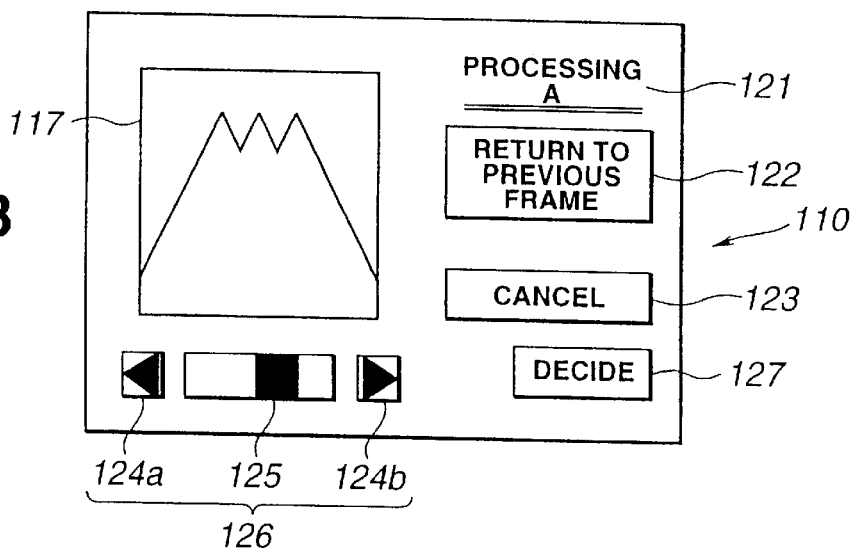

The variable parameter selecting portion 126 includes a slide volume indicating portion 125 for indicating the level of the variable parameter, and adjustment keys 124*a*, 124*b* for increasing and decreasing the variable parameters, as shown in FIG. 18B.

Here, if the left adjustment key 124*a* in FIG. 18B is thrust, the level of the variable parameter is moved towards left, whereas, if the right adjustment key 124*b* in FIG. 18B is thrust, the level of the variable parameter is moved towards right. If, for example, the variable parameter is the picture brightness, the left adjustment key 124*a* in FIG. 18*b* is a brightness lowering key and the right adjustment key 124*b* in FIG. 18*b* is a brightness elevating key, the picture is displayed with varying brightness by adjusting the adjustment keys 124*a*, 124*b* for changing the level of the slide volume indicating portion 125.

It is assumed that the processing A has no variable parameter. If such processing is selected, it is sufficient if a picture 117 is displayed which includes a picture 117, a processing display portion 121 indicating the current processing, a selection key 122 indicating reversion to the previous picture (picture shown in FIG. 18B), a cancellation key 123 indicating the aborting of the processing, and a decision key 127 for establishing the processing, as shown in FIG. 18C.

Figure 18C:
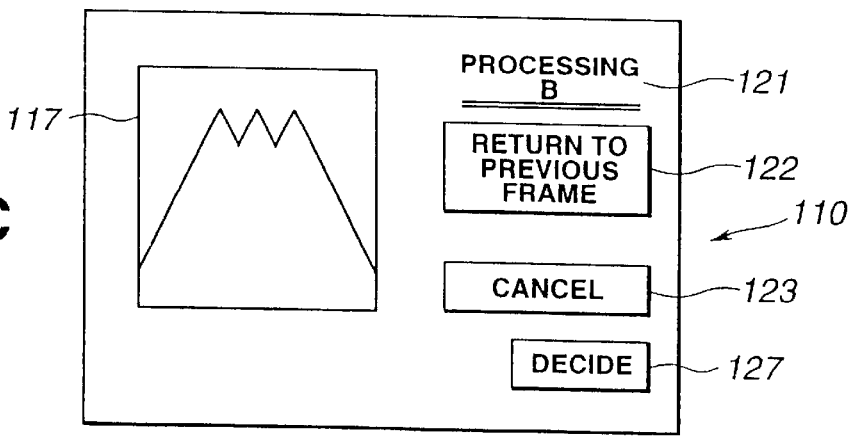

If the processing operations are performed on the pictures shown in FIGS. 18B and 18C, and the user has recognized that the processing can be terminated, he or she selects the decision key 127. For printing, the user reverts to the picture shown in FIG. 18A and selects the print key 119 to effect printing.

Figure 19:
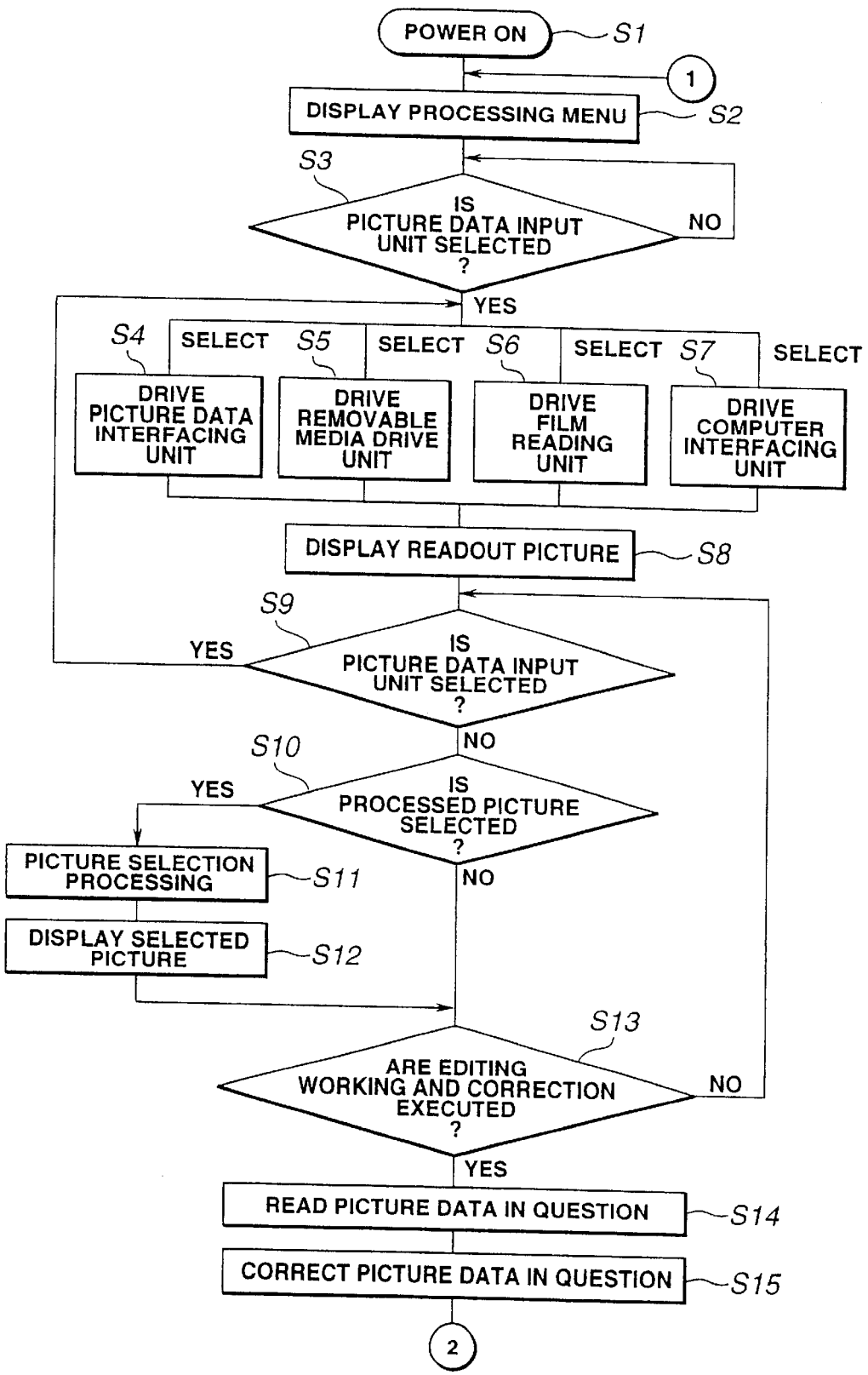
FIG. 19 is a flowchart showing a portion of the schematic operation in a printer device according to the present invention.
Figure 20:
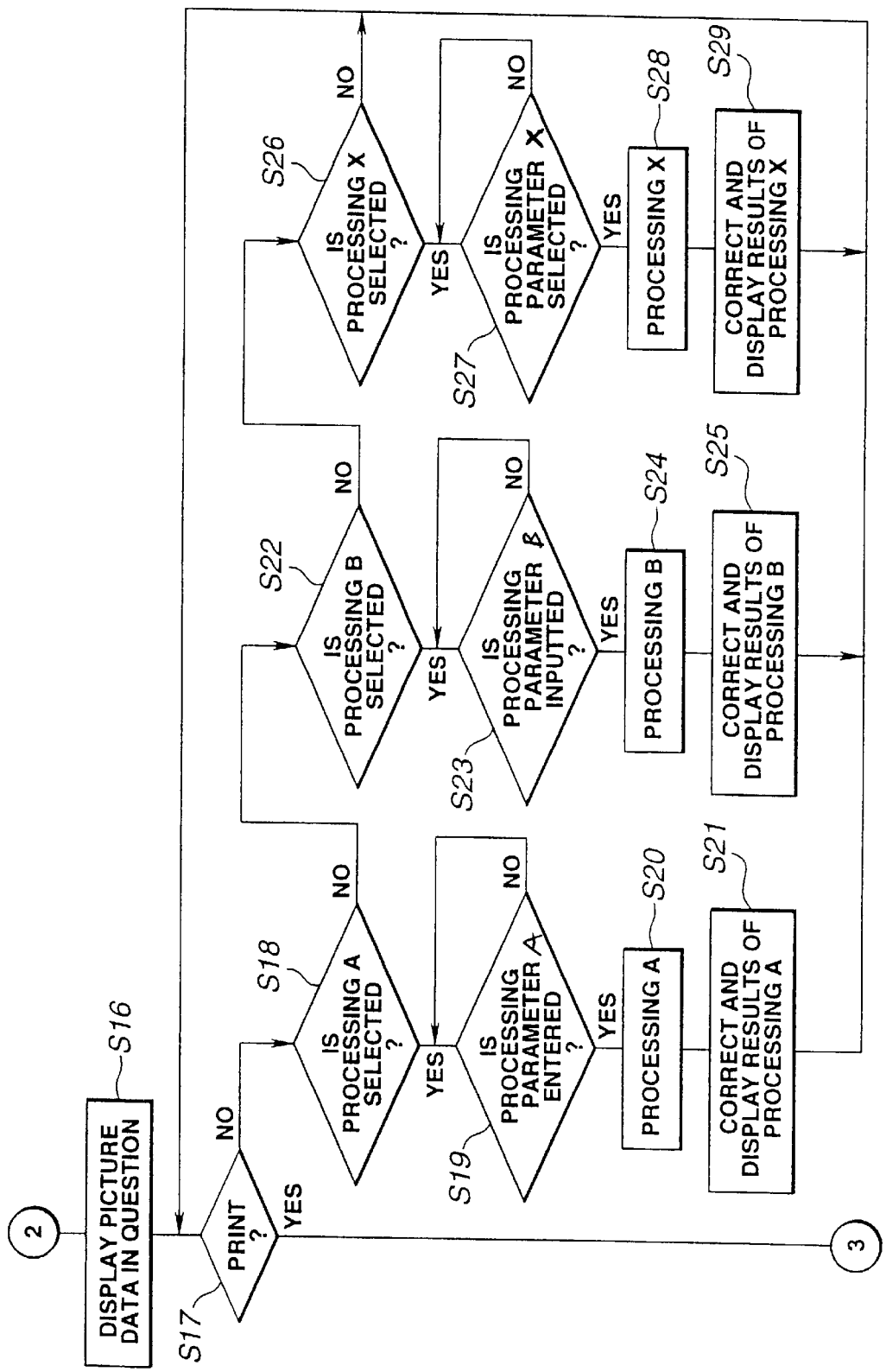
FIG. 20 is a flowchart continuing to FIG. 19 and showing a portion of the schematic operation in a printer device according to the present invention.
Figure 21:
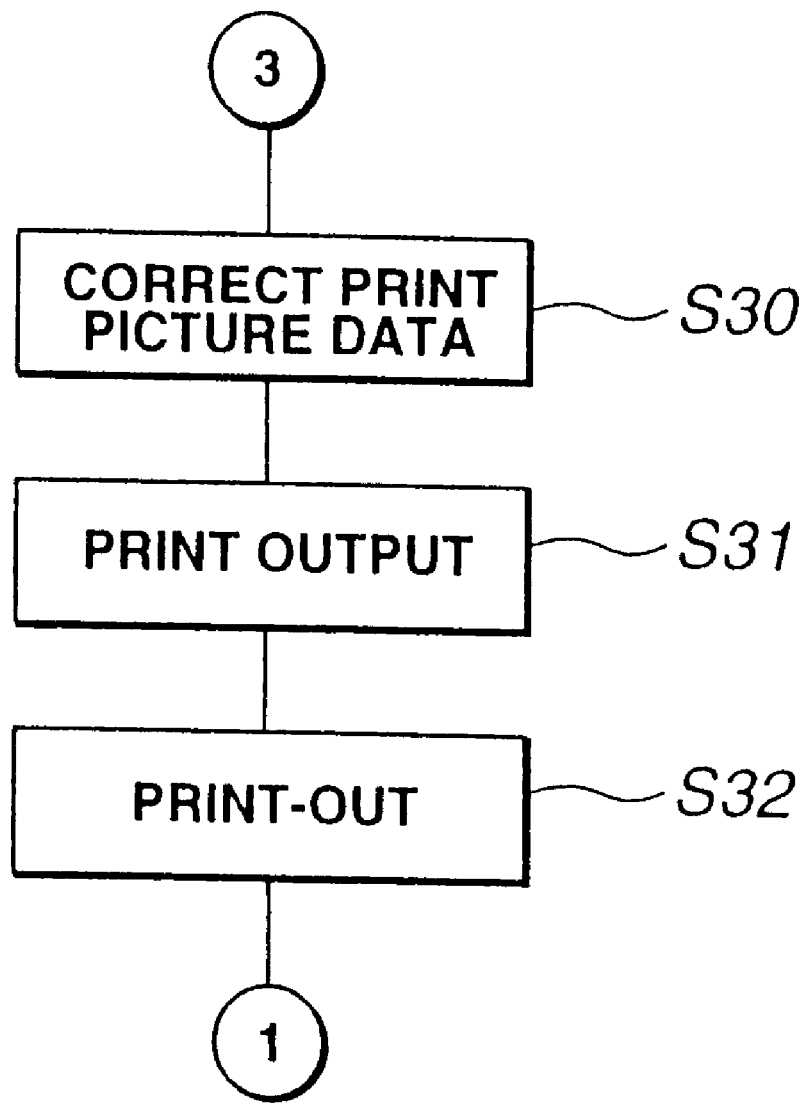
FIG. 21 is a flowchart continuing to FIG. 20 and showing a portion of the schematic operation in a printer device according to the present invention.

Reference is now had to the flowchart of FIGS. 19 to 21 for illustrating the schematic operation of the present printer device. Referring to FIG. 19, the power source is turned on at step S1. This displays the processing menu at step S2 as shown in FIG. 17. It is then verified at step S3 whether or not a selection command for the picture input means with which to enter picture data or the external connection equipment has been issued. If the command has been issued, the commanded subject is selected. For example, the picture data interfacing unit is driven at step S4. Since there are plural picture input means with which to enter picture data and plural external connection equipments, the removable medium driving is effected at step S5, the film reading is effected at step S6 and the computer interfacing unit driving is effected at step S7. That is, the program branches to one of steps S4 to S7 depending on the selection at step S3.

On the other hand, if there is issued the selection command for the plural picture input means with which to enter picture data or the plural external connection equipments, it is again verified at step S3 whether or not the selection command for the plural picture input means with which to enter picture data or the plural external connection equipments has been issued.

The picture data, outputted by the picture input means or the plural external connection equipment, selected at steps S4 to S7, is displayed at step S8 in the display device or in the external monitor. If plural picture data are outputted by the selected the picture input means or the plural external connection equipment, plural output picture data are displayed as plural reduced-size pictures on the display device or in the external monitor.

At the next step S9, it is judged whether or not the picture input means with which to input picture data or the external connection equipment is to be changed. In the absence of the command for changing the selection of the picture input means with which to input picture data or the external connection equipment, it is verified at step S10 whether or not the selection command for the picture for processing is issued. By the processing here is meant the editing, working or correction by the picture processing unit, printing by the picture printing unit and the processings to be executed for these processing operations.

If a selection command for the picture input means with which to input picture data or the external connection equipment is again issued without selecting the picture for processing from the plural displayed pictures, the picture input means with which to input picture data or the external connection equipment is again selected at step S9 and, depending on the selection, the program branches to one of steps S4 to S7.

As for the picture selected at step S110, the picture selection processing which testifies to the selection is effected at step S1. Then, at step S112, the selected picture is displayed such as to testify to the selection.

At step S13, it is verified whether or not a command will be issued for effecting the editing, working or correction on the selected picture. If the command for execution is issued, picture data of the picture in question is read at step S14. If the picture for processing is not selected at step S10, the program directly moves to step S13. In the absence of the command for executing the editing, working and correction at step S13, it is again verified whether or not the picture input means with which to input picture data or the external connection equipment is to be selected.

By sequentially passing through the steps S9, S10 and S13, the program awaits the command for selection change of the picture input means or the external connection equipment, the command for selecting the picture for processing and the command for execution of the editing, working or correction.

The picture data, read as a picture on which to execute the processing, such as editing, working or correction, is corrected at step S15. The correction here is effected for improving the picture quality of a picture displayed on the display device or on the external monitor or a picture printed by the picture printing unit. After this correction, the picture in question, displayed and corrected as shown in FIG. 18A, is displayed at step S16. Then, at step S17, it is verified whether or not a print command will be issued.

In the absence of the printing command, it is verified whether or not a command for executing various processing operations will be issued. Thus, it is verified at step S18 whether or not the processing A (e.g., brightness control) is to be effected. If the command is issued, it is prompted at step S19 to input the variable parameter concerning the processing A. If the variable parameter is inputted (e.g., by the user adjusting the brightness adjustment key as in FIG. 18B) the processing A is executed at step S20. At step S21, the picture resulting from the processing A is corrected on the basis of the setting of the display output characteristics and the setting of the printing characteristics, as corrected by the characteristics correction unit, and the corrected picture is displayed on the picture display output unit. This display picture is rendered visually equivalent to the picture printed by the picture printing unit. In the absence of an input of the variable parameter concerning the processing A, prompted at step S19, the program awaits the inputting of the variable parameter concerning the processing A.

In the absence of the command for execution of the processing A at step S18, it is verified at step S22 whether or not the processing B is to be performed. If this command is issued, inputting of the variable parameters concerning the processing B is prompted at step S23. If the variable parameters are inputted, the processing B is executed at step S24. The picture resulting from the processing B at step S25 is corrected on the basis of the setting for display output characteristics and the setting for printing characteristics as corrected by the characteristics correction unit. The corrected picture is displayed on the picture display output unit. In the absence of an input for the variable parameters concerning the processing B, prompted at step S23, the program awaits the inputting of the variable parameters concerning the processing B.

The same applies for the other processing operations. Finally, it is verified at step S26 whether the processing X is to be executed. If the command for executing the processing is issued, inputting of the variable parameter concerning the processing X is prompted at step S27. If the variable parameter is inputted, the processing X is executed at step S28. The picture resulting from execution of the processing X is corrected at step S29, based on the setting of the display output characteristics and on the setting of printing characteristics, as corrected y the characteristics correction unit.

The resulting corrected picture is displayed on the picture display outputting unit. This displayed picture is rendered visually equivalent in picture quality to the printed picture. If the inputting of the variable parameter concerning the processing X, prompted at step S27, is not made, the program awaits the inputting of the variable parameter concerning the processing X. It is then sequentially verified whether or not a printing command, a command for starting the processing A, a command for starting the processing B, and a command for starting the processing X are issued for the selected picture data.

It is then verified at step S17 whether or not a printing command will be issued for the picture data selected or processed as described above. If plural processing operations are to be made, it suffices if picture data from the processing A is returned, the printing command is not issued at step S17, the start command for the processing A is not issued at step S18, processing moves to step S22 to effect the processing B and the picture data from the processing B is returned. The above sequence of operations is sequentially repeated, and a printing command is issued at step S17 after the processing in its entirety has come to a close.

If it is verified at step S17 that the command for executing the printing is issued, picture data correction for converting and correcting the picture for printing to a preferred reproduction color is effected at step S30 in FIG. 21. Then, at step S31, print outputting processing is effected and a printed picture is prepared by printout at step S32. If the picture printing is continued, the processing menu is again displayed at step s32 in FIG. 15 to repeat the processing.

With the present printer device, a variety of operations can be executed and handled easily. Moreover, since the operation proceeds by the same type of processing without regard to the type of the picture inputting means, the user is not perplexed as to the operating sequence.

Referring to the drawings, a second embodiment of the present invention is explained. The printer device is configured similarly to that shown in FIG. 5.

The data processing unit 5, operating as a picture verification unit in the picture processing unit 6, extracts at least one of a vertical picture component and a horizontal picture component, that can be approximated in the vertical direction and in the horizontal direction of a picture frame of first digital picture data, respectively. If at least one of the components is extracted, the data processing unit 5 checks the angle between the extracted picture component and at least one of the associated vertical or horizontal direction.

Based on the above check result, the input position adjustment unit 29 adjusts the input position of analog picture signals, from which the first digital picture data has been originated, by rotational movement, to generate the first digital picture data, adjusted by the picture data input unit 1, to output the adjusted first digital picture data again to the picture processing unit 6.

The data processing unit 5 in the picture processing unit 6 performs editing, working, synthesis or correction on the adjusted first digital picture data to generate second digital picture data. The first digital picture data and/or the second digital picture data, thus adjusted, are outputted via the characteristics correction unit 4 to the picture display outputting unit 2 and to the picture printing unit 3 to display or output the picture.

If there is no tilt in the picture of the pre-set first digital picture data, the latter is directly processed in the data processing unit 5 to produce second digital picture data to display and print the first digital picture data and/or the second digital picture data.

The processing which is based on the results of check in the data processing unit 5 operating as a picture check unit may be carried out in such a manner that the contents of the first digital picture data are modified on rotational movement in the data processing unit 5 operating as a picture calculating unit to generate modified first digital picture data.

Moreover, the first digital picture data, modified as described above, is edited, worked, synthesized and corrected to generate second digital picture data. The first digital picture data and/or the second digital picture data, modified as described above, are outputted to the picture display outputting unit 2 and to the picture printing unit 3 via the characteristics correction unit 4 to display and print the picture.

That is, if, in the printer device according to the present invention, an object in question is tilted in an imaging picture plane relative to the picture frame, in other words, the object is tilted relative to the picture frame in the first digital picture data, the vertical picture component and/or the horizontal picture component in the object is extracted and verified, and the tilt indicated by an angle between the picture components and the corresponding directions is verified. Based on this verification, the tilt is corrected automatically to obtain a tilt-corrected printed picture.

The above-described tilt-correction technique eliminates the necessity of securing the imaging equipment by e.g., a tripod in order to evade the habit the user in manually holding the imaging equipment for imaging. Consequently, the user is not compelled to pay attention lest he or she should tilt the equipment.

In the present printer device, the vertical picture component and the horizontal picture component are extracted and verified from one digital picture data to another, so that, even if the state of the tilt differs from one first digital picture data to another as described above, such tilt is automatically corrected depending on the state of the tilt thus realizing a printed picture having a sufficient composition.

If, in the printer device of the present invention, the data processing unit 5 operating as the picture verification unit for the pre-set first digital picture data from the picture data input unit 1 extracts both a vertical picture component and a horizontal picture component, approximated respectively in the vertical direction and in the horizontal direction relative to the picture frame of the pre-set first digital picture data, preferably the angle of pre-set one of the picture components with respect to the corresponding direction is verified, and the input position adjustment unit 29 accordingly proceeds to make adjustments to generate the first digital picture data adjusted by the picture data input unit 1, or the picture contents of the first digital picture data are changed in the data processing unit 5 operating as the picture calculating unit to generate the changed first digital picture data.

In this case, the pre-set picture component is preferably the horizontal picture component.

In the printer device of the present invention, the input position adjustment unit 29 may be configured for adjusting the input position of the analog picture signals, from which the first digital picture data are derived, by parallel movement and/or input range control adapted to input only a pre-set range.

Also, in the printer device according to the present invention, it is possible for the data processing unit 5 operating as the picture calculating unit to slice only a pre-set portion of the pre-set first digital picture data to change the picture contents to generate the changed first digital picture data.

Meanwhile, in the printer device according to the present invention, the processing by the input position adjustment unit 29 may be combined with that by the data processing unit 5 operating as the picture calculating unit by such configuration in which the input position adjustment unit 29 adjusts the input position of the analog picture signals as the basis of the pre-set first digital picture data by translation, the picture data input unit 1 generates the adjusted first digital picture data, and the data processing unit 5 operating as the picture calculating unit slices out only a pre-set portion of the adjusted first digital picture data to change the picture contents to generate the changed first digital picture data.

In this case, the input position of the analog picture signals is adjusted by translation and, even if the first digital picture data, generated by the picture data input unit 1 is not square-shaped, only a pre-set portion of the first digital picture data is sliced by the data processing unit 5 operating as the picture calculating unit and unneeded peripheral portions of the adjusted first digital picture data is not read out or eliminated to produce the square-shaped modified first digital picture data.

Moreover, in the printer device according to the present invention, if the angle between the vertical picture component approximated in the vertical direction relative to the picture frame of the pre-set first digital picture data, and the vertical direction, is smaller than a pre-set angle, and/or if the angle between the horizontal picture component approximated in the horizontal direction relative to the picture frame of the pre-set first digital picture data, and the horizontal direction, is smaller than a pre-set angle, the input position adjustment unit 29 accordingly makes adjustment to generate first digital picture data adjusted by the picture data input unit 1, or the data processing unit 5 operating as the picture calculating unit modifies the contents of the first digital picture data to generate the modified first digital picture data.

This presupposes that, in imaging a picture which forms the basis of the pre-set first digital picture data, an object is imaged unawares in a tilted state. It is sufficient if the pre-set angle is set to a maximum angle for unconscious object imaging.

By so doing, it becomes possible not to compensate for tilt if the user intentionally images the object with a tilt in view of realization of the optimum picture configuration, thus enabling a printed picture to be produced as desired by the user.

In the printer device of the present invention, as described above, the data processing unit 5 also operates as a picture re-arranging portion which re-arranges the pre-set first digital picture data to generate re-arranged first digital picture data, the printing output processing unit 24 converting the re-arranged first digital picture data into printing data.

That is, in the printer device of the present invention, the data processing unit 5, operating also as the picture verification unit, verifies whether or not pre-set picture contents of the first digital picture data, inputted from the picture data input unit 1, are present in a specified range in the first digital picture data and, if the pre-set picture contents are present in the pre-set range, the data processing unit 5, operating also as the picture re-arranging portion, modifies the picture contents so as to be arranged in a prescribed region to re-arrange the pre-set first digital picture data to generate the re-arranged first digital picture data.

In this case, it is desirable that the pre-set picture contents, specified range and the prescribed region are correspondingly set, with the setting contents being rewritable.

By correspondingly setting the pre-set picture contents, specified range and the prescribed region, it is possible to set an optimum prescribed range, depending on the picture contents, even if there exist plural candidate regions as the prescribed range.

In the present printer device, in which the picture contents in the pre-set first digital picture data are verified by the data processing unit 5 also operating as the picture verification unit, and the first digital picture data are re-arranged by the data processing unit 5, also operating as the picture re-arranging unit, based on the results of verification, the pre-set first digital picture data can first be corrected to a most well-balanced and stabilized picture and subsequently printed by the picture printing unit 3, whereby a printed picture with a sufficient composition can be obtained, without the necessity of strictly setting the composition for imaging.

Also, in the present printer device, the method of modifying the pre-set picture contents so as to be arranged within the prescribed region preferably includes at least one of the following processing operations: partially slicing the pre-set first digital picture data; enlarging the pre-set first digital picture data; rotating the pre-set first digital picture data; and deforming the pre-set first digital picture data.

Moreover, if, in the present printer device, the pre-set picture contents of the first digital picture data has a certain two-dimensional extension, preferably the data processing unit 5 operating as the picture verification unit verifies whether or not the center of gravity of the pre-set picture contents is present in a pre-set range in the first digital picture data. If the center of gravity is not present in the pre-set range, the data processing unit 5 operating as the picture re-arranging portion performs changes so that the center of gravity is in the prescribed region to generate the rearranged first digital picture data.

The center of gravity herein means the weight center of a homogeneous thin sheet having the same boundary in a plane figure and is also termed a center of figure.

Figure 22A:
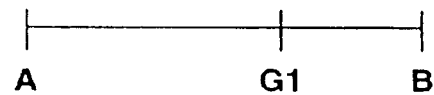
FIG. 22 is a schematic diagram illustrating the golden section.
Figure 22B:
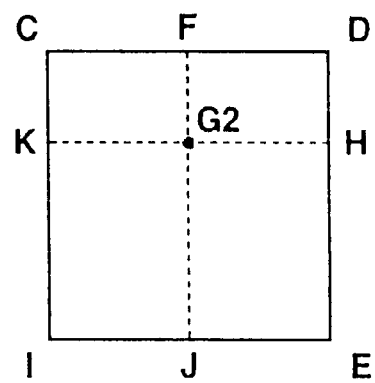
Figure 22C:
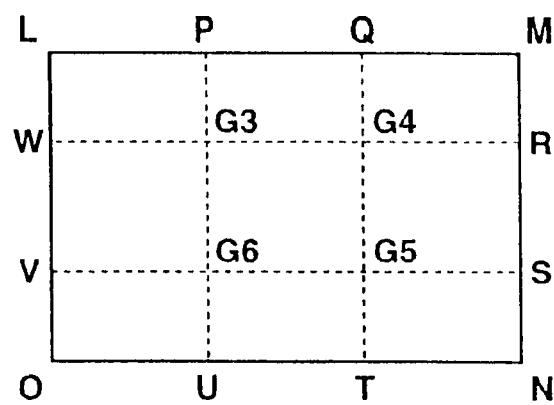

Referring to FIGS. 22A–22C, a method by which digital picture data is optimally rearranged to correct for object tilt is illustrated. In re-arranging the pre-set first digital picture data in the present printer device, it is desirable that, if a line segment AB interconnecting both ends (in a specified direction) of pre-set picture contents in the as-rearranged first digital picture data and a point G on this line segment AB are presupposed, and the point G is presupposed so that the ratio of a line segment AG or a line segment BG, whichever is larger, will be equal to the ratio of the line segment AG or the line segment BG, whichever is larger, to the line segment AG or the line segment BG, whichever is smaller, the prescribed region contains the point G and the pre-set picture contents in the first digital picture data will be arranged in this prescribed region.

It is preferred in this case that line segment AB is divided by golden section by the point G and that the ratio of the line segment AB to the line segment AG or the line segment BG is equal or substantially equal to 8:5.

It is also preferred in this case that the pre-set first digital picture data is tetragonally-shaped and the specified direction of the line segment AB is selected to be at least one of the vertical direction horizontal direction and the diagonal direction.

The pre-set picture contents in the present printer device may be enumerated by the face of a human being (the center of gravity of plural persons if there are such plural persons), the direction of the human being, horizontal line, horizon, trunk of a tree, outer profile of a building, or the contour of the building.

Referring to FIG. 22, the golden section is explained. The golden section is the method of dividing a line segment in which, if the line segment is split at a point thereon, the ratio of the entire length of the line segment to a longer section resulting from the division is equal to the ratio of the longer section of the line segment to a shorter section thereof. That is, if, when the line segment AB is divided at a point G1 thereon, the following equation (1):

$$AG1/AB = G1B/AG1 = (51/2\ 1)/2 = 0.618033$$

$$AB:AG1 = 1:0.618033 = 8:4.9 \qquad (1)$$

as shown in FIG. 22, the golden section holds.

This ratio of the golden section, termed the golden ratio, is said to be the most harmonious ratio from the age of ancient Greece, and represents an example of optimum proportional division based on the principle of geometry.

This division method of the golden section may be expanded in the two-dimensional direction for application to the picture frame configuration represented by picture data. That is, by arranging the main picture portion in a picture in the vicinity of a specified point (point of golden section) as found by the golden section in a picture, it is possible to impart an impression that the picture is most well-balanced and stabilized picture.

Specifically, a point G2, corresponding to a point of intersection of a line segment FJ interconnecting mid points of line segments CD and IE and a line segment KH interconnecting points of golden section of line segments CI and DE, represents the above-mentioned specified point (point of golden section).

Also, referring to FIG. 22C, a point G3 corresponding to a point of intersection of a line segment PU interconnecting points of golden section of line segments LM and ON and a line segment WR interconnecting points of golden section of line segments LO and MN, in a tetragon defined by points L, M, N and 0, represents the above-mentioned specified point (point of golden section). Similarly, a point G4 corresponding to a point of intersection of a line segment QT interconnecting points of golden section of line segments LM and ON and a line segment WR interconnecting points of golden section of line segments LO and MN, a point G5 corresponding to a point of intersection of a line segment QT interconnecting points of golden section of line segments LM and ON and a line segment VS interconnecting points of golden section of line segments LO and MN and a point G6 corresponding to a point of intersection of the line segment PU interconnecting points of golden section of line segments LM and ON and the line segment VS interconnecting points of golden section of line segments LO and MN also represent the above-mentioned specified points (points of golden section).

Therefore, if the main portion or a portion of interest in a picture is placed at or near the above-mentioned specified points (points of golden section) G2, G3, G4, G5 and G6, a well-balanced picture can be produced.

It is known that the human being unconsciously prefers a picture which satisfies the relation of the golden section in connection with the composition of the picture contents in the picture. If the picture contents are not in accordance with the golden section, it is preferred to make corrections so that the relation of the golden section will be met or approximately met.

Although the foregoing description is based on the value of approximately 8:4.9 as the ratio of the golden section, similar effects may be achieved by arranging a rougher ratio, such as 8:5 or 3:2. Therefore, in actual correction, the golden section may be approximated taking ease and speed etc in calculations into consideration.

Figure 23A:
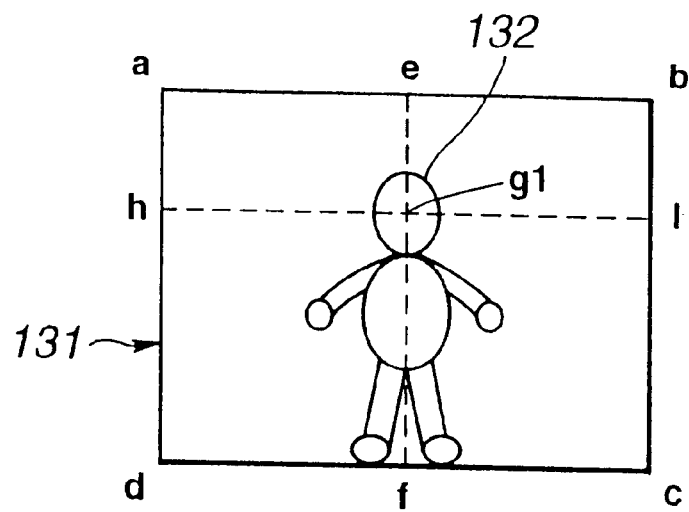
FIGS. 23A and 23B illustrate an example of a picture arranging position.

In the foregoing description, it has been stresses that the main portion of a picture be arranged in the vicinity of specified points (points of golden section). If there is a linear picture having a horizontal picture component or a vertical picture component as the background of the picture, such linear picture is arranged in the vicinity of the lines of golden section, that is line segments PU, QT, WR or VS in FIG. 22C for imparting a stability to the entire picture. In case of picture contents 132 comprised of a person facing the forward side in a tetragonal picture 131 defined by points a, b, c and d, as shown in FIG. 23a, the face of the person, which is the most significant portion in the picture contents 132, is placed, as an example, near a point g1 corresponding to a point of intersection between a line segment of interconnecting mid points of line segments ab and cd and a line segment hi interconnecting points of golden section of line segments ad and bc.

Figure 23B:
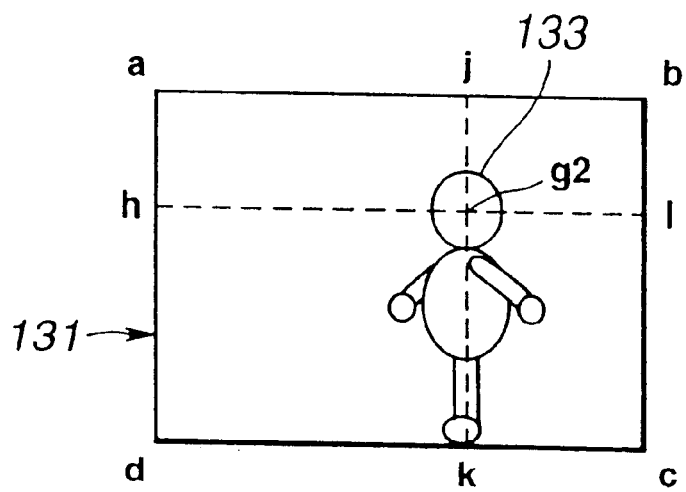

In case of picture contents 133 comprised of a person facing the left side in a tetragonal picture 131 defined by points a, b, c and d, as shown in FIG. 23b, the face of the person, which is the most significant portion in the picture contents 133, is placed, as an example, near a point g2 corresponding to a point of intersection between a line segment jk interconnecting points of golden section of line segments ab and cd and a line segment hi interconnecting points of golden section of line segments ad and bc.

Figure 24A:
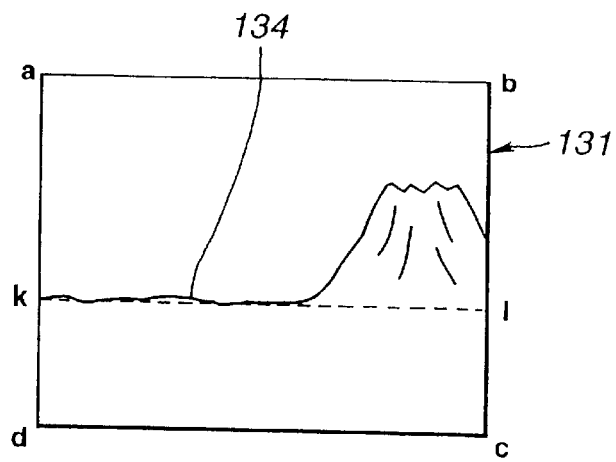
FIGS. 24A and 24B illustrate other examples of a picture arranging position.

If a horizontal component, such as a horizon 134, is indicated in a tetragonal picture 131, defined by points a to d, as shown in FIG. 24a, this horizontal component is arranged, as an example, in coincidence with or parallel to a line segment ki interconnecting points of golden section of line segments ad and bc.

Figure 24B:
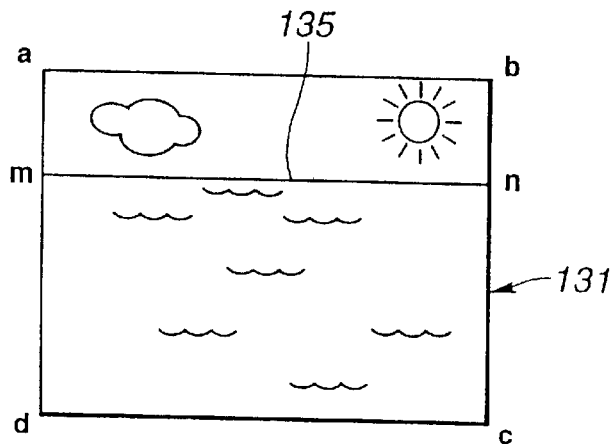

If a horizontal component, such as a horizontal line 135, is indicated in a tetragonal picture 131, defined by points a to d, as shown in FIG. 24b, this horizontal component is arranged, as an example, in coincidence with or parallel to a line segment mn interconnecting points of golden section of line segments ad and bc.

Figure 25:
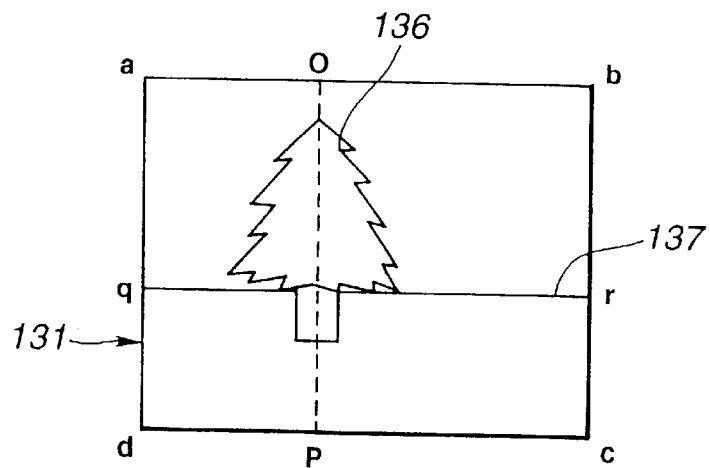
FIG. 25 schematically illustrates still another example of a picture arranging position.

If a vertical component, such as a tree 136, and a horizontal component, such as a horizon 137, are indicated in a tetragonal picture 131, defined by points a to d, as shown in FIG. 25, the vertical component is arranged, as an example, in coincidence with or parallel to a line segment interconnecting points of golden section of line segments ab and cd, while the horizontal component is arranged, as an example, in coincidence with or parallel to a line segment qr interconnecting points of golden section of line segments ad and bc.

If the horizontal component is contained in this manner in the picture, it is essential that the horizontal component is not tilted with respect to the line segment interconnecting the points of golden section.

In the present printer device, the setting of display output characteristics prescribing the display picture quality in the picture display outputting unit 2 is corrected in accordance with the setting of printing characteristics prescribing the display picture quality in the picture printing unit 3. Alternatively, the setting of printing characteristics prescribing the display picture quality in the picture printing unit 3 is corrected in accordance with the setting of display output characteristics prescribing the display picture quality in the picture display outputting unit 2. As a result, the picture displayed on the picture display outputting unit 2 is represented as being of equivalent picture quality to the picture printed by the picture printing unit 3.

The individual components are hereinafter explained.

In the present printer device, the picture inputting means 7 includes a picture data interfacing unit 9, operating as an analog picture signal inputting port or as a digital picture data inputting port, a removable medium driving unit 10, as a disc drive or a memory drive, a film reading unit 11, as a scanner having a photoelectric transducing element, and a computer interfacing unit 12, operating as a digital picture data input port.

The picture data interfacing unit 9 operates for interconnecting a device for processing an object or an original as picture data, such as a digital still picture camera 14, a digital video camera, or an original reading scanner, and a picture data input/output unit 27.

The picture data interfacing unit 9 not only operates as a physical connecting unit but also as a device for controlling the external connection equipment 13 and for capturing digitized picture data, that is, as a digital picture data input port. The above-mentioned connection to the external connection equipment 13 may be realized by radio routes, such as infra-red rays or electromagnetic waves, in addition to wired connection.

Also, the picture data interfacing unit 9 may be configured for receiving analog picture signals, such as NTSC picture signals, PAL picture signals, RGB picture signals or S-terminal picture signals, that is for operating as an analog picture signal input port, and for digitizing the analog picture signals to generating picture data.

If the input picture is a continuous picture, that is a moving picture, such as a picture imaged by a digital video camera, or analog picture signals, the moving picture is directly outputted as picture signals to a display device 15, indicated as a picture display outputting unit 2, or to an external monitor connected to an output port 16, and the user issues a command by the command device 8 for selecting a desired picture, a moving picture selected by the picture data interfacing unit 9 can be captured as picture data, which is a digitized still picture, under control by a user interface unit 28, which will be explained subsequently.

The picture data, thus captured, is routed via picture data input/output unit 27 to the data processing unit 5. Alternatively, the picture data may be routed in the order in which they are captured, or sequentially routed in terms of a block of a pre-set data volume as a unit. Still alternatively, the picture data may be routed in terms of data of a completed picture frame as a unit.

The removable medium driving unit 10 drives a removable medium 17, shown in FIG. 5 as an external connection equipment 13, to read or write picture data.

The removable medium 17 may be exemplified by a magnetic card, a magnetic disc, an optical disc, a magneto-optical disc, a flash memory or an IC memory card constituted by a ROM or a RAM.

The removable medium driving unit 10 is also arranged to drive-control a medium the physical mechanism of which needs to be actuated.

The picture data, thus captured, is routed via the picture data input/output unit 27 to the data processing unit 5. The picture data may be sequentially routed in the order in which it is captured, or may be sequentially routed in terms of a block of a pre-set data volume as a unit. Alternatively, the picture data may be routed in terms of data of a completed picture frame as a unit.

If there are plural picture data in a medium, the picture data may be outputted sequentially or in a contracted state to the display device 15 indicated as the picture display outputting unit 2 or to the monitor connected to the output port 16 as picture signals and, if the user issues a command for selecting a desired picture by the command device 8, the removable medium driving unit 10 routes the selected picture data to the picture data input/output unit 27, under control by the user interface unit 28, as later explained, to cause the data processing unit 5 to process the data in a pre-set fashion. Conversely, the picture data processed in a pre-set manner by the data processing unit 5 may be routed via the picture data input/output unit 27 to the removable medium driving unit 10, under control by the user interface unit 28, the removable medium driving unit 10 then writing and storing the data on the removable medium 17.

The film reading unit 11 reads a photographic film 18, such as a so-called ordinary 35 mm film a so-called APS (advanced photo system) film, having the magnetic information pertinent to a picture, a large-sized roll type film or a sheet-type film, indicated as the external connection equipment 13 in FIG. 5, to convert the read-out data into picture data.

Specifically, the film reading unit 11 mounts each film on an associated film holder and causes relative movement of the film holder or the photoelectric transducing element, to perform control of moving the pictures on the film to a readout start position by the photoelectric transducing element. The photoelectric transducing element may be exemplified by a photodiode, a phototransistor, a CCD line sensor, a CMOS line sensor, a CCD image sensor, and a CMOS image sensor. For reading a sole picture, the film holder or the photoelectric transducing element is moved, responsive to the read-out operation, two-dimensionally or one-dimensionally depending on whether the photoelectric transducing element is a sole sensor or configured as a line sensor, respectively. If the photoelectric transducing element is an area sensor, there is no such movement during the read-out operation.

For reading out a picture on the film, the picture on the film is first read out at a low read-out speed. The resulting picture data is sent via the picture data input/output unit 27 to the data processing unit 5 operating as a picture verification unit.

The data processing unit 5 verifies, by extraction, whether the vertical picture component and/or the horizontal picture component is contained in the picture data, while verifying whether or not these picture components are tilted with respect to the picture frame of the picture data. If there is noticed a tilted picture component, and the tilt is verified to be caused against the intention of the user, the status information on the tilt is sent from the data processing unit 5 to the input position adjustment unit 29 arranged in the film reading unit 11. On reception of the status information, the input position adjustment unit 29 causes the film holder or the photoelectric transducing element to be mechanically rotated or translated in order to cancel out the tilt of the vertical or horizontal picture component in the picture relative to the picture frame. The picture on the film is again read and the resulting picture data is sent via the input position adjustment unit 29 to the data processing unit 5.

The picture data may be routed sequentially in the order in which they are read, or may be routed in terms of a block made up of a pre-set data volume, as a unit, or in terms of picture data corresponding to a complete picture frame as a unit.

If plural pictures are recorded on a film, each read-out picture data is outputted as picture signals to the display device 15 and/or to an external monitor connected to output port 16, via the data processing unit 5, either directly, as a reduced-sized picture or as a rough-read picture, read at a rough read-out pitch. If the user issues a command for selecting a desired picture via the command device 8, the data processing unit 5 deciphers, by extraction, whether or not the selected picture contains the horizontal picture component and/or the vertical picture component, under control by the user interface unit 28 as later explained. If it is found that at least one of the components is contained, and tilt is found to have occurred, the input position adjustment unit 29, explained subsequently, operates for canceling out the tilt to read out the picture again, if so required.

If the film holder or the photoelectric transducing element is rotated and/or translated in the input position adjustment unit 29, it may be an occurrence that the effective picture range is not of a square shape. Therefore, the film picture read-out range is limited depending on the movement processing of the input position adjustment unit 29 to adjust the picture of the read-out picture data to a square shape.

If plural pictures are tilted at different angles, the read-out pictures differ in size depending on the tilt. If the picture size needs to be uniform, the picture size is enlarged at the time of readout or in the course of the picture processing by the data processing unit 5. Of course, the enlarging processing is unnecessary if there is no need to equate the picture size.

It is also possible for the film reading unit 11 to send the selected picture data to the picture data input/output unit 27 to effect pre-set processing by the data processing unit 5. If rough-readout described above is used, the picture needs to be again read out at a usual pitch.

If an APS film, as the photographic film 18, is read out by the photoelectric transducing element, a magnetic head is annexed to the film reading unit 11 to read out the magnetic data on imaging recorded on the APS film at the same time as picture data is read. The magnetic data is displayed by the picture display outputting unit 2 or used for data working by the data working unit 5 for storage as picture data, under control by the user interface unit 28.

In printing the picture of the photographic film 18, a system centered about a universal computer has so far been used. If the present printer device is used, picture printing can be executed easily without using the universal computer.

The input position adjustment unit 29 is arranged in the film reading unit 11, as described above. Based on the status information concerning the tilt of the picture in question, the input position adjustment unit 29 performs the operation of modifying the relative positioning of the film holder or the photoelectric transducing element.

The film reading unit 11 is made up of the scanner as now explained. That is, the film reading unit 11 is made up mainly of a film holder 141 holding a film 140 and a CCD sensor 142 as a photoelectric transducing element. On both sides of a film 140 are arranged a light source 144 for illuminating a picture 143, and a mirror 145. A light beam L1 from the light source 144, carrying the picture 143, is converged via the mirror 145 by a lens 146 to form a light beam L2 which is sent to a CCD sensor 142 for photoelectric conversion in order to generate analog picture signals of the picture 143. These analog picture signals are converted by an A/D converter to first digital picture data. The CCD sensor 142 is configured here as a CCD line sensor.

Preferably, the input position adjustment unit 29 is configured for causing the relative movement, by the following control, without changing the relative positioning between the film holder 141 and the CCD sensor 142 as the photoelectric transducing element, more specifically, the spatial parallel distance between the film holder 141 and a mounting portion, not shown, of the CCD sensor 142. The control effects at least one of the rotational movement or the translation. The control may also be the relative parallel movement (translation) control in conjunction with the relative rotational movement control. Meanwhile, the rotational movement is the operation for correcting the tilt of the picture 143, while the relative parallel movement is the operation of maximizing the readout range in the picture which has been reduced by the rotational movement. In addition, the input range limitation is effected to limit the readout range to maintain the square shape of the read-out picture depending on the rotational movement operation and the parallel movement operation. Finally, the film reading unit 11 executes enlarging control if the size of the picture obtained on reading plural pictures needs to be square in shape and of the same size.

Figure 26:
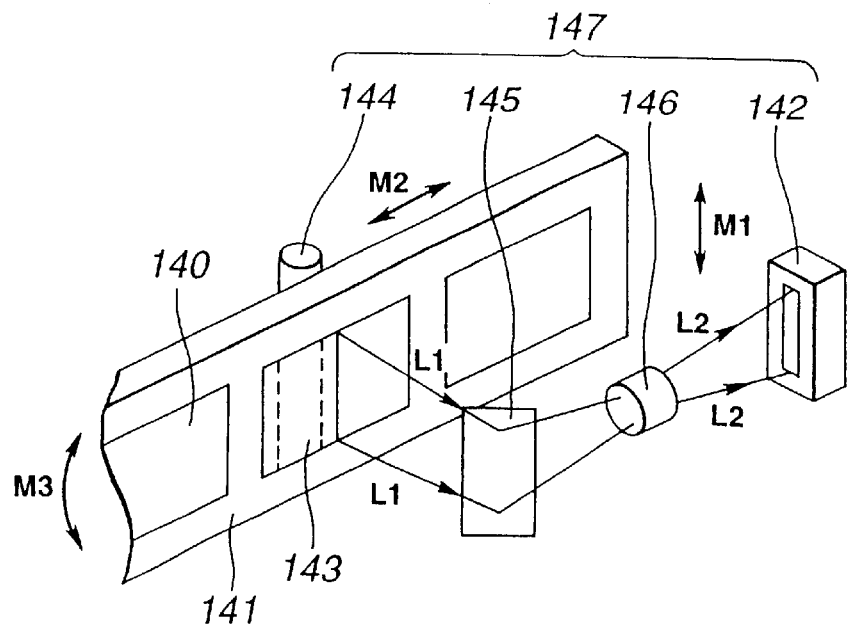
FIG. 26 is an enlarged schematic perspective view showin an embodiment of a structure of a film reading unit.

For example, in an embodiment shown in FIG. 26, a CCD unit 147, made up of the CCD sensor 142, a lens 146, a mirror 145 and a light source 144, is fixed, while the film holder 141 is rotated and translated. Specifically, the film holder 141 is rotated in the direction indicated by arrow M3 in FIG. 26, while being translated in the read line direction indicated by arrow M3 (vertical direction) in FIG. 26. The optical distance of the reading area on the film 140 in register with the CCD sensor 142, herein a straight line, is not changed by this operation.

Meanwhile, the read line direction, corresponding to the read line in register with the CCD sensor 142, as indicated by arrow M1, is perpendicular to the scanning line during reading, as indicated by arrow M2.

Therefore, in the embodiment of FIG. 26, it suffices if the film holder 141 is rotated in the direction indicated by arrow M3 in FIG. 26 depending on the tilt of the picture 143, the film holder 141 also is translated along the read line direction indicated by arrow M1 parallel to the position of the CCD sensor 142 and along the sub-scanning direction in the direction indicated by arrow M2 at right angles to the CCD sensor 142. For reading the next picture, it suffices if the film holder 141 is translated until the film holder 141 reaches the read-out start position for the next picture.

In FIG. 26, it is the film holder 141 that is moved. However, it may also be the CCD unit 147 that is moved. That is, in the film reading unit, configured similarly to the film reading unit 11 shown in FIG. 26, the CCD unit 147 made up of the CCD sensor 142, lens 146, mirror 145 and the light source 144 may be moved, as shown in FIG. 27.

Figure 27:
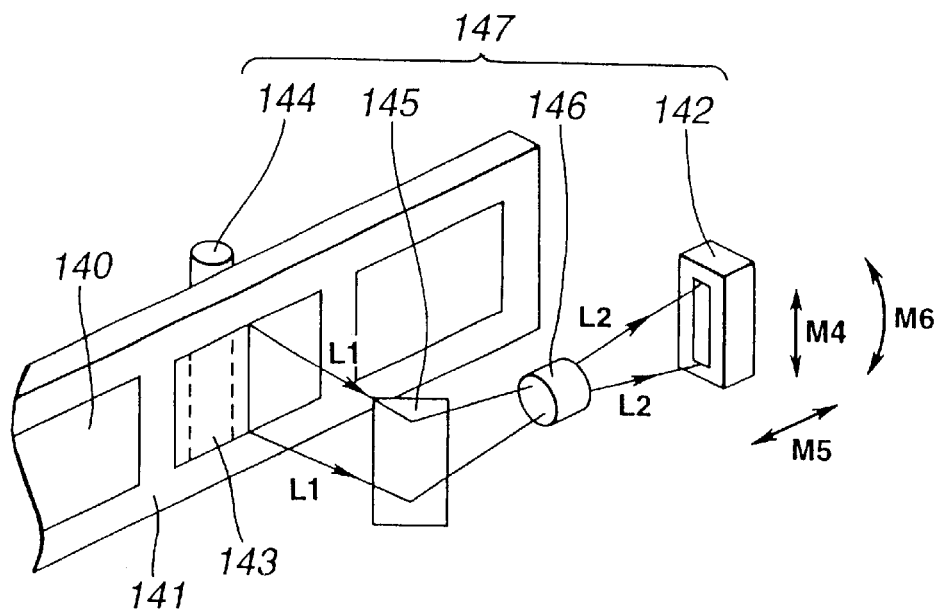
FIG. 27 is an enlarged schematic perspective view, similar to FIG. 26, showing an embodiment of a structure of a film reading unit.

It is noted that the parts or components shown in FIG. 27 are indicated by the same reference numerals and hence are not explained in detail.

Specifically, the CCD unit 147 is rotated in the direction indicated by arrow M6, while being translated in the read line direction as indicated by arrows M4 (vertical direction) and also being translated in the scanning direction indicated by arrow M5 (oblique direction). The optical distance of the reading area on the film 140 in register with the CCD sensor 142, herein a straight line, is not changed by this operation.

Meanwhile, the reading line direction, indicated by arrow M4, corresponding to the reading line for the CCD sensor 142, is perpendicular to the scanning direction for read-out, indicated by arrow M5.

That is, in the instance shown in FIG. 27, the CCD unit 147 is rotated in the direction indicated by arrow M6 in accordance with the tilt of the picture 143, the CCD unit 147 also is translated in the reading line direction as indicated by arrow M54 parallel to the position of the CCD sensor 142 and also in the sub-scanning direction as indicated by arrow M5 at right angles to the position of the CCD sensor 142. For reading out the next picture, it is sufficient if the film holder 141 is translated until the next picture reaches the read-out start position.

It is noted that a computer interfacing unit 12, such as is described above, is used for interconnecting a host computer 19, indicated in FIG. 5 as the external connection equipment 13, and the picture data input/output unit 27, and may be exemplified by a high-sped interface, such as Bi-Centronics, IEEE-1394, USB or SCSI. This computer interfacing unit 12 effects controls for each interface and a variety of protocol controls including control of commands and responses used for bidirectional transmission/reception of picture data with the use of the respective interfaces. The picture data, thus transmitted or received, are handled on the line basis, block basis or on the plane basis.

Up to now, for printing a computer picture on a printer, a variety of processing operations for printout need to be performed on a printer driver provided on a computer. Conversely, with the present printer device, in which these processing operations are performed by the data processing unit 5 and the characteristics correction unit 4, the processing performed by the printer driver of a host computer 19 is reduced significantly. That is, the time consumed in processing by the host computer 19 is shortened to permit the host computer 19 to execute the operations other than printing immediately to reduce the time during which the host computer takes up the CPU.

Also, in this printer device, the picture data inputted from the picture input units 7 described above may be processed in a variety of ways by the data processing unit 5, the resulting data being then routed to the host computer 19 and processed in a variety of ways by other software of the host computer 19 for saving in the host computer 19.

Although four types of means have been described in the foregoing as the picture inputting means 7, these are merely illustrative and the picture inputting means 7 may be configured differently without departing from the scope of the invention.

The picture data input/output unit 27 is a portion responsible for transferring picture data between the picture inputting means 7 and the picture processing unit 6.

That is, the picture data input/output unit 27 is a portion responsible for transferring to the data processing unit 5 the first digital picture data obtained on analog/digital conversion of the digital and/or analog picture signals inputted from outside in the picture inputting means 7.

The picture data input/output unit 27 also has the function of adjusting the picture data transfer timing and the relation between the source and the destination of transfer to prevent collision between different picture data. The picture data input/output unit 27 also has the function of making adjustments to enable picture data inputted from a variety of picture inputting means to be handled in a similar fashion.

The picture data input/output unit 27 receives picture data from the picture data interfacing unit 9 and the film reading unit 11 of the picture inputting means 7, while transmitting/receiving of the removable medium driving unit 10 and the computer interfacing unit 12. That is, the picture data input unit 1 operates as a data inputting/outputting portion. The transmitting/receiving timing of picture data or selection of picture data in the picture data input unit 1 are controlled on the basis of a command from the user interface unit 28, as later explained, if the command from the user is to be followed. The above-described control may also be performed automatically under control by the data processing unit 5.

Among the cases of outputting plural first digital picture data, obtained on analog/digital conversion of externally inputted picture signals, inputted by the picture input means 7, there are the following cases:

One case is where a digital still camera, as an external connection equipment 13, is connected to the picture data interfacing unit 9, there being plural pre-imaged picture data in a memory or a recording medium in the digital still picture camera 14.

Another case is where moving picture signals are inputted to the picture data interfacing unit 9 and captured every pre-set time period or whenever the contents of the moving picture signals are varied, with the captured signals being then digitized into plural first digital picture data.

Still another is such a one in which there are plural picture data in the removable medium 17 connected to or inserted into the removable medium driving unit 10.

Still another case is one in which the photographic film 18 mounted for reading out into the film reading unit 11 is a roll type or a sheet type film in which plural picture information is recorded.

Yet another is such a one in which plural picture data are stored in a storage unit such as a hard disc or a CD-ROM drive in the host computer 19 connected to the computer interfacing unit 12 and in which plural digital picture data are sequentially routed from the host computer 19 to the computer interfacing unit 12 through bidirectional interfaces of the computer interfacing unit 12 and the host computer 19.

The present printer device has, as the aforementioned picture display outputting unit 2, the display device 15 and an output port 16 comprised of an analog picture signal output port and/or a digital picture data output port. The output port 16 is connected an external monitor operating as external connection.

The display device 15 is mainly composed of a full-color display unit and its driving unit. The full-color display unit is adapted to make display of picture data and the display on the user interface unit 28 as later explained. As this display device, a flat panel display, represented by a liquid crystal panel, is preferred. There may also be provided one or more display units, such as LEDs, for displaying the operating states.

The command device 8, operating as inputting means for inputting a command from outside, may be enumerated by a mouse, a track ball, a keyboard, a touch panel provided on the display device 15, and a pen-touch input panel, adapted to make an input with ha pen point. The command device 8 is a portion to which a command from a user is inputted responsive to the control by the user interface unit 28 as later explained. In the touch panel or the pen-touch panel, provided on the display device 15, the display of an actuating key picture on the display device and an input actuating range for the key picture displayed on the touch panel or the pen-touch panel take up the same position or related positions.

If chattering, such as that caused by a key, is likely to be produced, the processing for preventing malfunction by chattering is carried out on an electric circuit or a control software. Among the methods for using the command device 8, there may be such a method in which a range for command acceptance is displayed under control by the user interface unit 28, as a pointer indicating the display position of the command device 8 is displayed on the external monitor display screen represented by a picture signal output from the output port 16, a pointer by the command device 8 being moved to the range and selected to input the user command.

The user interface unit 28 has a function of selecting desired one of plural picture data and converting the selected picture data into first digital picture data, an automatic printing function of performing a sequence of operations of inputting the first digital picture data to the data processing unit 5, occasionally correcting the input picture data, printing-output processing the corrected data in the printing output processing unit 24 and printing and outputting the picture in the picture printing unit 3, a function of display-outputting on the display device 15 and the output port 16 when executing the processing on the respective data, a function of starting the automatic printing under an input command through the command device 8 from the user a function of selecting a picture or reading out picture data under an input command by the user from the command device 8, a function of setting various parameters at the time of editing, working, synthesizing or correcting picture data in the data processing unit 5 in the picture processing unit 6 as later explained, and a function of controlling the printer device under a print output command and under a user command.

The user interface unit 28 converts the picture data in the display device 15 and in the output port 16 processed in the picture processing unit 6 into data that can be outputted to display 15/external monitor while synthesizing a key display, slide volume display or a menu screen display necessary for actuation, and outputting the synthesized display on the display device 15 or outputting the synthesized display to the external monitor. The contents displayed on the display device 15 and the contents displayed on the external monitor as well as the contents of the acceptance commands associated with the contents are determined depending on the operating state of the present printer device and the processing contents in the picture processing unit 6.

Due to such configuration, the contents displayed on the display device 15 and the contents displayed on the external monitor may be set so as to differ from each other. For example, picture data and a picture synthesized by the user interface unit 28 may be displayed on the display device 15, with only picture signals being outputted to the output port 16 and with only picture data being displayed on the external monitor. Specifically, the picture printing range in its entirety is displayed on the display device 15, with only selected picture data being displayed on the external monitor. Conversely, the picture printing range in its entirety is displayed on the external monitor, with only selected picture data being displayed on the display device 15.

Also, in the present printer device, the number of picture printing of each picture data may be set before proceeding to automatic printing processing of selecting desired picture data of plural picture data, converting the selected picture data into first digital picture data, inputting the as-converted picture data to the data processing unit 5, occasionally correcting the picture data and print-output processing a picture in the picture printing unit 3.

The picture processing unit 6 is mainly comprised of the data processing unit 5 and the characteristics correction unit 4, as described above.

The picture processing unit 6 edits, works on, synthesizes and corrects the picture data, inputted via the picture data input/output unit 27 from the picture input means 7, based on pre-set contents or on a user command entered via the user interface unit 28. If the input picture data from the picture data input unit 1 is not of the ideal picture quality characteristics, the data processing unit 5 corrects the input picture data in order to improve the picture quality of the picture displayed on the display device 15 or on the external monitor and the picture printed by the picture printing unit 3.

Specifically, the data processing unit 5 performs the editing, working, synthesis and correction and, if the input picture data inputted from the picture data input unit 1 are not of ideal picture quality characteristics, the data processing unit 5 corrects the input picture data in order to improve the picture quality of the picture displayed on the display device 15 or on the external monitor or the picture printed by the picture printing unit 3. There are occasions in which the data processing unit 5 receives the user command from the command device 8 via the user interface unit 28 and accordingly performs pre-set editing, working, synthesis or conversion on the first digital picture data from the picture data input unit 1 to generate second digital picture data.

In particular, in the above-described printer device of the present invention, the data processing unit 5 also operates as a picture verification unit, such that the data processing unit 5 checks the picture contents of the first digital picture data read out by the film reading unit 11, and extracts and deciphers the picture tilted with respect to the picture frame of the first digital picture data. If the picture is tilted within such a pre-set angle for which the picture can be determined to have been tilted during imaging against the user's intention, the data processing unit 5 sends the status information concerning the tilt to the input position adjustment unit 29 in the film reading unit 11.

The input first digital picture data, which is the picture data other than that read by the film reading unit 11, is similarly extracted and deciphered. The picture data, corresponding to a picture which can be deciphered to be tilted, is similarly processed with rotational movement, slicing and, if necessary, enlarging.

The processing for extracting and verifying the picture contents of the first digital picture data read out by the film reading unit 11, sending out the status information concerning the tilt with respect to the picture frame of the first digital picture data in question to the input position adjustment unit 29 in the film reading unit 11, based on the deciphered results, extracting and deciphering the picture contents of the input digital picture data inclusive of the first digital picture data from the film reading unit 11 and rotating and slicing the picture for the first digital picture data based on the deciphered results, is hereinafter explained.

In the case of the picture input means 7 in which the original picture can be rotated when reading a picture as the first digital picture data, as in the case of the above-mentioned film reading unit 11, the status information is furnished to the input position adjustment unit 29 in the film reading unit 11. If the picture input means 7 is such a one which does not permit the original picture to be rotated when reading a picture as the first digital picture data, it suffices if the data processing unit 5 has the function similar to that of the input position adjustment unit 29 to perform a similar processing.

If, when the contents of a pre-set picture pattern, inputted from the film reading unit 11 and other picture input means 7, there is contained in the extracted picture pattern a picture component that is not completely vertical with respect to the picture frame but which can be approximated to a vertical component within a pre-set angle, or a component that is not completely horizontal with respect to the picture frame but which can be approximated to a horizontal component within a pre-set angle, such tilt may be deciphered to be caused by the user imaging an object of the picture in a hand-held state of the image pickup device, that is without fixing the device, thus causing the object to be tilted unintentionally with respect to the picture frame. Therefore, the unneeded tilt can be corrected if the picture is rotated depending on this angular information.

The above-mentioned pre-set angle is such an angle based on which it is judged whether the picture being imaged has been tilted unintentionally or intentionally. This pre-set angle is selected to give the least risk of error based on previous check into pictures imaged by a large number of persons. By this setting, it is possible to exclude not only a picture tilted intentionally but also a picture obtained on imaging an object tilted from the outset from consideration.

Also, if, when pattern contents of the input first digital picture data are extracted, both the picture component that can be approximated to a vertical picture component and the picture component that can be approximated to a horizontal picture component are extracted, with these components having different angles with respect to the picture frame, the priority sequence can be affixed to one of the components so that rotational movement processing or the rotational processing will be executed depending on the angle the picture component has with the picture frame.

If the two picture components are extracted and deciphered in this manner, priority is preferably placed on the horizontal picture component that can be approximated to horizontal with respect to the picture frame. The reason is that, if horizontal object portions, such as a horizon, abound in the imaged picture, a picture in which the horizontal picture component lies substantially parallel to the picture frame appears more stable and gives a sedated feeling.

Based on the status information, thus obtained, the film reading unit 11 performs picture re-reading under control by the input position adjustment unit 29, to executes similar processing as a digital picture calculating operations.

Figure 28:
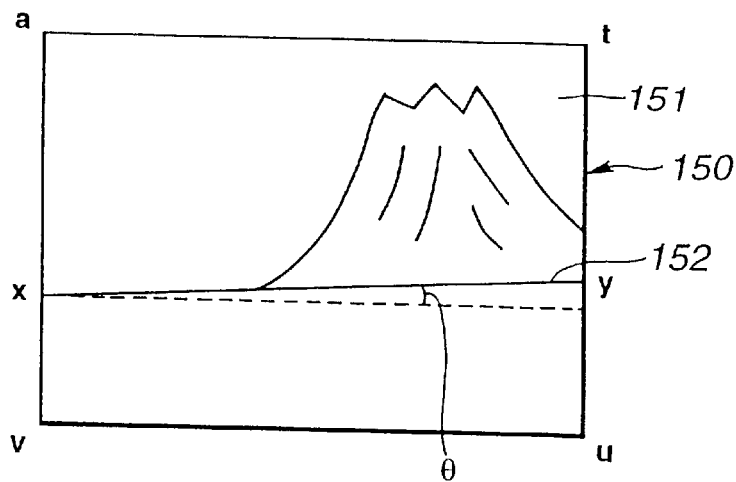
FIG. 28 illustrates an example of a picture read from a film reading unit.
Figure 29:
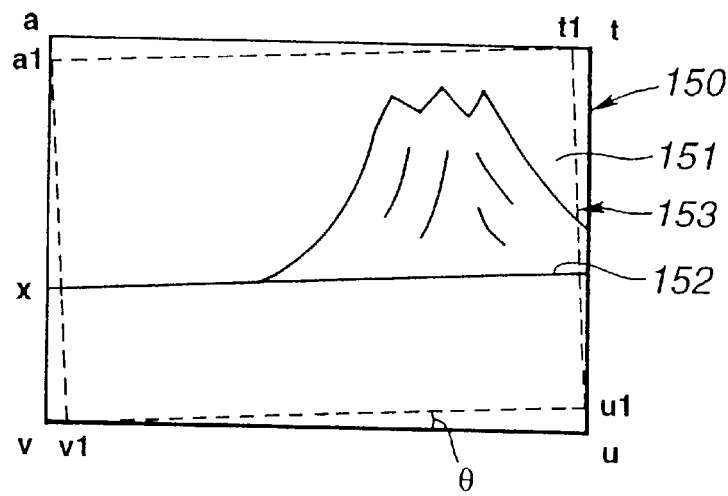
FIG. 29 shows a picture of which a re-reading range is set.

An instance of reading a picture from the actual film reading unit 11 is explained. FIG. 28 shows first digital picture data obtained on rough-scanning. Specifically, a picture 151 is shown in a picture frame 150 defined by points s, t, u and v. In this picture 151, a horizontal line 152, as a horizontal picture component, is shown inclined at an angle θ with respect to a horizontal line segments st and uv constituting the horizontal frame of the picture frame 150.

Thus, the picture frame is rotated by an angle θ to change the picture frame to a picture frame 153 defined by points s1, t1, u1 and v1 to determine the re-reading range. The result is that, in the re-reading range, the horizontal line 152 in the picture frame 151 is substantially parallel to a virtual horizontal line parallel to a line segment s1t1 and a line segment u1vi representing the frame in the horizontal direction of the picture frame.

Figure 30:
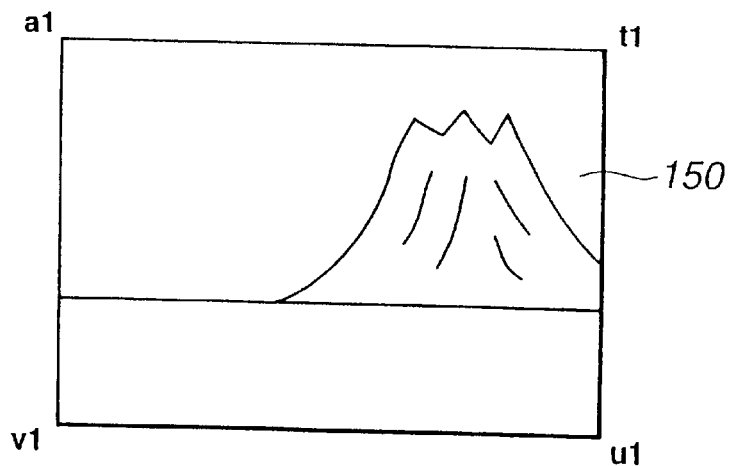
FIG. 30 shows a re-read picture.

If the center point of the rotational movement is not coincident with the center point of the picture, the scan range needs to be translated in order to secure the maximum re-reading range. The direction and the amount of this translation depends on the mechanical structure of the film reading unit 11. Thus, if the re-reading is performed in accordance with the re-reading range as determined by the rotational angle and the mechanical structure, the targeted picture 150 shown in FIG. 30 is obtained.

In particular, in the present printer device, the data processing unit 5 operates not only as a picture verification unit but also as a picture re-arranging unit. The data processing unit 5 verifies whether or not pre-set picture contents of the input first digital picture data are within a specified range of the first digital picture data and, if the pre-set picture contents are within the specified range, the pre-set picture contents are changed so as to be within a prescribed region and the pre-set first digital picture data are re-arranged to generate re-arranged first digital picture data.

The processing for verifying the picture contents in the first digital picture data to change the arrangement of the pre-set picture contents based on the verified results to re-arrange the pre-set first digital picture data is explained.

That is, it is verified whether or not prescribed pre-set picture contents are present in the picture contents of the first digital picture data, and also whether or not the pre-set picture contents are present within the corresponding specified region. If the pre-set picture contents are present in the specified region, the data processing unit 5, operating as the picture re-arranging unit, modifies the pre-set picture contents so that the pre-set picture region will be in the prescribed region to generate re-arranged first digital picture data.

Figure 32:
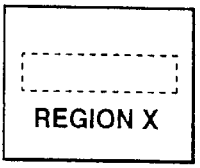
FIG. 32 depicts another example of correspondence between pre-set picture contents and specified and pre-scribed regions.

First, as shown in FIGS. 31 to 33, the correlation pre-set picture contents and the specified region and the prescribed region representing the above-mentioned specified region is prescribed.

The pre-set picture contents indicated in FIGS. 31 to 33 prescribe the main or characteristic picture contents contained in the picture contents of the first digital picture data. The pre-set picture contents may be enumerated by the face of a person, fronting to the forward or transverse side, horizon, a horizontal line, an object having a vertical component, such as a lone tree, and a high-rise building seen from below.

The specified region (region X) shown in FIGS. 31 to 33 represents the maximum range of the region in which the pre-set picture contents are present. If within this range, the gist or the composition of the original picture contents is not changed vitally even if the picture position is changed to the next prescribed region. For example, if the face of a person, fronting to the forward or transverse side, is a specified picture, and the object is imaged, the maximum picture region, which may be presupposed to have the face of the person imaged as a main portion, is the specified region. Therefore, the contents of the object, envisioned by the user, is determined by a portion in the picture in which to place the object, and an actual imaging range.

The prescribed region (region Y) shown in FIGS. 31 to 33 indicates a region in which to place the center of the pre-set picture contents, such as the center of gravity, when the pre-set picture contents are arranged in the specified region. For example, a point Y and a line Y obtained on golden section of each side of a picture can be prescribed, and a prescribed region containing the point y and the line Y in its inside (region Y) can be set. Such a range which gives substantially equivalent effects as those obtained when the pre-set picture contents are arranged on the point y and on the line Y is the prescribed region.

After this correspondence is realized, picture pattern contents of the input first digital picture data are then extracted and it is then verified to which of the predetermined pre-set picture contents corresponds the extracted picture pattern. It is then verified whether or not the extracted pre-set picture contents pare present in the corresponding specified region. If the pre-set picture contents have a certain two-dimensional extension, verification is made of its center of gravity.

If pre-set picture contents can be extracted in the input picture data, and are present in a specified region, the picture contents are changed so that the pre-set picture contents will be in the corresponding prescribed range.

By executing respective processing operations, as later explained, on the resulting picture data, the resulting data are displayed on the display device 15 and/or on the external monitor, while being printed on the recording medium by the picture printing unit 3.

There are following methods for changing the pre-set picture contents so that these will be in the prescribed region.

Figure 34A:
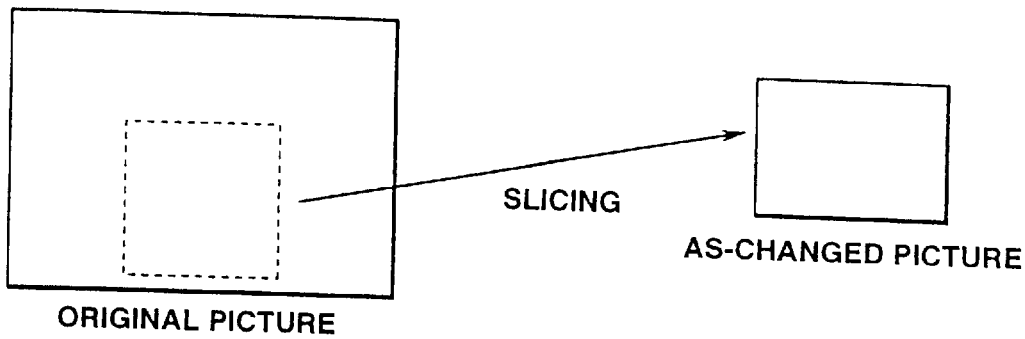
FIGS. 34A–34C are schematic illustrations showing an example of the method for modifying the pre-set picture contents so that these will enter a prescribed region.
Figure 34B:
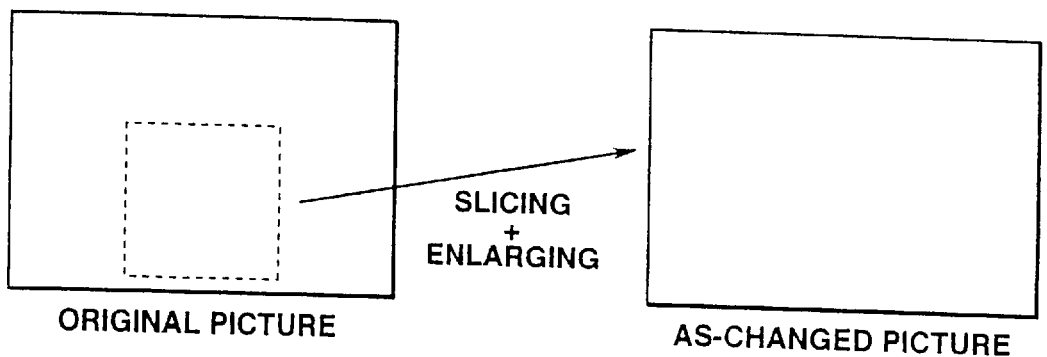
Figure 34C:
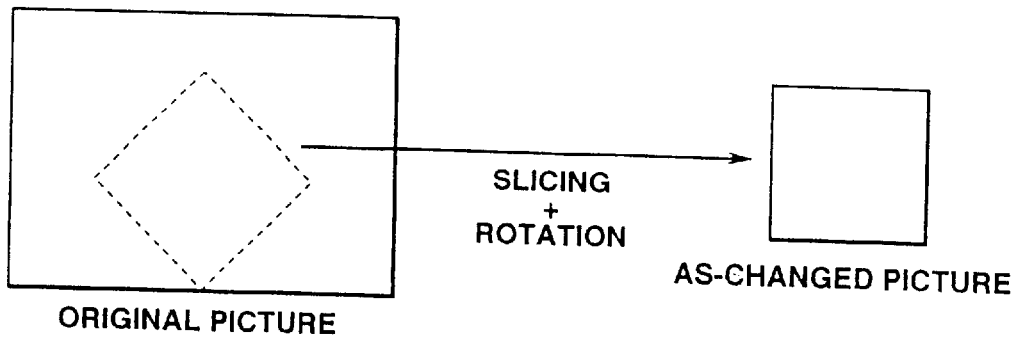

That is, there is such a method in which a picture is sliced so that pre-set picture contents in an original picture will be in a prescribed region to produced an as-changed picture, as shown in FIG. 34A. There is also such a method in which, in a case wherein, if a picture is sliced so that pre-set picture contents in an original picture will be in a prescribed region to print a picture on a recording medium, the picture size is below the desired size, the sliced picture is enlarged to a desired size to produce an as-changed picture, as shown in FIG. 34B. In the latter case, the picture data may be sequentially enlarged as the picture data are sliced from the original picture data, while the original picture data may also be enlarged and subsequently a picture of a required size may be sliced.

There is also such a method in which, if, when slicing a partial picture from the original picture data, pre-set picture contents need to be angled with respect to the original picture data and need to be rotated through such angle, in order that the pre-set picture contents will be positioned in the prescribed region, the sliced picture is rotated to give the as-modified picture. Alternatively, when the partial picture is sliced from the original picture data, the array of respective pixels can be rotated to give the as-changed picture. The target picture may also be sliced after rotating the original picture data.

Figure 35A:
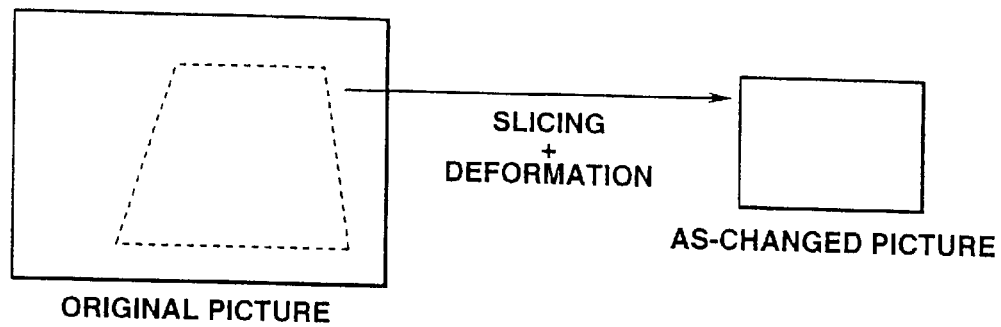
FIG. 35 is a schematic view showing another example of the method for modifying the pre-set picture contents so that these will enter a prescribed region.
Figure 35B:
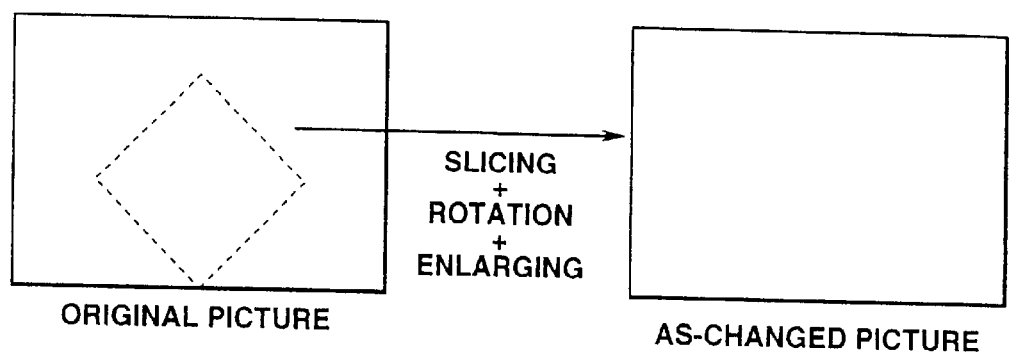
Figure 35C:
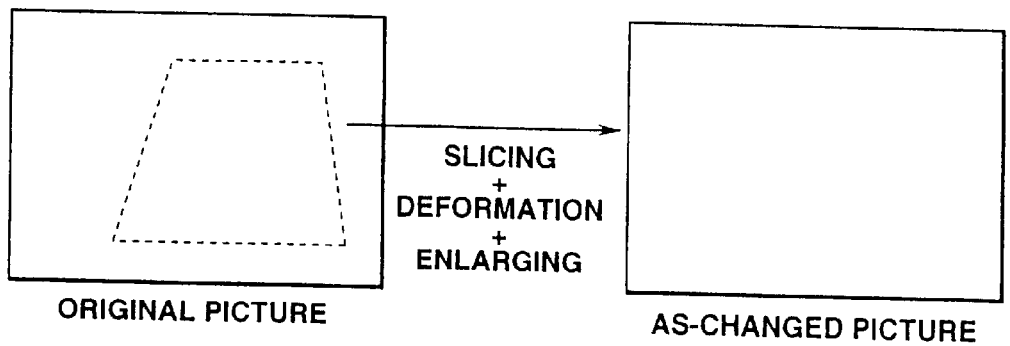

If the picture sliced from the original picture for arranging the pre-set picture contents in the prescribed region is not the same as the picture configuration printed on a recording medium, the sliced picture may also be deformed to give an as-changed picture. The deforming operation may be sequentially executed as the picture is sliced to generate the targeted picture. For example, if a medium-height to high-rise building is looked up from the ground surface at a pre-set distance and imaged, the building is trapezoidal in the picture resulting from imaging. This building is intrinsically desirable to be imaged to a rectangular shape. Thus, the picture including a trapezoidal picture of the building is sliced from the picture data obtained on imaging to effect conversion to a rectangular shape. Alternatively, the deforming processing to the rectangular shape is sequentially performed as the picture is sliced. There is also such a method in which the original picture is sliced for arranging the pre-set picture contents in the prescribed region and the sliced picture portion is rotated and enlarged to give an as-modified picture, as shown in FIG. 35B, or in which the original picture is sliced for arranging the pre-set picture contents in the prescribed region and the sliced picture portion is deformed and enlarged to give an as-changed picture, as shown in FIG. 35C.

In the above-described methods, it is presupposed that necessary portions are sliced from the original picture portion as the changing method. It is also possible to delete peripheral portions or non-crucial portions from the original picture data to achieve the targeted change by a processing not accompanying the slicing.

The above-described correlation between the pre-set picture contents and the specified region and prescribed region representing the specified range desirably can be changed in the above-described printer device of the present invention, whereby the relation of correspondence can be rewritten or corrected or a new correlation can be supplemented.

Preferably, the correlation can be changed by input characteristics of the picture input means 7 depending on the particular picture input means 7 from which the picture data has been inputted. Alternatively, plural correlations may be provided from the outset so that an optimum correlation can be selected depending on which picture input means 7 has been used.

The data processing unit 5 is also adapted to effect accessing control to the picture memory 20, so that picture data can be written or read under control by the data processing unit 5. The picture data that is saved is edited, worked on, synthesized or corrected in the data processing unit 5 of the picture processing unit 6 and, if there is the information pertinent to this picture data, the correlated information also is held.

The data held in the picture memory 20 may be in a compressed, reversibly compressed or irreversibly compressed form. Which of these forms is used is determined in dependence upon whether or not the form permits facilitated data handling in the picture processing unit 6, whether or not the picture quality is deteriorated only to an allowable range on repeated compression and restoration, the maximum value of the number or capacity of the picture data held in the picture memory 20 or the read/write velocity of the picture memory 20. If the processing speed, deterioration in the picture quality or data handling is taken into account, it is preferred that the picture data is held in the picture memory 20 in a non-compressed form. A portion of the picture memory 20 may also be used as a picture data processing memory in the processing stage in the picture processing unit 6.

If, when having access to picture data in the picture memory 20, picture data is to be held in the compressed form in the picture memory 20, the picture data is written after picture data compression in the data processing unit 5. Of course, the compressed data is expanded in the data processing unit 5 during read-out.

Since the accessing control is also made in the data processing unit 5, control may be performed by time-divisional accessing in case the picture data write timing in the picture memory 20 is likely to conflict with the readout timing from the picture memory 20, or by delaying one of the timings. By using a structure in which the capacity of the picture memory 20 can be increased or decreased, the effective capacity of the picture memory 20 can be detected to enable regular address control to the picture memory 20.

If, in the picture data interfacing unit 9 or the film reading unit 11, the correction processing characteristic of the respective inputs is not effected during imaging or readout of respective picture data, the data processing unit 5 is able to perform digital working.

Meanwhile, in the data processing unit 5, the picture data mainly is handled in the digital form. If the digitized picture data read from the picture data input unit 1 continues to be processed as the number of bits for calculation of each data remains the same as that of the input picture data, the calculating accuracy is lowered progressively. Therefore, during calculation, the number of bits of each data is increased by 2 to 4 to prevent deterioration of the calculation accuracy to assure the picture quality of the printed picture.

If the user effects desired editing, working, synthesis and correction on the first digital picture data inputted from the picture data input unit 1, output display on the display/external monitor is effected under control by the user interface unit 28, based on the command issued from the command device 8, thus permitting the user to check the desired processing.

If the user performs desired processing on the first digital picture data to generate second digital picture data, and issues a command to print it, the second digital picture data is routed via the printing output processing unit 24, as later explained, to the picture printing unit 3.

The processing executed in the data processing unit 5 in the picture processing unit 6, such as editing, working, synthesis or correction, may be configured to permit subsequent addition or updating, from the removable medium driving unit 10 or the computer interfacing unit 12, of parameters used in each processing and software for each processing, such that a new function can be added to the printer device.

The picture data obtained on editing, working, synthesis or correction and conversion in the picture processing unit 6 may be written or saved in the removable medium 17 via the removable medium driving unit 10. Also, picture data are sent to the host computer 19 connected to outside via computer interfacing unit 12 to enable multifarious uses of the picture data picture processing software and the picture handling software in the host computer 19.

The picture processing unit 6 also includes the characteristics correction unit 4 in addition to the data processing unit 5. The characteristics correction unit 4 is made up of the display device processing unit 22, picture signal processing unit 23 and the printing output processing unit 24.

The display device processing unit 22 is configured for performing the correction matched to the characteristics of the display device 15 in order to display the first digital picture data or the occasionally processed second digital picture data via the user interface unit 28 on the display device 15.

The picture signal processing unit 23 is configured for performing the correction matched to characteristics of the display equipment for external connection and to characteristics of standard picture signals outputted to the display equipment for external connection, in order to display the first digital picture data or the occasionally processed second digital picture data via the user interface unit 28 on the display equipment for external connection, such as external monitor.

There are occasions wherein the picture data outputted from the display device processing unit 22 and the picture signal processing unit 23 to the user interface unit 28 is synthesized with other data in the user interface unit 28 to display the synthesized picture data on the display device 15 or on the external monitor. In such case, the picture data is frequently synthesized with the display or letters requesting user commands or with a pattern generated in the data processing unit 5.

The printing output processing unit 24 is configured for converting and correcting data for printing in the picture printing unit 3 and for sending the corrected data to the picture printing unit 3. The printer device of the present invention effects starting of the actual printing operation in an automatic printing system of inputting first digital picture data selected from plural picture data, occasionally correcting the data, print-outputting processing the resulting data in the printing output processing unit 24, and printing and outputting a picture in the picture printing unit 3. The printer device of the present invention also converts and corrects the first digital picture data sent from the data processing unit 5, occasionally processed first digital picture data or second digital picture data for printing by the picture printing unit 3 by the user selecting a picture for printing and outputting under control by the user interface unit 28.

Usually, the first digital picture data, occasionally processed first digital picture data or second digital picture data are data of 8 or more bits per color in RGB signals. However, three colors of CMY or four colors of CMYK are used as inks in a printer head 25 used in the picture printing unit 3. Thus, the printing output processing unit 24 converts the RGB signals into these colors, while effecting color correction for correcting color shift of the print output attributable to the non-optimum spectroscopic sensitivity of each of the recording inks of the respective colors or toners, and effecting conversion correction processing related to environmental conditions prevailing at the time of recording, such as printer head 25, inks, toner or coloration characteristics of the recording medium.

Also, the printing output processing unit 24 re-arrays the picture data transferred to the printer head 25 in the printing sequence actually used in the printer head 25. To this end, a transient buffering RAM for printing data may be provided in the printing output processing unit 24. Alternatively, when the data processing unit 5 reads out the picture data from the picture memory 20, the readout addresses may be controlled to be in accordance with the printing sequence in the printer head 25.

In the present printer device, the picture displayed on the display/external monitor and the picture printed on the picture printing unit 3 are represented as being of visually equivalent picture quality.

To this end, the setting of the display output characteristics prescribing the display picture quality in the display/monitor is corrected by the display device processing unit 22 and/or the video signal processing unit 23 in association with the setting of printing characteristics prescribing the printing picture quality in the picture printing unit 3. Conversely, the setting of printing characteristics prescribing the printing picture quality in the picture printing unit 3 is corrected by the printing output processing unit 24 in association with the setting of the display output characteristics prescribing the display picture quality in the picture display outputting unit 2.

The picture printing unit 3 is mainly made up of a print head driving unit 26 and a printer head 25. When the printing operation is started, printing data processed with conversion and correction necessary for printing by the printing output processing unit 24 in the picture processing unit 6 is routed to the print head driving unit 26. The print head driving unit 26 converts the printing data into the driving voltage, driving current and driving waveform sufficient for driving the printer head 25, in accordance with the driving timing of the printer head 25, to output the resulting driving voltage, driving current and driving waveform to the printer head 25.

That is, the operation of the print head driving unit 26 occurs in synchronism with the operation of the printing mechanism accompanying the printing by the printer head 25, movement of the printer head 25, movement of the printer head 25, maintenance of the printer head 25 and the ink furnishment. There are occasions wherein an analog circuit configuration executes correction suitable for optimum printing in accordance with the environmental status for printing on the basis of an input from a detection device such as a temperature sensor. If this correction processing can be executed by digital processing, it can be executed by the printing output processing unit 24 in the picture processing unit 6. The print head driving unit 26 is configured and operated in accordance with the type and the number of the printer heads 25 to be in use, structure of the printing mechanism etc.

The printer head 25 is configured for actually emitting the recording ink on to the recording medium or depositing the recording toner on the recording medium for printing. The printer head may be enumerated by an ink jet printer head disclosed in Japanese Laying-Open Patent H-7-164656 or in Japanese Laying-Open Patent H-8-336990, both of which are incorporated herein by reference, in particular a flying recording material type printer head or a two-liquid mixing type printer head. Other examples of the printer head include a dye diffusion type thermal head, a picture forming portion of a laser beam printer and so forth.

Of these, the flying recording material type printer head or the two-liquid mixing type printer head, capable of full-color half-tone recording, are preferred in that these printer heads can realize full-color printing to high picture quality. The line printer head and the serial printer head can be constructed depending on the width of the printer head. In the case of the line printer head, the printing time can be reduced because it suffices for the recording medium to be moved in one direction with respect to the line printer head. In the case of the serial printer head, the recording medium and the serial printer head need to be moved relative to each other in two directions.

In the present embodiment, the picture data input unit 1, picture processing unit 6, picture memory 20, command device 8, display 15 and the picture printing unit 3 are constructed unitarily to constitute a main body portion 21.

Alternatively, the picture inputting means 7 of the picture data input unit 1 may be isolated from the main body portion 21. For example, the film reading unit 11 may be connected to the main body portion by a bidirectional interface. If, in this case, the signals from the photoelectric transducing element or control signals of the read-out mechanism are transmitted/received in two directions, the function equivalent to that in case the film reading unit 11 is assembled into the main body portion 21 can be achieved. In this case, a universal interface such as an IEEE-1394 interface, may be used as the interface. By using this universal interface, transmission/reception with other picture input units 7 via this interface may be realized if the other picture inputting means 7 is used in place of the film reading unit 11 and the software configuration controlling the communication therebetween is used.

If the picture inputting means 7 is provided in isolation from the main body portion 21 to permit separation from the main body portion 21, it becomes possible to connect only the required portions of the picture input unit 7 to the main body portion 21 to permit size reduction of the printer device and saving in the mounting space. The display device 15, assembled into the main body portion 21, is preferably movable on the main body portion 21. For example, the display device 15 is preferably held on the casing-like main body portion 21 via a support for rotation within a pre-set range to assure facilitated viewing and recognition by the user. The display device 15 may be mounted in isolation from the main body portion 21 and preferably has a physical or electrical coupling mechanism with respect to the main body portion 21 to permit viewing and recognition by the user even from remote places. That is, since the picture characteristics, such as color tones, of the displayed picture on the display device 15 are susceptible to ambient environments, the display device 15 is preferably mounted for movement on the main body portion 21 or in isolation therefrom to facilitate viewing and recognition under a condition in which the environment in which the display device 15 is less susceptible to ambient environments.

The command device 8 may also be arranged to be separate from the main body portion 21 in which case the user is able to actuate the printer device from remote places.

By configuring the main body portion 21 as described above, the using method or the correction method devoted to the present printer may be used. The result is the simplified using method and expeditious processing made possible by the optimum algorithm.

For printing actually by this printer head, the following operation, for example, is performed. First, for prompting the user to input a picture, the user interface unit 28 causes the display device 15 and/or the external monitor to make a display which will permit the user to select from which picture input means 7 a picture is to be inputted. The user accordingly selects the particular portion of the picture input means 7 to be accessed, using the command device 8, in order to capture a picture desired to be printed. If the computer interfacing unit 12 is selected, selection may be made using the host computer 19 in place of the command device 8.

The selected picture input means 7 then converts the externally inputted accessible digital picture data and/or analog picture signals, either in the non-contracted or in the contracted state, by analog/digital conversion into first digital picture data which is routed via picture data input/output unit 27 to the picture processing unit 6.

The aforementioned first digital picture data are inputted to the data processing unit 5 in the picture processing unit 6 where picture data are stored, if necessary, in the picture memory 20. Moreover, the data is corrected for specified picture characteristics for display on the display device 15 or on the external monitor.

The picture data, corrected as described above, is outputted to the display device 15 or to the external monitor for displaying the picture. If there are plural picture data accessible to the picture data input unit 1 as described above, the picture data is occasionally contracted in size so that plural picture data will be displayed on the same picture frame.

The user then commands, by a command device, a picture printed after execution of each processing, to the above-mentioned plural accessible picture data displayed on the display device 15 or on the external monitor. If processing is executed for the totality of accessible picture data, it is unnecessary for the user to select the picture data. This sets picture data for processing.

If, in the present printer device, a sequence of operations of inputting the selected first digital picture data to the data processing unit 5, where the control or processing for correcting picture tilt is effected to generate adjusted or modified first digital picture data and/or the position of the picture contents is changed to generate re-arranged first digital picture data, or the correction for improving the picture quality and editing, working, synthesis or correction are sequentially performed to produce second digital picture data which is print-output processed in the picture printing unit 3 to print and output a picture in the picture printing unit 3, it is possible to selectively use an automatic printing system of effecting the above processing automatically or a manual system of varying the processing parameters by the inputting of the command device to effect the above processing manually, referred to below as the manual printing system.

If the above processing is effected automatically, it suffices if the user issues the corresponding command, whereby the above-mentioned processing is executed.

If the above processing is carried out manually, each desired processing is sequentially performed on each of the first digital picture data.

If, when picture data desired to be printed is selected using the automatic printing system or the manual printing system, these first digital picture data are not held in the complete state in the picture memory 20, the specified first digital picture data needs to be again read by the picture data input unit 1 so as to be held in the picture memory 20 via the picture processing unit 6.

If, when the selected first digital picture data is inputted to the data processing unit 5, the picture contents of the pre-set first digital picture data are checked. If the picture is tilted, the same picture is again rotated or otherwise controlled to correct the tilt to re-input the picture from the picture input means 7, or the equivalent processing is performed on the adjusted or changed first digital picture data.

It is possible to cause a picture of picture data read before correcting the tilt of the picture on the display device 15 and to cause the controlled or processed picture for correcting the picture tilt on the external monitor. In this case, an area destined for control for rotation etc for a pre-processing or pre-control picture for correcting the picture tilt may be displayed on the displayed picture for clarifying the area. The display contents on the display device 15 and on the external monitor may be reversed from those of the embodiment described above. It is also possible to keep the pre-change picture displayed on the display device and to check the post-change picture by the printed picture.

If the selected first digital picture data is entered to the data processing unit 5, the picture contents of the pre-set first digital picture data are checked. If pre-set picture contents in the first digital picture data are within a specified range, the specified picture are modified so as to be arranged in the prescribed region to generate first digital picture data and to effect correction for improving the picture quality of the picture data.

At this time, the picture of the picture data as read before picture re-arrangement may be displayed on the display device 15, while the re-arranged picture may be displayed on the external monitor. In this case, the range of the picture prior to pre-arrangement may be indicated on the display picture to clarify the re-arranged picture to indicate the re-arranged area, or the range may be indicated on the displayed picture to clarify the sliced region. The display output contents on the display device 15 and on the external monitor may be the same as or reversed from that in the previous embodiment. The pre-change picture may be kept displayed on the display device while the post-amendment picture may be checked from the printed picture.

If, in the present printer device, a command for changing the processing contents, namely the correction of the pre-set first digital picture data, conversion to the printing data and a printing output, is inputted from outside during a pre-set time interval which elapses since the pre-set first digital picture data, adjusted second digital picture data, changed first digital picture data, re-arranged first digital picture data or the first digital picture data being processed is displayed, or a command for changing the processing contents, namely the conversion of the pre-set second digital picture data into printing data and a printing output is inputted from outside within a pre-set time interval which elapses since the second digital picture data obtained on editing etc of the pre-set first digital picture data, the processing is preferably carried out in accordance with the manual printing system based on the commands from outside.

If the control and the processing for correcting the tilt of the pre-set first digital picture data or the modification for re-arranging the pre-set first digital picture data is executed automatically and/or manually in the data processing unit 5, the first digital picture data is occasionally converted into the second digital picture data. The printing output processing unit 24 then effects the processing required for printing the first or second digital picture data in the picture printing unit 3. Thus, the picture data is converted into printing data, which is routed to the picture printing unit 3.

In the picture printing unit 3, the printer head 25 is driven via the print head driving unit 26 to execute the actual printing. If the pre-set first digital picture data comes to a close, the printing of the next first digital picture data is started in accordance with the automatic or manual printing system.

If there is no necessity of editing etc the first digital picture data, it may be directly routed to the printing output processing unit 24 for similar processing.

If a manual input is made from outside to perform control or processing for correcting the picture tilt or re-arranging of changing the picture arranging position, a command is issued from the command device 8 as the user views the picture displayed on the picture display outputting unit 2 to perform the desired processing to issue the printing command. The adjusted or modified first digital picture data or the re-arranged first digital picture data are converted into printing data which is outputted for printing a picture.

The printing operation occurs in synchronism with the operation of the recording medium.

The present printer device is configured so that the characteristics correction unit 4 will correct the setting of display output characteristics prescribing the display picture quality in the picture display outputting unit 2 in accordance with the setting of printing characteristics prescribing the printing picture quality in the picture printing unit 3, or so that the characteristics correction unit 4 will correct the setting of printing characteristics prescribing the printing picture quality in the picture printing unit 3 in accordance with the setting of display output characteristics prescribing the display picture quality in the picture display outputting unit 2.

Figure 36:
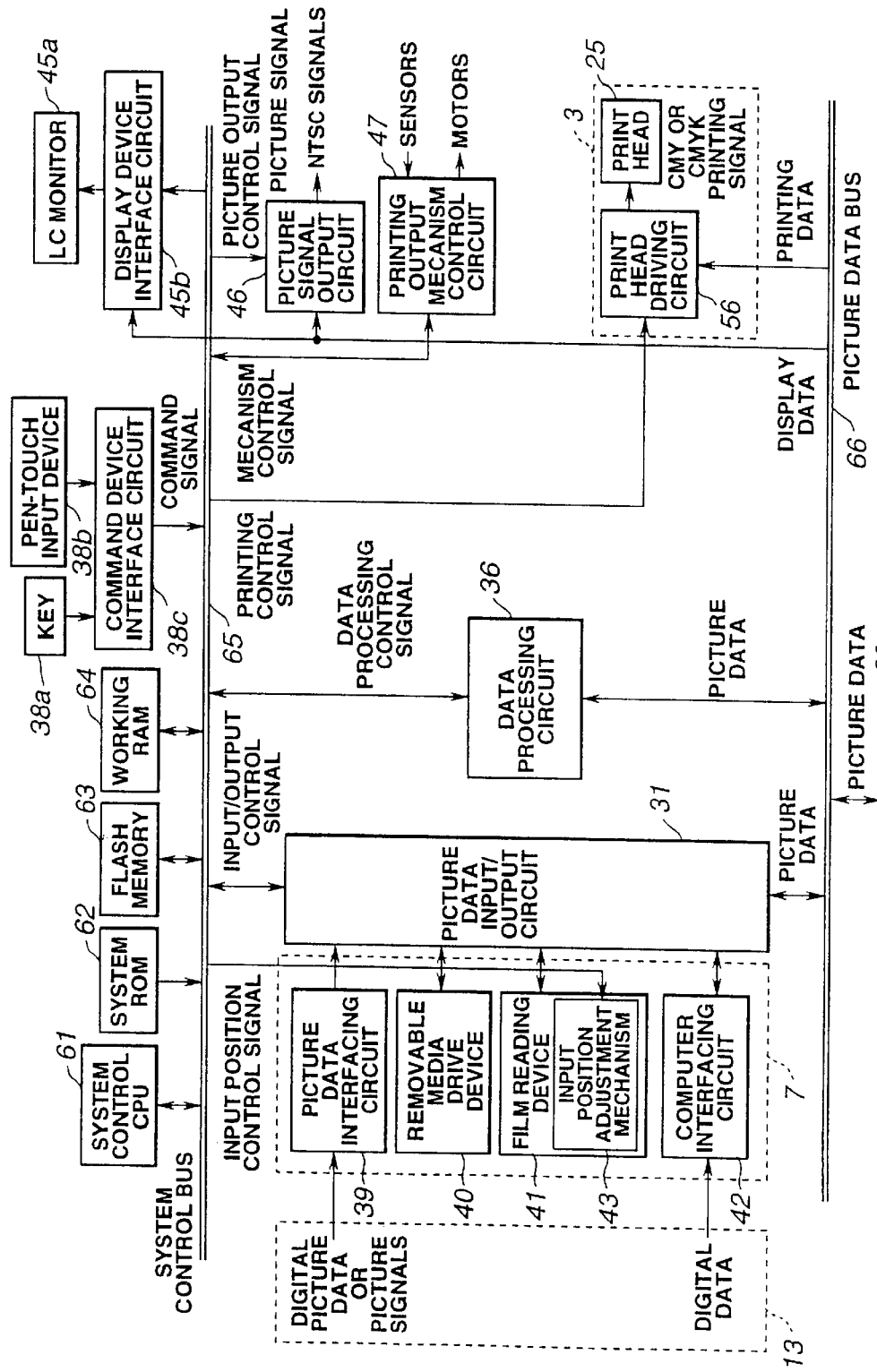
FIG. 36 is a circuit diagram showing the structure of a printer device according to the present invention.

The circuit configuration of the present printer device is shown in FIG. 36. The circuit configuration is similar to that shown in FIG. 5 and includes the circuitry corresponding to the external connection equipment 13, picture input means 7, picture data input/output unit 27, picture processing unit 6, picture display outputting unit 2, command device 8 and the picture printing unit 3. That is, the circuit configuration includes the picture data interfacing circuit 39, removable medium driving device 40, film reading unit 41 and the computer interfacing unit 42, in association with the picture input means 7, and the picture data input/output circuit 31 in association with the picture data input/output unit 27.

In particular, the printer device of the present invention includes an input position adjustment unit 43, corresponding to the input position adjustment unit 29, in the film reading unit 41.

The printer device also includes, as a circuit associated with the picture processing unit 6, a data processing circuit 36, within which there are provided a data processing unit, a display device processing unit, a picture signal processing unit and a print output processing unit.

As the command device 8, the printer device includes plural keys 38a, arranged on the printer device of the present embodiment to permit an inputting operation by the user, a pen-touch input device 38b formed liquid crystal monitor 45a arranged as the display device 15 and which enables an inputting actuation by the user with a pen-like tapered inputting device, and a command device interfacing circuit 38c for inputting to the user interface unit 28 as later explained. This command device interfacing circuit 38c prevents mistaken inputting attributable to the chattering phenomenon and is configured so that, if the same portion of the key 38a or the pen-touch input device 38b is continuously thrust for a pre-set time duration, the circuit 38c deems that the actuation has been done a plural number of times to transmit the inputting to a circuit corresponding to the user interface unit 28 the plural number of times.

In association with the display device 15 of the picture display outputting unit 2, there are provided a liquid crystal monitor 45a and a display device outputting circuit 45b to which are transferred picture data in the picture memory 20. The circuit 45b synthesizes a menu picture for display on the liquid crystal monitor 45a to an actuation display picture for the pen-touch input device to form driving signals that can be displayed on the liquid crystal monitor 45a.

There is also provided a picture signal outputting circuit 46 which, based on picture data transferred from the picture memory 20 and on display control signals from a circuit corresponding to the user interface unit 28, as later explained, synthesizes a menu picture displayed on the external monitor and the actuation display picture for the pen-touch input device to form standard picture signals that can be displayed on the external monitor, such as NTSC signals. In such case, the picture displayed on the liquid crystal monitor 45a may be the same as or different from the picture displayed on the external monitor.

The printer device also includes, in association with the picture printing unit 3, a print head driving circuit 56 and a printer head 25. The printer device also includes a print output mechanism control circuit 47 for effecting the driving of the mechanism required for printing and status detection, such as by driving a variety of motors, clutches or a head maintenance mechanism, accepting inputs from various sensors configured for detecting the motion of the recording medium or that of the printer head and transmitting the results to a system control CPU 61 as later explained.

The present printer device also includes the system control CPU 61 employing a working RAM 64 by the control software in the system ROM 62 or in the flash memory 63. This system control CPU 61 performs comprehensive control of the printer device and operates as the circuit corresponding to the user interface unit 28.

The above-mentioned various components are connected to a system control bus 65, to which are also connected the above-mentioned circuits or units, namely the picture data input/output circuit 31, data processing circuit 36, command device interfacing circuit 38c, display device output circuit 45b, picture signal outputting circuit 46, print output mechanism control circuit 47 and the picture printing unit 3. Of these, the picture data input/output circuit 31, data processing circuit 36, display device output circuit 45b, picture signal outputting circuit 46 and the picture printing unit 3 are also connected to the picture data bus 66 of the picture memory 20.

The control software in the flash memory 63 can be exchanged with a new one from the removable medium driving device 40 or the computer interfacing unit 42 via the picture data input/output circuit 31.

If a unique control software is required in the operation of the data processing circuit 36, and there is no ROM nor a volatile RAM in the data processing circuit 36, such unique control software needed in the data processing circuit 36 may be configured to be transmitted from the system ROM 62 or the flash memory 63 to the data processing circuit 36. It is desirable in such case to input the software needed in the data processing circuit 36 from the removable medium driving device 40 and the computer interfacing unit 42 for storage transiently in the flash memory 63 or in the working RAM 64 for subsequent transfer to the data processing circuit 36. The control executed by the system control CPU 61 by the control software in the system ROM 62 or in the flash memory 63 includes, first of all, the comprehensive control of the printer device. The control also includes driving control of the picture data interfacing circuit 39, removable medium driving device 40, film reading unit 41 and the computer interfacing unit 42 via the picture data input/output circuit 31, handling of picture data inputted by the above-mentioned control and editing, working, synthesis or correction control for picture data in the data processing circuit 36, picture display control for the liquid crystal monitor 45a and the external monitor, user interfacing control for the inputting of the actuating command from the key 38a or the pen-touch input device 38b and for the outputting to the liquid crystal monitor 45a and the external monitor, control of the print output mechanism control circuit 47 for effecting comprehensive control of the picture printing unit 3, and other supplementary control. In particular, the printer device of the present invention includes inputting control of input position control signals, specifying the results of verification of the picture contents by the data processing circuit 36, to the input position adjustment unit 43 in the film reading unit 41.

Thus, if, in the control software for the mechanical portion of the system control CPU 161, the shape and the operating method of the printer head 25, such as a line head or a serial head, and the operating method for the recording medium, are changed, the contents of the software and the circuit contents are changed. Stated differently, the control software and the control circuit are determined by the mechanical structure of the printer head 25.

The processing performed in actual printing is as follows: That is, in FIG. 16, the digital picture data or picture signals or digital data, inputted from the external connection equipment 13, are converted by the picture data interfacing circuit 39, removable medium driving device 40, film reading unit 4 land the computer interfacing unit 42, corresponding to the picture input means 7, into first digital picture data, which is inputted to the picture data input/output circuit 31 corresponding to the picture data input/output unit 27.

The first digital picture data then is routed via the picture data bus 66 to the data processing circuit 36 under control by the input/output control signals from the system control bus 65. Of course, the system control CPU 61 is performing controlling of the timing etc.

The deciphered results of the picture contents of the first digital picture data in the data processing circuit 36 are sent over the system control bus 65 to the input position adjustment unit 43. Of course, the system control CPU 61 is performing controlling of the timing etc.

The data processing circuit 36 extracts at least one of a vertical picture component and a horizontal picture component of the pre-set first digital picture data inputted via the picture data input/output circuit 31. The vertical picture component and the horizontal picture component are components that can be approximated in the vertical direction and in the horizontal direction of the picture frame, respectively. If one of these picture components is detected, an angle which the extracted picture component makes with the associated vertical or horizontal direction is found and inputted as an input position control signal to the input position adjustment unit 43. In the input position adjustment unit 43, the input position of the analog picture signals, from which the above-mentioned pre-set first digital picture data has been originated, is rotationally moved and adjusted to generate adjusted first digital picture data.

It is also possible to modify the picture contents of the first digital picture data in the data processing circuit 36 by rotational movement to generate the modified first digital picture data.

That is, if, in the present printer device, an object for imaging is tilted with respect to a picture frame in the pre-set first digital picture data, the vertical picture component and/or the horizontal picture component in the object for imaging is extracted to decipher the angle which these picture components make with the associated directions to correct the tilt automatically to produce a printed picture having a sufficient composition.

Also, in the present printer device, the data processing circuit 36 verifies whether or not pre-set picture contents of the first digital picture data in the data processing circuit 36 are present in a pre-set region of the first digital picture data. If the pre-set picture contents are present in the pre-set region, the data processing circuit 36 modifies the pre-set picture contents so as to be present in the prescribed region to re-arrange the pre-set first digital picture data to generate the re-arranged first digital picture data.

The first digital picture data, occasionally adjusted/modified/re-arranged, are processed in a pre-set fashion by the data processing circuit 36 to generate second digital picture data which is saved in the picture memory 20 if so required. In such case, the pre-set processing is sent from the key 38a or the pen-touch input device 38b via the command device interfacing circuit 38c to the data processing circuit 36. Of course, the system control CPU 61 is performing the timing etc at this time.

The second digital picture data, processed in a pre-set fashion, is sent to the display device output circuit 45b, picture signal outputting circuit 46 and to the print head driving circuit 56 to effect picture display and printing. Of course, the system control CPU 61 is controlling the timing etc. and the above-described various components are operating as normally.

Figure 37:
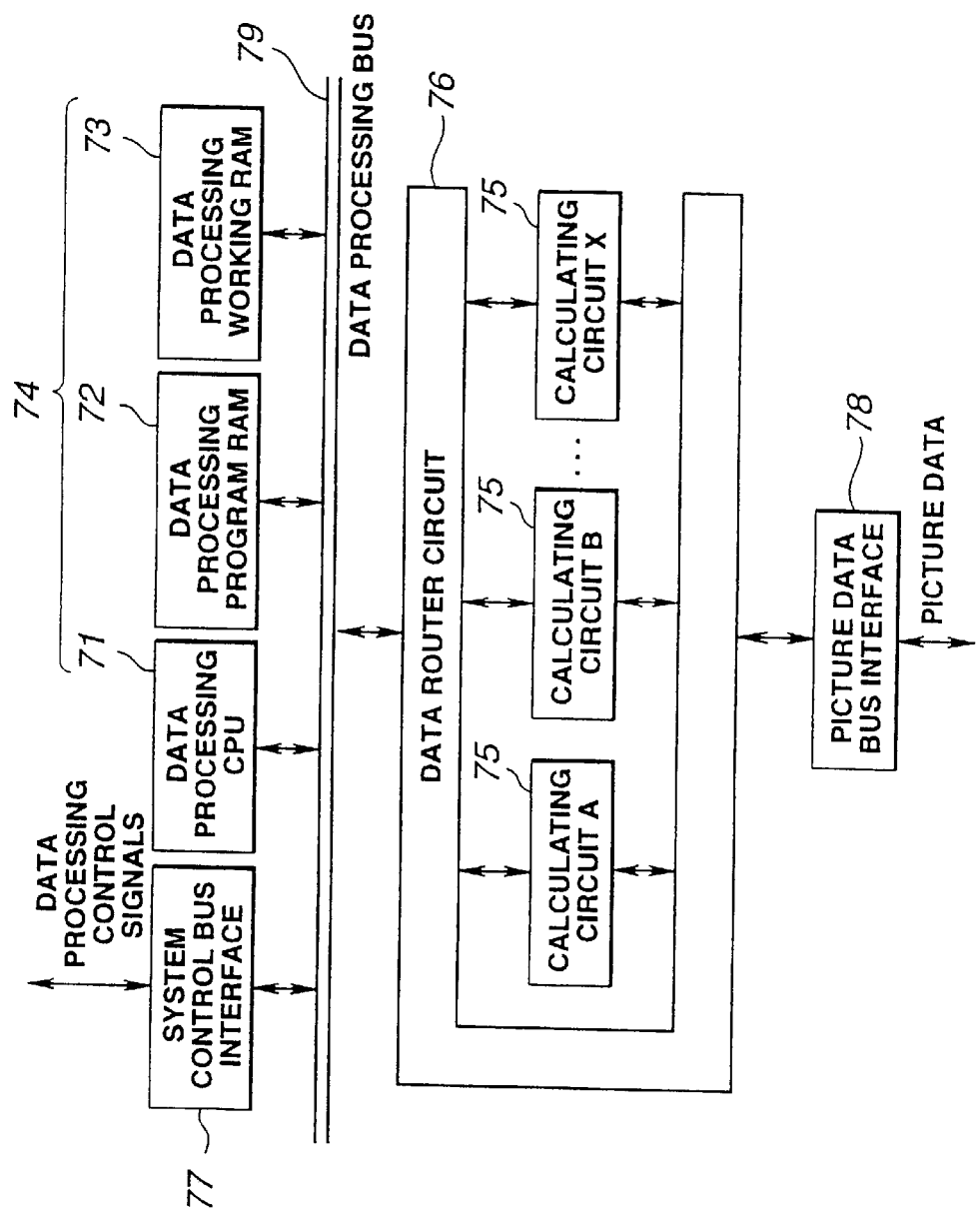
FIG. 37 is a circuit diagram showing an example of a data processing circuit of a printer device according to the present invention.

Certain illustrative examples of the data processing circuit 36 are now explained. The first example is shown in FIG. 37. The data processing circuit 36 shown therein uniquely includes a data processing control system 74, mainly comprised of a data processing CPU 71, a data processing program RAM 72 and a data processing working RAM 73 and which operates as a controller for controlling each picture data calculation unit as later explained. The data processing circuit 36 also includes plural calculation circuits 75 operating as picture data calculation units and a data router circuit 76 operating as a picture data transfer unit for sending data to the calculating circuits 75 to control the destination of data outputted from the calculating circuits 75. This data router circuit 76 is controlled by the data processing control system 74. Also, the control from the system control CPU 61 shown in FIG. 36 is accepted by the system control bus interface 77. The data processing control system 74, data router circuit 76 and the system control bus interface 77 are interconnected via data processing bus 79. Each calculating circuit 75 includes a picture data interface 78 for controlling the inputting and the outputting of picture data to or from the calculating circuits 75.

That is, the control from the system control CPU 61 is accepted by the control bus interface 77 and transmitted to the data processing CPU 71, while the information such as that on the operating state is transmitted from the data processing CPU 71 to the system control CPU 61.

The data processing is executed by the following sequence in the data processing circuit. Here, the operation of processing picture data held in the picture memory 20 for holding the processed data again in the picture memory 20 is explained.

First, the control software to be executed (data processing software) is transferred from the flash memory 63 or the system ROM 62 in the system control CPU 61 via the system control bus interface 77 to the data processing program RAM 72.

The system control CPU 61 then commands the data processing CPU 71 to start execution of data processing via system control bus interface 77. The data processing CPU 71 reads out picture data for processing, via picture data interface 78, based on the transferred control software (data processing software), and inputs the read-out picture data to a particular one of the calculating circuits 75 via data router circuit 76. Each of the calculating circuits 75 executes data processing on the input picture data, based on the control software (data processing software), to write the as-executed picture data via the data router circuit 76 and the picture data interface 78 in the picture memory 20 as picture data.

If the next calculations are to be carried out in succession, the picture data are inputted to the next particular calculating circuit 75 via data router circuit 76. By sequentially reading out picture data from the picture memory 20, executing the calculations thereon and re-writing the data in the picture memory 20 as picture data, data processing is executed in accordance with the control software (data processing software).

During processing or after the end of the processing of the picture data, the data processing CPU 71 apprises the system control CPU 61 of the process or the results of the processing via the system control bus interface 77, whereby the system control CPU 61 is able to comprehend the process or the results of the processing being executed. The data processing working RAM 73 is used for holding the data processing parameters sent from the system control CPU 61 or the operating state of the data processing CPU 71.

The plural calculating circuits 75 operating as the picture data calculating units are separately used in the following manner.

For example, it suffices if the plural calculating circuits 75 execute the same processing, the calculating circuits 75 and the pre-set ranges in the first digital picture data are adapted to correspond to each other and if the calculating circuits 75 associated with the respective ranges of the first digital picture data perform the same processing in the associated calculating circuits 75.

For example, if the respective calculating circuits 75 perform the same processing, and the pre-set range corresponds to one row or one column in the first digital picture data, it suffices if the processing of the row or column of the first digital picture data is executed by a calculating circuit A of the plural calculating circuits 75, while the processing of the row or column of the second digital picture data is executed by a calculating circuit B of the plural calculating circuits 75.

For example, if the respective calculating circuits 75 perform the same processing, and the pre-set range is one row or one column of the first digital picture data, it suffices if the processing for one row or one column of the first digital picture data is processed by a calculating circuit A of the plural calculating circuits 75, while the processing of the second row or column is executed by a calculating circuit B of the plural calculating circuits 75.

Also, in the present printer device, it is possible for the plural calculating circuits 75 to perform different processing operations, while it is also possible for the calculating circuits 75 to perform different processing operations sequentially on the totality of the first digital picture data. By so doing, since the sole picture data read out from the picture memory is processed a plural number of times to execute plural pre-set operations, whereby the number of times of accessing to the picture display outputting unit 20 is decreased to reduce the time required in performing plural pre-set processing operations.

The result is that the time which elapses since the user issued a start command for an operation until the operation comes to a close can be reduced, so that the time the user is kept waiting is significantly shorter than conventionally.

The methods of employing these plural calculating circuits 75 may be pre-fixed or varied by setting from the control software (data processing software). The number of the calculating circuits 75 connected in tandem is selected to an optimum value depending on the required processing speed, complexity in processing, size of the picture data and the circuit scale constituting the respective calculating circuits 75.

Figure 38:
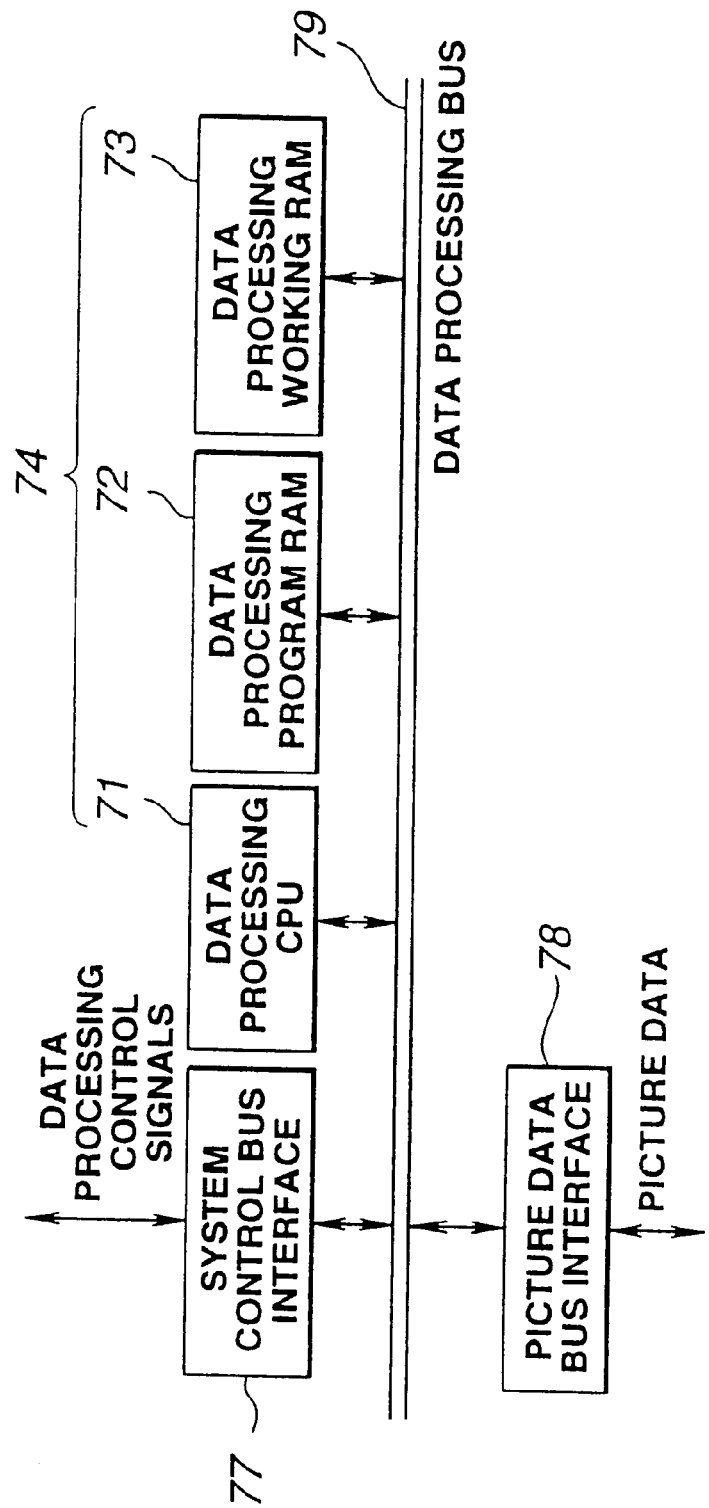
FIG. 38 is a circuit diagram showing another example of a data processing circuit of a printer device according to the present invention.

The data processing circuit shown in FIG. 38 may also be used. The data processing circuit shown in FIG. 38 corresponds to the data processing circuit shown in FIG. 37 less the calculating circuits 75 and the data router circuit 76 and hence the same reference numerals are used to depict corresponding parts and are not explained specifically. The data processing CPU 71 used is to be able to execute high-speed processing, with DSP, RISC CPU or the dedicated data processing CPU being used. That is, if the control software (data processing software) is arranged to be timesharing, it is possible to realize a pseudo-operation similar to that performed by the plural calculating circuits 75 shown in FIG. 17.

Figure 39:
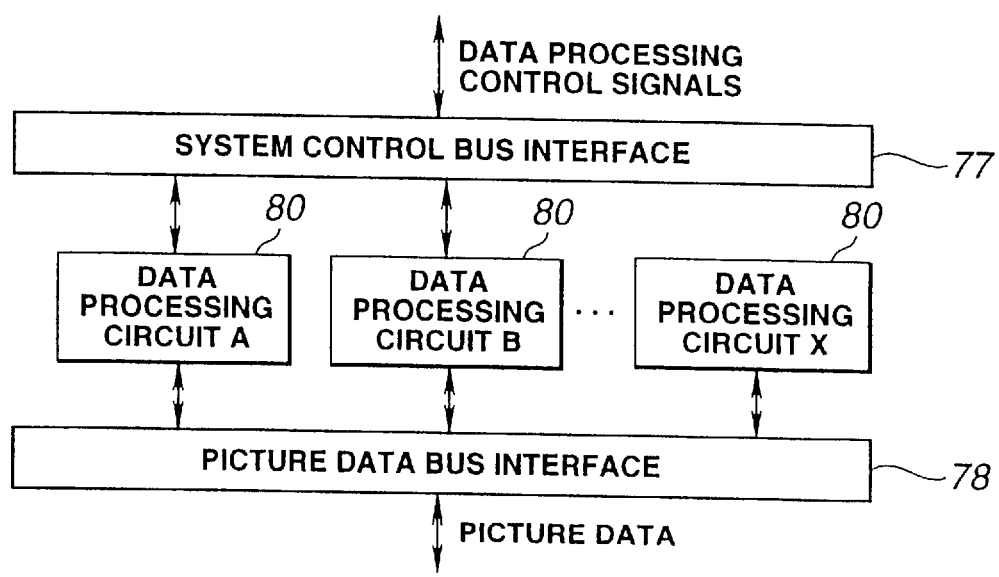
FIG. 39 is a circuit diagram showing still another example of a data processing circuit of a printer device according to the present invention.

The data processing circuit shown in FIG. 39 may also be used. In this data processing circuit, plural data processing circuits 80 are arranged in parallel, each data processing circuit 80 being connected via the system control bus interface 77 to a control system of the entire device by the system control CPU 61 and to the picture data bus 66 via the picture data interface 78. Each data processing circuit 80 may be constituted by a dedicated calculating circuit, a universal calculating circuit and a universal calculating control circuit or by a universal calculating control circuit. The control software (data processing software) is transferred via the system control bus interface 77 to each of the data processing circuits 80 to perform control to cause the data processing to be executed on the picture data in the picture memory 20. That is, the plural data processing circuits 80 operate respectively as the picture data calculating units and as picture data transfer units. The data processing circuits 80 may be arranged to perform the same processing or different processings depending on the arranging of data, as in the case of the calculating circuits 75, shown in FIG. 37.

The data processing flow in the present printer device is explained with reference to FIGS. 40 and 41, in which slanted lines affixed to the data flow indicating lines denote that data flowing therein is data with not less than 8 bits/color. As explained with reference to FIGS. 5 and 36, the computer interfacing unit 42 of the picture input means 7 shown in FIG. 40 outputs the input RGB picture data from outside to the picture data input/output circuit 31 as RGB picture data, while the picture data interfacing circuit 39, removable medium driving device 40 and the film reading unit 41 output the read-out picture data or picture signals to the picture data input/output circuit 31 as RGB picture data.

The picture data input/output circuit 31 then multiplexes picture data from the picture input means 7 to output the multiplexed picture data to the data processing unit 5.

Figure 41:
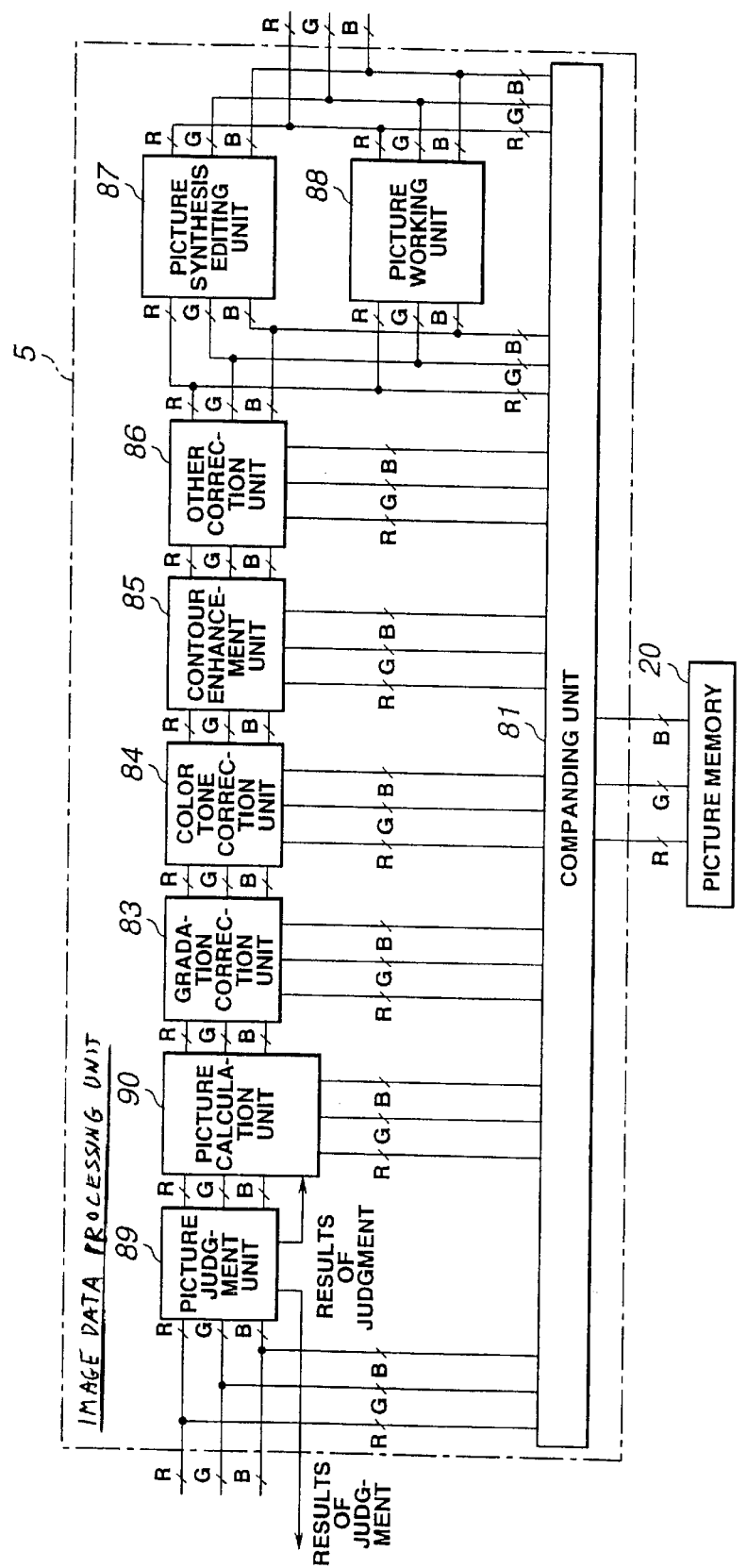
FIG. 41 is a circuit diagram showing data processing flow in a data processing portion of a printer device according to the present invention.

Referring to FIG. 41, the data processing unit 5 is made up of a compression/expansion unit 81, a picture verification unit 89, a picture calculation unit 90, a gradation correcting unit 83, a color tone correction unit 84, a contour enhancing correcting unit 85, correction unit 86, a picture synthesis editing unit 87 and a picture working unit 88. If the input picture data from the picture data input/output circuit 31 is not of ideal picture quality characteristics, the data processing unit 5 corrects the picture quality for improving the picture quality of a picture displayed on the display device 45a or on an external monitor, or that of a picture printed by the picture printing unit 3. If the picture data has characteristic properties, the data processing unit 5 corrects these properties to improve the picture quality.

The compression/expansion unit 81 is required for holding picture data in the picture memory 20 in an reversible or irreversible form. Specifically, the compression/expansion unit 81 compresses the RGB picture data inputted to the data processing unit 5, RGB data processed in various ways and, if necessary, RGB picture data between respective processing stages, to store the compressed data in the picture memory 20 as compressed picture data. The data processing unit 5 also has the function of reading out and expanding the picture data held in the compressed form in the picture memory 20 into non-compressed RGB picture data which is processed in various ways and outputted to respective components in the data processing unit 5.

The RGB picture data, inputted to the data processing unit 5, is inputted to the picture verification unit 89. This picture verification unit 89 is configured for extracting from the picture data pre-set picture components, such as vertical and horizontal picture components, and for detecting the angle between the vertical and horizontal picture components and the vertical and horizontal directions, respectively. The results of verification are inputted from the data processing unit 5 to the input position adjustment unit 43, as shown in FIGS. 40 and 41. The results of verification may also be inputted to the picture calculation unit 90 which will be explained subsequently.

The input position adjustment unit 43 may, if necessary, adjust the inputting position of the analog picture signals, from which the first digital picture data is originated, to generate again the adjusted first digital picture data.

The picture verification unit 89 verifies whether or not pre-set picture contents are present in a specified range of the picture data to input the verified results to the picture calculation unit 90 which will be explained subsequently.

The RGB picture data from the picture verification unit 89 are inputted to the picture calculation unit 90. This picture calculation unit 90 is configured for rotating and slicing the first digital picture data, based on the verified results of the picture verification unit 89, if the first digital picture data adjusted by the input position adjustment unit 43 is not generated. The picture calculation unit 90 also is configured for approximating the vertical and/or horizontal picture components to the vertical and/or horizontal direction, respectively. The picture calculation unit 90 may occasionally enlarge the sliced picture data.

The picture calculation unit 90 is also configured for modifying pre-set picture contents so as to be arranged in the prescribed region for generating the re-arrange first digital picture data if the picture verification unit 89 has issued a decision that the pre-set picture contents of the picture data are present in the prescribed range. In addition, if the input picture size is not of a size that permits handling in the data processing unit 5, the input picture may be enlarged or reduced into the size range.

The RGB picture data from the picture calculation unit 90 are inputted to the gradation correcting unit 83. The gradation correcting unit 83 is configured for correcting the gradation characteristics of the input picture data to improve the picture quality of a printed and outputted picture if the gradation characteristics histogram of the input picture data is considerably offset. The gradation correcting unit 83 is also configured for improving the gradation characteristics of the entire picture by correcting a non-optimum light exposure at the same time as the time of imaging because the non-optimum light exposure then would lead to excessively dark picture or to an excessively bright picture. If gamma characteristics of the input picture data can be improved in similar manner, the gradation correcting unit 83 corrects the gamma characteristics.

The RGB data from the gradation correcting unit 83 is inputted to the color tone correction unit 84 which, similarly to the gradation correcting unit 83, is configured for correcting the color tone characteristics of the input picture data for improving the picture quality of the printed and outputted picture if the input picture data exhibit significantly offset color tone characteristics. The gradation correcting unit 83 is also able to correct specified color tones, especially skin color or gray color tone offset from an optimum range, to an optimum range, in addition to correcting the overall color tone.

The RGB data from the color tone correction unit 84 is inputted to the contour enhancing correcting unit 85, which is configured for correcting the picture contour to an optimum value if the input picture data is of an indefinite or excessively emphasized picture contour.

The RGB picture data from the contour enhancing correcting unit 85 is inputted to a spare correction unit 86 which is configured for executing an occasionally added processing for improving the input picture quality in addition to the above-mentioned processing.

The RGB picture data, processed as described above, are then inputted to the picture synthesis editing unit 87 and to the picture working unit 88. These units 87, 88 are configured for executing various processing operations on an input picture based on user commands from the user interface unit and for synthesizing or editing plural input pictures to generate a picture for ultimate printing.

The above-described respective units are also able to synthesize a picture pattern provided in input picture data from the outset. It is also possible for the user to input a desired picture pattern from a command device, such as a pen-touch input device, under control by the user interface unit in the course of the editing operation in order to synthesize this picture pattern and the input picture pattern.

The control software for executing the synthesis, editing and working on the picture data, and picture patterns provided from the outset, can be configured to be newly inputted from the removable medium driving device and from the computer interfacing circuit.

The RGB signals outputted from the data processing unit 5 are inputted to the display device processing unit 22, picture signal processing unit 23 and to the printing output processing unit 24.

The display device processing unit 22 is configured for correcting display output characteristics characteristic of the display device 45a in a case where the high picture quality display or display of a picture of a picture quality equivalent to the printed picture cannot be achieved because of display output characteristics proper to the display device 45a if picture data outputted by the data processing unit 5 is directly displayed on the display device 45a. This display device processing unit 22 is made up of a print adaptive correction unit 91, as later explained, an output characteristics correction unit 92 for correcting characteristics other than output gamma characteristics as later explained and an output gamma conversion unit 93 for correcting output gamma characteristics characteristic of the display device.

The picture signal processing unit 23 is configured for converting output picture data from the data processing unit 5 into standard picture signals represented by NTSC signals and outputting the resulting standard picture signals. This picture signal processing unit 23 is made up of a print adaptive correction unit 94, as later explained, an output characteristics converting unit 95 for doing necessary connection other than the output gamma characteristics, similarly as later explained, and an output gamma characteristics conversion unit 96, arranged in this order. The picture signal processing unit 23 also performs the processing of converting the display range of the picture data into a range of representing standard picture signals if the possible range of representation of picture data differs from the range of representing the standard picture signals. The standard picture signals in the picture signal processing unit 23 may also be picture signals conforming to the standard picture signals.

The printing output processing unit 24 is configured for converting output picture data from the data processing unit 5 into signals that can be inputted to the print head driving circuit 56 in order to record the output picture data from the data processing unit 5 from the printer head 25 on the recording medium. The processing by the printing output processing unit 24 includes the conversion by a look-up table (LUT), calculation exploiting a calculation circuit capable of executing high-speed product/sum operation, calculation by a software having a high-speed calculation algorithm, or processing by a dedicated conversion circuit. If, when the calculation processing is executed sequentially, the processing is executed at all times with the same number of bits as the number of each data in the input picture data, the effective precision of each data tends to be lowered. In such case, it is possible to increase the number of bits in each data in the course of the calculations in comparison with the number of bits of the initial picture data, with the number of bits being decreased at the time of last processing to eke out the increased number of bits to avoid the effective precision from becoming worsened.

The printing output processing unit 24 is made up of an RGB-CMY conversion unit 98, a color correction unit 99, a black extraction under-color removing unit 100, an output gamma correction gradation correction unit 101, a sharpness correction unit 102 and an output characteristics conversion unit 103, arranged in this order. This, of course, is merely illustrative and may be configured differently.

The RGB-CMY conversion unit 98 is responsible for converting RGB picture data into data of respective colors of C (cyan), M (magenta) and Y (yellow) of the inks or toners used in the printer head 25. This conversion is effected by gray level log conversion, complementary color conversion or linear masking conversion.

The picture data, converted into CMY picture data as described above, is inputted to the color correction unit 99, which is configured for correcting the excursions of the color tone (especially the color hue and saturation) of the printed picture by the picture printing unit 3 caused due to spectroscopic absorption characteristics of the CMY color inks or toners differing from ideal characteristics by subtractive color mixing.

The color correction by the color correction unit 99 is effected by conversion by the lookup table (LUT) and calculations, linear masking calculations, non-linear masking calculations, etc. On the other hand, the maximum representable range of characteristics of picture data frequently differ from that of a picture printed on the recording medium by the printer head 25, so that, if the maximum range for the picture data is broader than that of the printed picture, the portion of the representable range of picture data exceeding the representable range of the printed picture cannot be represented if no countermeasures are used. Thus, in the color correction unit 99, it becomes necessary to effect compression or clipping of the entire picture data in order to represent this exceeding portion. There are occasions wherein a conversion method is used which evades excursions of the color tone as a result of the conversion, such as compression or clipping.

Also, when printing the picture data by the picture printing unit 3 on a recording medium, it is a frequent occurrence that emphasis is used in the conversion process in such a manner that many persons will feel the picture to be beautiful. That is, if the original picture data in the picture representation, in particular the color representation, indicated by the picture data, is simply converted into CMY data in such a manner as to maintain colorimetric values indicated on a color meter, and the as-converted CMY data is directly printed on the printer head, only a picture low in saturation, that is low in impressiveness, is obtained, with the majority of viewers not being satisfied with color regeneration (regeneration in color hue, brightness and saturation). Thus, in order to eke out this deficiency, emphasizing reproduction, referred to below as preferred reproduction, is additionally used in effecting conversion from the picture data. In effecting this preferred reproduction, mainly preferred color reproduction and preferred gradation reproduction, are used. In a majority of cases, the preferred color reproduction is performed in the color correction unit 99, while the preferred gradation reproduction is performed in the output gamma correction gradation correction unit 101 as later explained. Of course, these can be executed by the same processing. The degree of the preferred reproduction may occasionally be changed depending on the destination of product delivery since the average degree of the preferred reproduction may vary from one destination of delivery to another.

The CMY picture data is inputted to the black extraction under-color removing unit 100, which is designed so that, if there is a black ink or toner (BK) in the printer head 25, and if each CMY data has a BK component, it substitutes the BK ink or BK toner for the BK components. The BK component in each CMY picture data, replaced by BK, is removed from the data values of the CMY picture data.

There are a variety of methods of substituting the BK ink or toner for the BK components in the CMY, such as a method for total substitution, a method for substitution in a pre-set proportion or a method for substitution by a region exceeding a pre-set gray level. By representing the BK component in the CMY data with the BK ink or toner, the black representation in a picture that can be represented only insufficiently by the respective inks or toners in CMY can be represented to a sufficient level. The data of the BK component is indicated as K in FIG. 20.

The CMYK picture data is then inputted to the output gamma correction gradation correction unit 101. If picture representation characteristics on the recording medium by the printer head has print outputting properties characteristic of the recording ink or toner and half-tone representation method, the output gamma correction gradation correction unit 101 performs output gamma correction and gradation correction suited to the print outputting characteristics. The output gamma correction gradation correction unit 101 effects conversion of the original picture data such as to optimize gradation representation on printing. It is also possible to effect the preferred gradation reproduction, previously explained in connection with the color correction unit 99.

The CMYK picture data then is inputted to the sharpness correction unit 102 which is responsible for effecting contour enhancement and smoothing to improve the printing picture quality.

The CMYK picture data then is inputted to the output characteristics conversion unit 103 which is configured for effecting specified correcting operations depending on the type of the printer head 25, the driving methods of the printer head 25, the types of the recording medium and the inks or toners, to improve the printing picture quality. Examples of these correcting operations include those of the ambient temperature at the time of printing, heat hysteresis and fluctuation of the respective elements of the printer head 25. Among these correcting operations, those which can be desirably effected in the print head driving circuit 56 may be carried out in the print head driving circuit 56.

The present printer device is configured for correcting the setting of the display outputting characteristics prescribing the display picture quality in display 15 or the external monitor, in association with the setting of printing characteristics prescribing the printing picture quality in the picture printing unit 3, in order to visually equate the picture quality of the display picture on the display device 45a with that of the printed picture by the picture printing unit 3. Specifically, the correction parameters specifying the contents of correction to be executed by the display device processing unit 22 and video signal processing unit 23 to visually equate the picture quality are sent to the print adaptive correction unit 91 and the print adaptive correction unit 94 of the display device processing unit 22, in association with the change of the printing characteristics of the printing output processing unit 24, in particular the processing contents. That is, in the display device processing unit 22, the RGB picture data possess the correction parameters in the print adaptive correction unit 91, to which the data is inputted first, and the processing is continued in this state, so that the correction parameters are displayed on the display device 45a.

The same applies for the video signal processing unit 23. That is, the RGB picture data possess the correction parameters in the print adaptive correction unit 94 to which the data is inputted first, and the processing is continued in this state, so that the correction parameters are displayed on the external monitor. The result is that the displayed picture on the display device 45a and that on the external monitor are visually equated in picture quality to the printed picture by the picture printing unit 3.

In the present embodiment, the display outputting characteristics of display device processing unit 22 and video signal processing unit 23 are corrected in accordance with the printing characteristics of the picture printing unit 3, specifically the processing contents by the printing output processing unit 24, to visually equate the display picture on the picture display outputting unit to the picture printed by the picture printing unit. It is however possible to match the printing characteristics of the picture printing unit, specifically the processing contents of the printing output processing unit 24, to the display outputting characteristics of the display device processing unit 22 and the picture signal processing unit 23.

Figure 40:
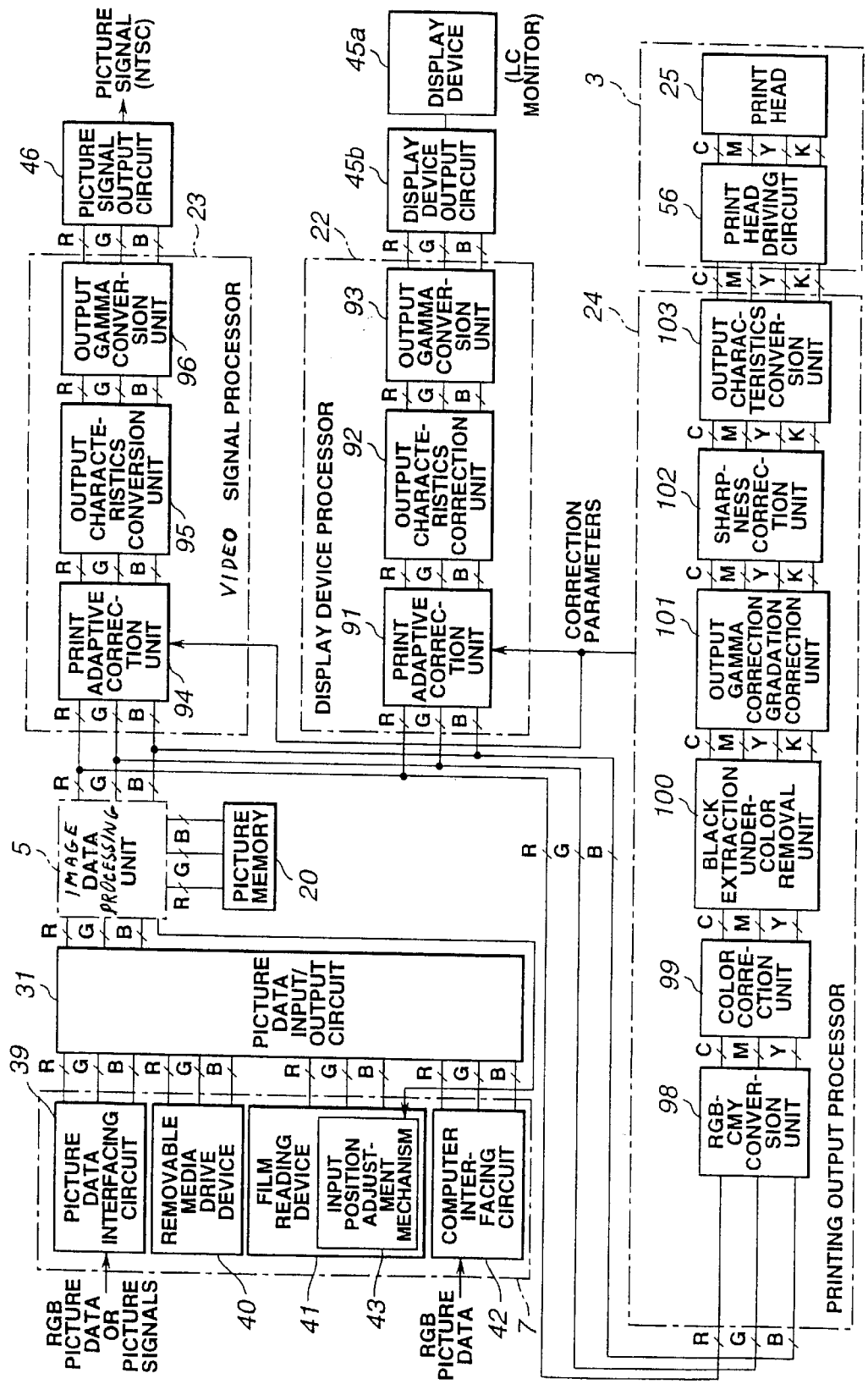
FIG. 40 is a circuit diagram showing an example of the data processing flow in a printer device according to the present invention.
Figure 42:
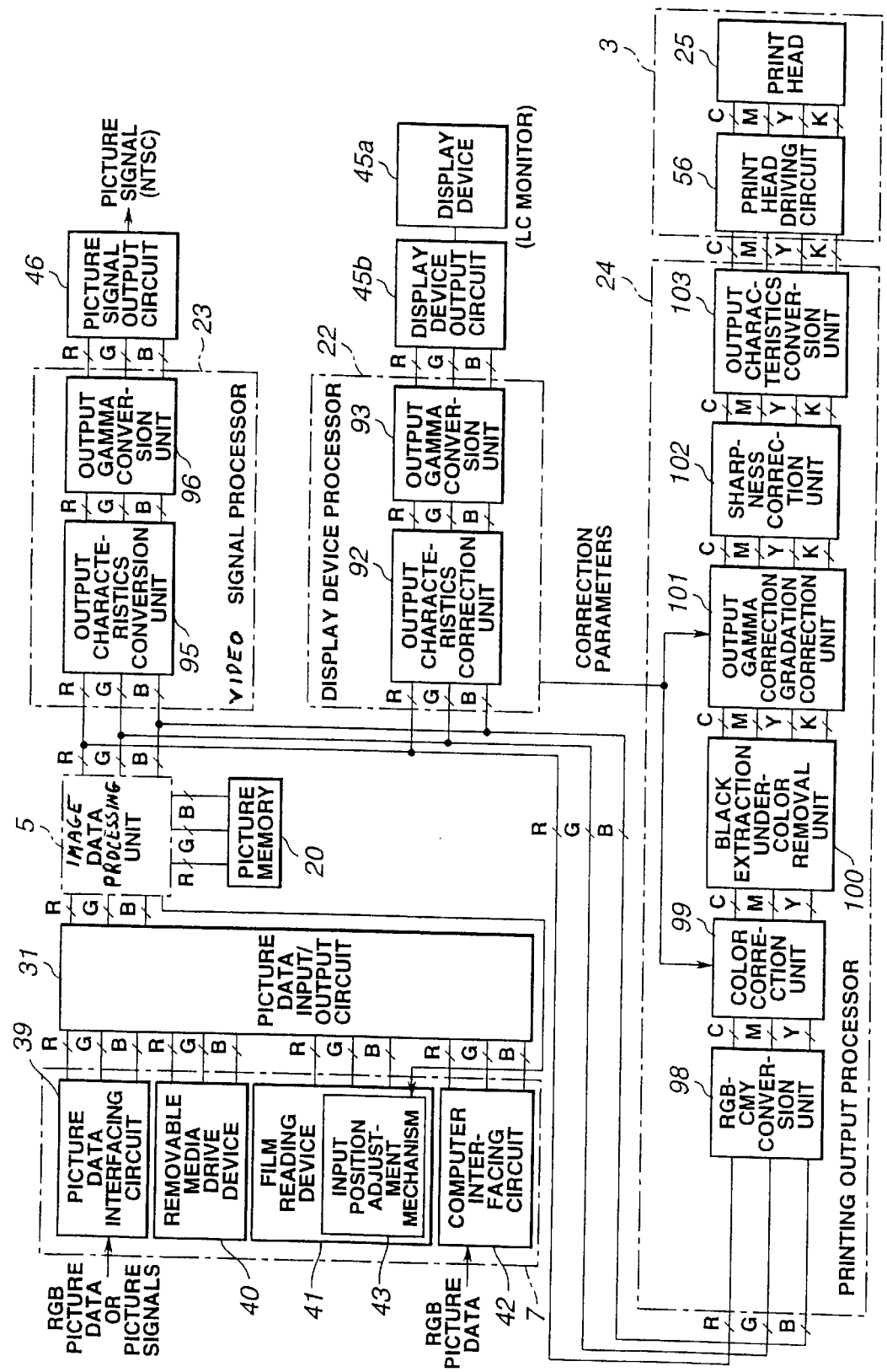
FIG. 42 is a circuit diagram showing another example of the data processing flow in a printer device according to the present invention.

The data processing flow may be designed as shown in FIG. 42, which differs from FIG. 40 only with respect to the absence of the print adaptive correction unit 91 of the display device processing unit 22 and the print adaptive correction unit 94 of the picture printing unit 3 and hence to lines indicating correction parameters from the printing output processing unit 24. Therefore, the remaining portions are depicted by the corresponding reference numerals and are not explained specifically.

However, if the data processing flow is as indicated in FIG. 42, the correction parameters specifying the contents of the correction to be performed by the printing output processing unit 24 are inputted to the color correction unit 99 and to the output gamma correction gradation correction unit 101 of the printing output processing unit 24, in order to achieve visual equation of the picture quality in association with changes of the display outputting characteristics of the display device processing unit 22. That is, in the printing output processing unit 24, the RGB picture data possess the correction parameters in the color correction unit 99 and in the output gamma correction gradation correction unit 101 substantially governing the picture characteristics. The processing proceeds in this state so that the RGB picture data are printed in the picture printing unit 3. The result is that the display picture on the display device 45a is visually equated in picture quality to the printed picture by the picture printing unit 3.

Figure 43:
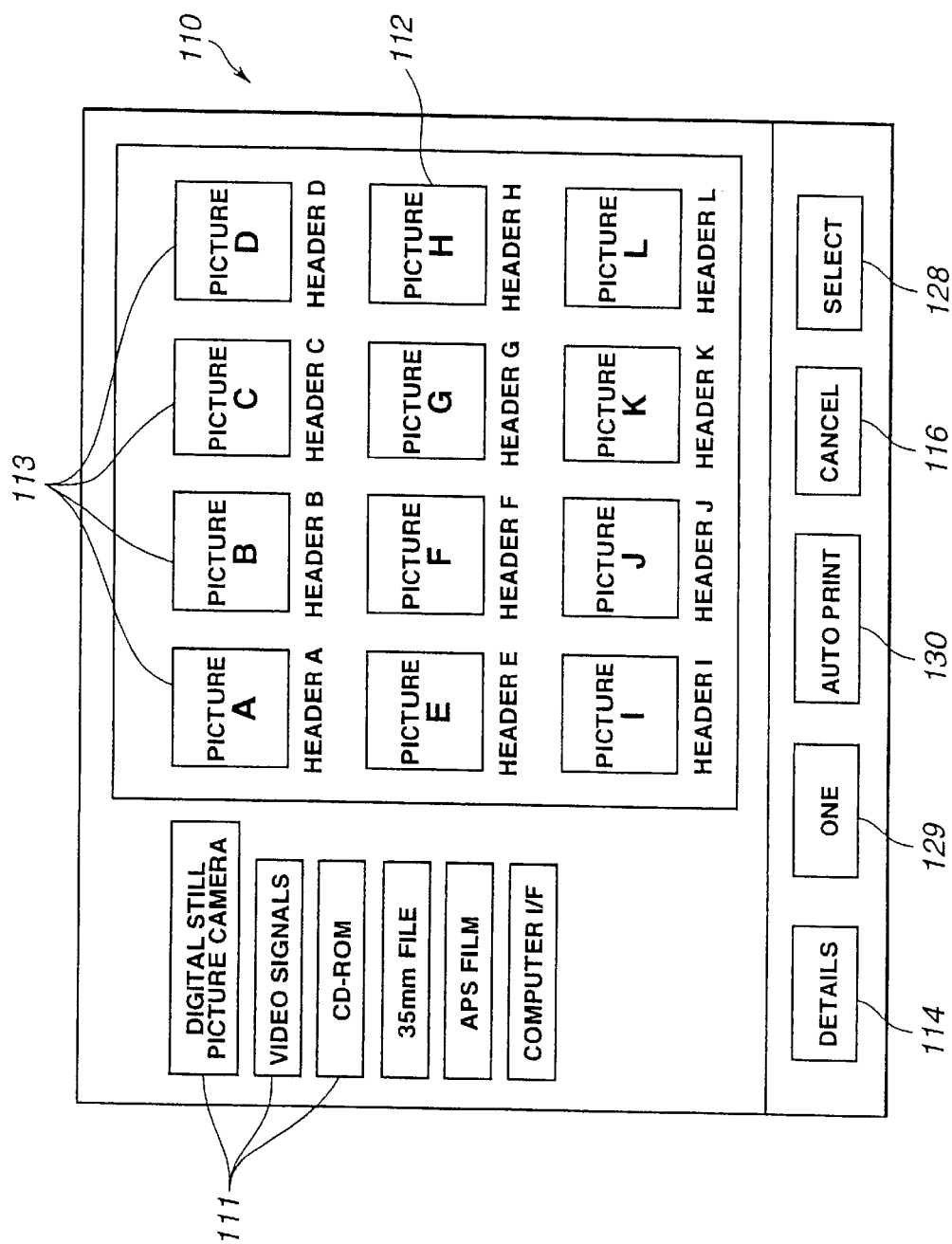
FIG. 43 is a diagram showing an example of a picture displayed on a display device of a printer device according to the present invention or on an external monitor.

An illustrative displaying sequence of a menu picture on the display device 15 on the external monitor is now explained. An initial picture is a picture indicating the menu 110 as shown in FIG. 43. It is assumed that the picture is of a touch panel type picture in which the inputting processing is by direct physical touch in a pre-set picture portion. On this picture 110, there are indicated plural input unit selection keys 111, specifying respective names for selecting an external connection equipment and picture inputting means, and a picture display area 112. If an external connection equipment and picture input means are selected by an input unit selecting key 111, a picture 113 to which access may be had from the selected means is displayed as a reduced-size picture in the picture display area 112.

On this picture 110, there are also displayed a details setting key 114, used for selecting the picture 113 under specified conditions, a selection key 128 for selecting the picture 113 displayed as a reduced-size picture, a print number input key 129 for inputting the number of prints, an automatic print key 130 for automatically verifying and correcting the picture contents to start the automatic printing system and a cancellation key 116 for aborting the processing. It a user selectively specifies one of the external connection equipment or the picture inputting means by the input unit selecting key 111, plural pictures 113 that can now be read as a result of the selection are displayed in the picture display area 112. If there is the information ancillary to the information of the picture 113, such as the header information, the information is displayed in association with the information 113. If the user then selects the desired picture 113 by the selection key 128, there is made a display that the picture 113 has been selected. If there is no picture desired to be printed in the displayed pictures 113, there is no need to make the selection. If condition inputting, etc. can be made on selecting the details setting key 114, it is possible for the user to select the picture 113 under specified conditions such as imaging time and date.

If the picture data for printing is selected, or the selecting conditions are set, and the user intends to cause the picture data to be printed sequentially automatically, that is checks or corrects the selected picture data sequentially automatically to effect the printing, the user selects the automatic print key 130 for initiating the automatic printing system. This allows the respective processing operations to be effected on the pre-selected plural picture data to effect the printing.

If plural picture data are displayed as described above, preferably the printed data already printed are displayed differently from the picture data represented as a contracted picture to indicate the picture is already printed.

Preferably, the picture data being processed are indicated as being under processing. Also preferably, the picture data being processed may be displayed to an enlarged scale and the picture data representing the results of processing are displayed as the correction processing etc progresses.

Figure 44A:
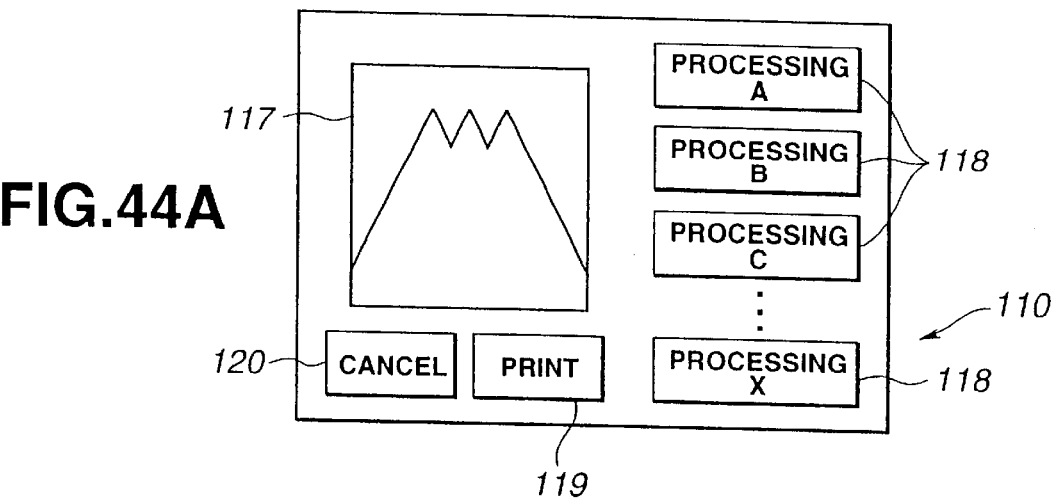
FIG. 44 is a schematic view showing another example of a picture displayed on a display device of a printer device according to the present invention or on an external monitor.

If the automatic print key 130 is selected, a sole picture 1117, from the plural picture data selected on the picture frame 110, plural processing display keys 118 for specifying the control and the processing for correcting the picture tilt, processing for changing the position of the pre-set picture contents or correcting processing for the processing A, processing B, processing C, . . . , processing X, to be sequentially executed to change the positions of the pre-set picture contents, a print key 119 for commanding the printing start and a cancellation key 120 for aborting the processing, are displayed as a picture, as shown in FIG. 44A.

That is, the status of the progress of the respective correction processing operations is displayed on the picture and a picture displaying the processing results is displayed during or after the execution.

If the correction processing can be started from a specified portion in the picture 1117, the display of the processed portion is preferably changed gradually to the post-processing display since then the state of progress of the processing can be checked during the processing.

The correction processing may be assumed to be a processing having variable parameters and a processing not having the variable parameters. It is assumed that the processing AS is the processing having the variable parameters. If such correction processing is going on, it suffices if a picture 110, having a picture 117, a processing display unit 121 indicating the processing going on, a selection key 112 for selecting the indication or reversion to a previous picture (picture shown in FIG. 44a), a cancellation key 123 for aborting the processing, a variable parameter selecting portion 126 and a decision key 127 for setting the processing, is displayed, as shown in FIG. 44B.

Figure 44B:
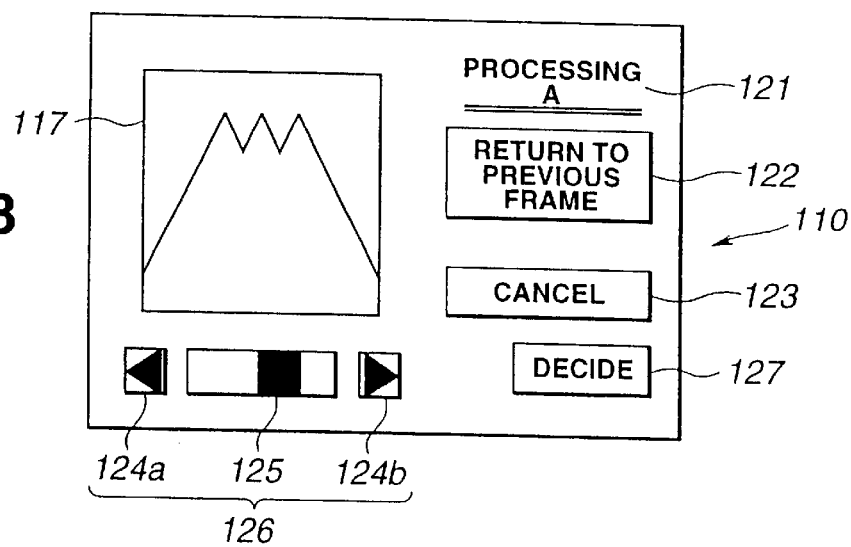

The variable parameter selecting portion 126 includes a slide volume indicating portion 125, for indicating the level of the variable parameter, and adjustment keys 124a, 124b for vertically moving the variable parameter, as shown in FIG. 44b. Here, if the left adjustment key 124a in FIG. 44b is thrust, the variable parameter level is moved towards left, whereas, if the right adjustment key 124b in FIG. 44b is thrust, the variable parameter level is moved towards right. For example, if the variable parameter is the luminance of a picture, the left adjustment key 124a in FIG. 44b is the luminance lowering key and the right adjustment key 124b in FIG. 44b is the luminance increasing key, the picture displayed is changed in luminance by adjusting the adjustment keys 124a, 124b for varying the level of the slide volume indicating portion 125.

It is now assumed that the processing B is a processing not having the variable parameter. If such correction processing is going on, it suffices if a picture frame 110, having a picture 117, a processing display unit 121 indicating the processing the going on, a selection key 122 for selecting the indication or reversion to a previous picture (picture shown in FIG. 44a), a cancellation key 123 for aborting the processing, and a decision key 127 for setting the processing, is displayed, as shown in FIG. 44a.

Figure 44C:
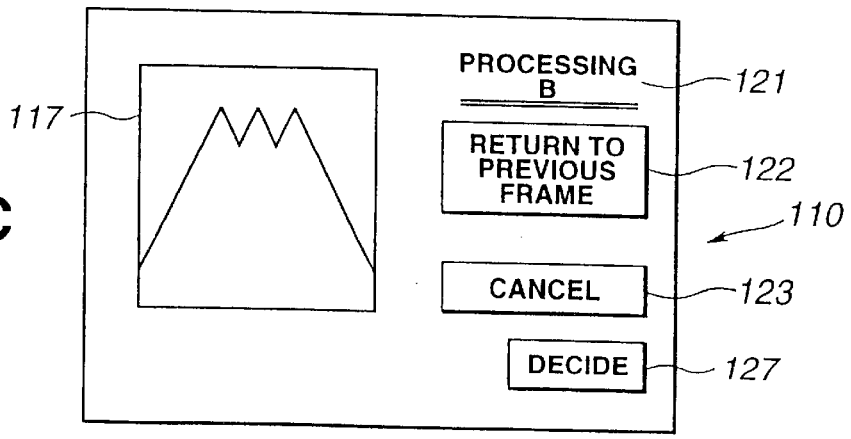

If the automatic print key 130 for starting the automatic printing system is selected, the processing explained in FIG. 44a, processing having the variable parameter explained in FIG. 44b or the processing not having the variable parameter explained in FIG. 44C, whichever is optimum for execution, is automatically selected.

If the selected processing is that having the variable parameter, the level of the optimum variable parameter level is automatically set. If plural processing operations are to be executed, the sequence of the various processing operations is automatically set. Thus, in the automatic printing system, the user is not compelled to command execution of the respective processing operations, or to set the level of the variable parameter.

Even in the automatic printing system, it is possible for the user to set the processing operations to be executed and the level of the variable parameter by partially manual operation as he or she checks the displayed picture 117. That is, the partially manual operation may be made even during execution of the automatic printing system.

The correction processing operations are executed on a picture shown in FIGS. 44b and 44c and, in the case of the automatic printing system, the decision key 127 is selected automatically. If, during execution of the automatic printing system, the user manually executes the processing and the setting of the variable parameter level, and has recognized that the processing can be terminated, he or she selects the decision key 127. This causes the reversion to the picture frame shown in FIG. 44a to start the printing.

Figure 45:
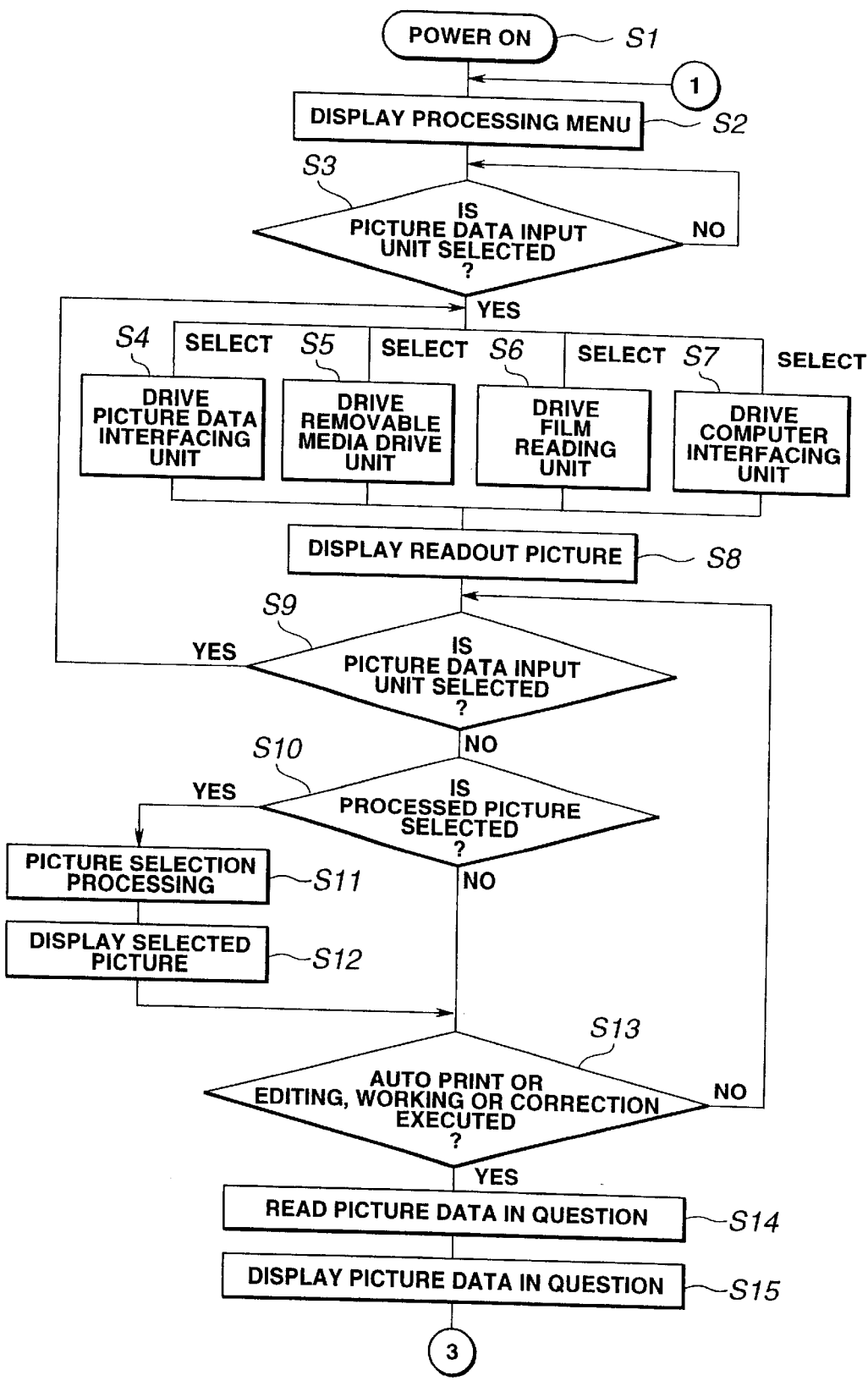
FIG. 45 is a flowchart showing a portion of the schematic operation in a printer device according to the present invention.
Figure 46:
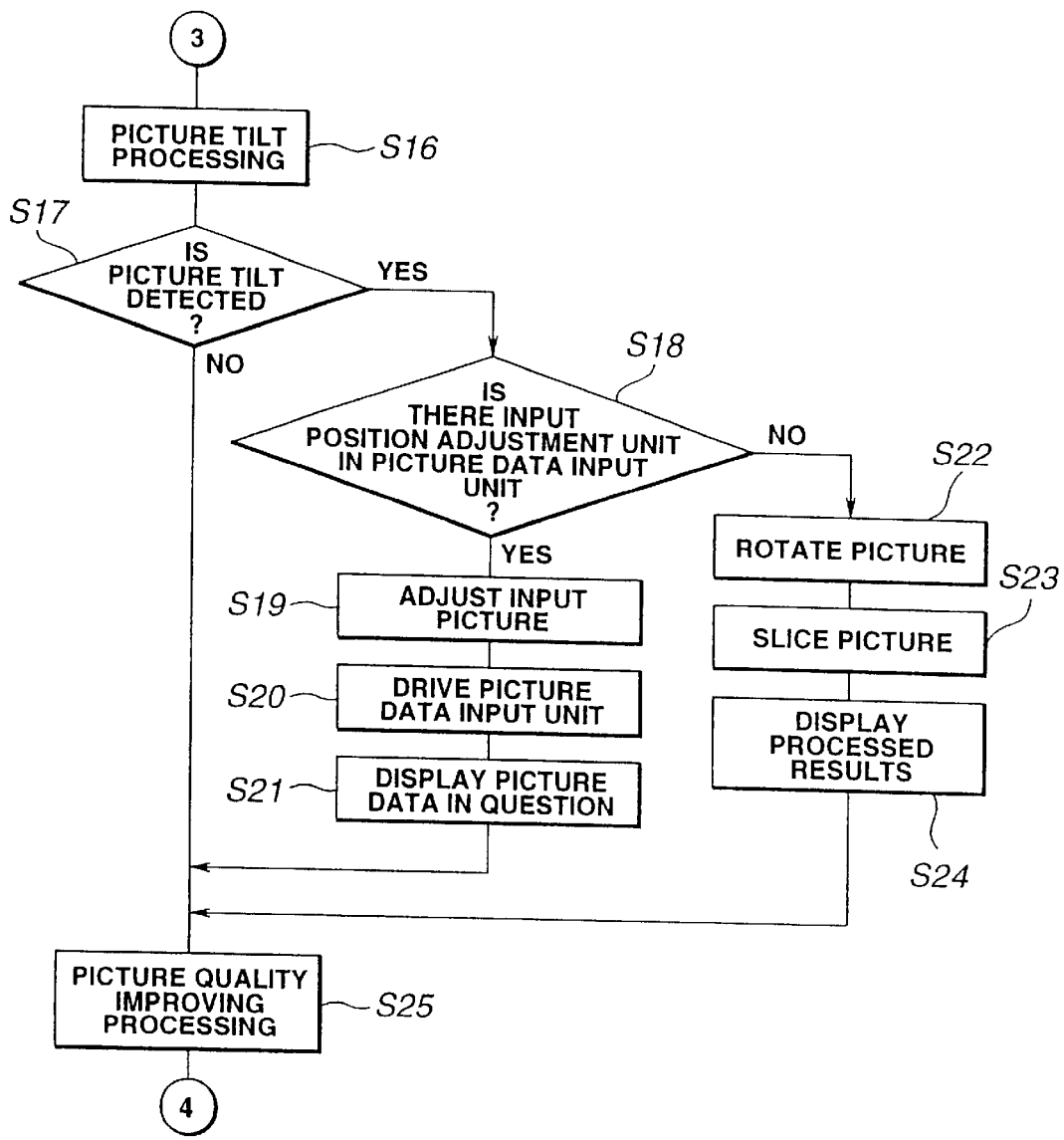
FIG. 46 is a flowchart showing another portion of the schematic operation in a printer device according to the present invention.
Figure 47:
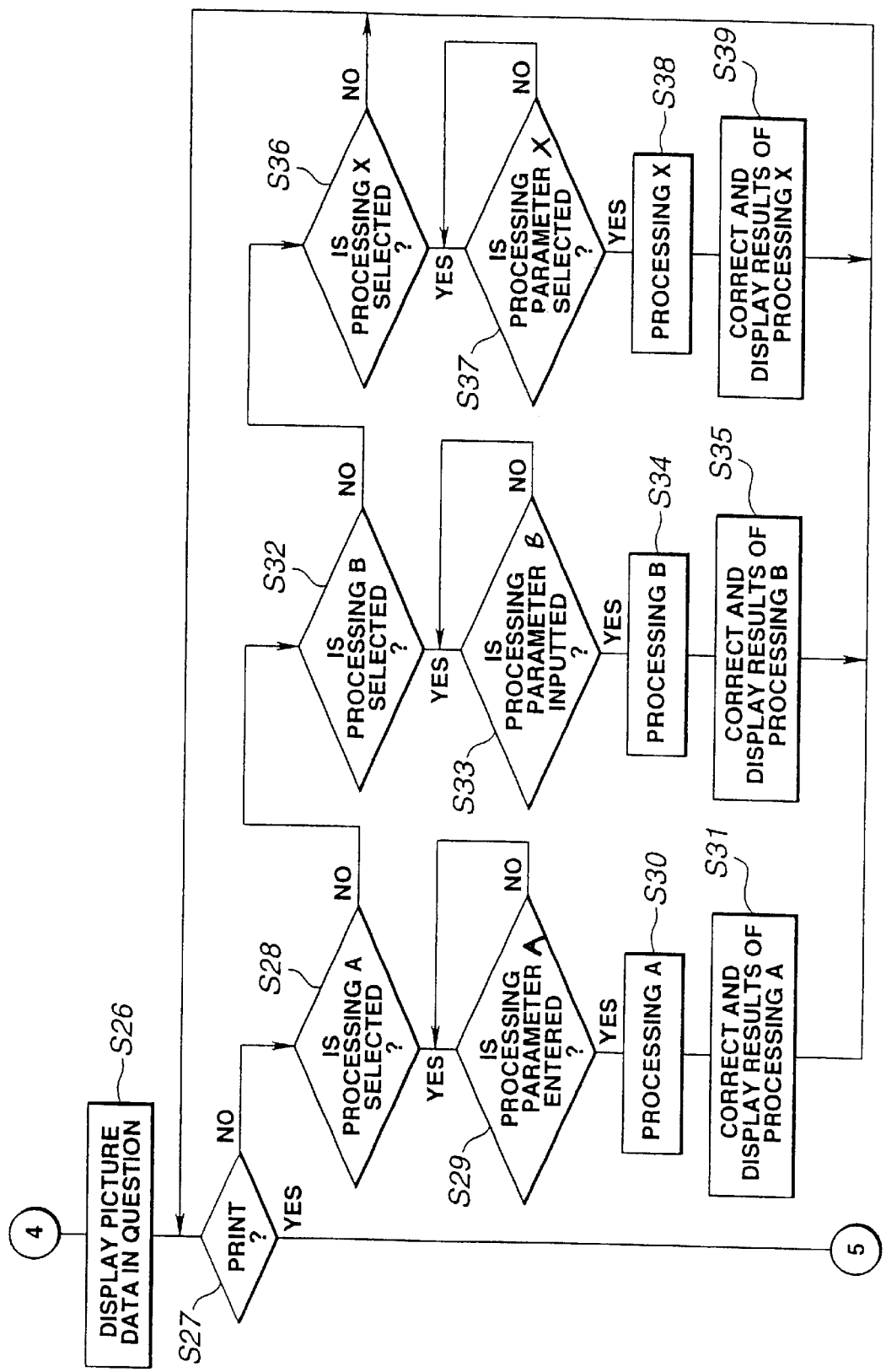
FIG. 47 is a flowchart showing still another portion of the schematic operation in a printer device according to the present invention.

An illustrative operation of the present printer device is now explained by the flowchart shown schematically in FIGS. 45 to 47. First, at step S1 in FIG. 45, the power source is turned on. This causes the processing menu shown in FIG. 43 to be displayed at step S2. Then, at step S3, it is checked whether or not a command for selecting the picture input means for inputting picture data or the external connection equipment is to be issued. If the command is to be issued, the desired commanded device is selected, and a picture data interfacing unit is driven at step S4. Since there are a plural number of the picture input means or the external connection equipments, as described above, the removable medium driving device is run at step S5, while a film reading unit and a computer interfacing unit are driven at steps S5 and S6, respectively. That is, the program moves to one of the steps S4 to S7 depending on the selection at step S3.

If the selection command for the picture inputting means for inputting picture data or the external connection equipment is not issued at step S3, it is again checked at step S3 whether the selection command for the picture inputting means for inputting picture data or the external connection equipment is issued.

The picture data outputted from the picture input means or the external connection equipments, as selected at steps S4 to S7, are displayed as a picture by the display device or the external monitor as a picture. If plural picture data are outputted from the selected picture input means or the external connection equipments, the outputted plural picture data are displayed on the display device or the external monitor as plural contracted pictures.

Then, at step S9, it is verified whether or not the selection of the picture input means or the external connection equipments is to be changed. In the absence of the command for changing the selection of the picture input means or the external connection equipments, it is verified at step S110 whether or not selection command for the picture for processing is to be issued. The processing herein means the processing of editing, working or correction by the picture processing unit, the printing processing by the picture printing unit and respective processing operations for these processings.

If the picture for processing is not selected from the plural displayed pictures, and if a command for changing the picture input means or the external connection equipments, the picture input means or the external connection equipments is again selected at step S9 and accordingly one of the steps S4 to S7 is executed.

The picture selected at step S10 as described above is processed to indicate the fact of selection at step S11 and is displayed at step S12 to indicate the fact of the selection. At step S13, it is verified whether or not the automatic printing or the processing such as editing, working or correction is to be effected on the picture selected as described above. If the command for execution is issued, picture data of the picture in question is read at step S14. If a picture for processing has not been selected at step S10, it is directly sent to step S13.

In the absence of the command for executing the automatic printing or the processing such as editing, working or correction, it is again verified at step S9 whether or not the picture input means or the external connection equipments is to be selected.

By sequentially passing through the steps S9, S10 and S13, the program is in the state of awaiting the command of changing selection of the picture input means or the external connection equipment and of selecting the picture for processing and the command for execution of the automatic printing or the processing such as editing, working or correction.

The picture read at step S14 as a picture in question for executing the automatic printing or the processing, such as editing, working or correction, is displayed at step S15 on the display device or the external monitor. After the reading and display of the picture data in question, the tilt of the picture is detected at step S16 by a picture verification unit, as shown in FIG. 46. If the picture tilt is verified to be detected at step S17, it is checked whether or not there is the input position adjustment unit in the picture data input unit.

If the input position adjustment unit is verified to be present in the picture data input unit at step S18, the input position of the analog picture signals, from which has been originated the pre-set first digital picture data, is adjusted by rotational movement. At step S20, the picture data input unit is again driven to generate adjusted first digital picture data. At step S21, the adjusted first digital picture data is displayed and outputted on the display device or on the external monitor. Then, at step S25, the picture quality improving processing is executed. The picture quality improving processing is executed for improving the picture quality of the picture displayed on the display device or on the external monitor or the picture printed by the picture printing unit in case the picture data is not of ideal picture quality.

On the other hand, if it is found at step S118 that there is no input position adjustment unit, the pre-set first digital picture data is rotated at step S22 by the picture calculating unit. At step S23, the pre-set first digital picture data is sliced by the picture calculating unit to generate modified first digital picture data. At step S24, the modified first digital picture data is displayed and outputted as the processing results are displayed and outputted on the display device or on the external monitor. Then, at step S25, the picture quality improving processing is executed.

If it is found at step S117 that the picture tilt has not been detected, the program directly moves to step S25 to effect the picture quality improvement processing. Then, a picture representing the results of the picture quality improvement processing on the displayed picture and the printed picture shown in FIG. 44 is displayed at step S26 as shown in FIG. 47. Next, at step S27, it is verified whether or not a command for printing will be issued.

If no command for printing is issued, it is verified whether or not the command for executing various processing operations is to be issued. That is, it is verified at step S28 whether or not the processing A is to be executed and, if such command is issued, inputting of the variable parameter on the processing A is prompted at step S29. If the variable parameter is inputted, the processing A is executed. At step S31, the picture representing the results of execution of the processing A is corrected based on the setting of the display outputting characteristics and setting of the printing characteristics as corrected by the characteristics correction unit. The resulting corrected picture is displayed on the picture display outputting unit. The displayed picture is of the visually equivalent picture quality as the printed picture. If no inputting is made despite the fact that the inputting of the variable parameter on the processing A is prompted at step S29, the program again awaits the inputting of the variable parameter.

In the absence of the command for executing the processing A at step S28, it is verified at step S32 whether or not the processing B is to be carried out. If a corresponding command is issued, the inputting of the variable parameter on the processing B is prompted at step S33. If the variable parameter is inputted, the processing B is executed at step S34. The picture from the processing B is corrected at step S35 based on the setting of the display output characteristics and on the setting of the printing characteristics as corrected by the characteristics correction unit. The corrected picture is displayed on the picture display outputting unit. The display picture is of the visually equivalent picture quality as the picture printed by the picture printing unit. If there is no inputting in case the inputting of the variable parameter on the processing B at step S33 is prompted, the program awaits the inputting of the variable parameter on the processing B.

The same holds for other processing tasks. It is finally verified at step S36 whether or not the processing X is to be executed. If such command is made, the inputting of the variable parameter concerning the processing X is prompted at step S37. If the inputting of the variable parameter is issued, the processing X is executed at step S38. At step S39, a picture representing the results of execution of the processing X is corrected based on the setting of the display output characteristics and the setting of the printing characteristics as corrected by the characteristics correction unit. The corrected picture is displayed on the picture display outputting unit. The displayed picture is of the visually equivalent picture quality as the picture printed by the picture printing unit. If there is no inputting of the variable parameter on the processing X prompted at step S37, the program awaits the inputting of the variable parameter concerning the processing X.

It is then verified whether or not a command for printing, a command for starting the processing A, a command for starting the processing B, a command for starting the processing X will be issued sequentially.

It is again verified at step S27 whether or not a command for printing of the picture data selected or processed as described above will be issued. If plural sorts of the processing are executed, the operation of returning the picture data, on which the processing A has been executed, not issuing a print command at step S27, not issuing a start command for the processing A at step S28, advancing the program to step S32 to execute the processing B directly, and returning the picture data, on which has been executed the processing B, is executed sequentially. At the time point when the totality of the processings has come to a close, the printing command is issued.

In the respective steps of the steps S27 to S39, the operation differs depending on whether it is the automatic printing or the processing of editing, working or correction that has been commanded at step S13. That is, if a command for executing automatic printing is issued at step S113, commands for executing the respective processings required at steps S28, S32 and S36 are automatically issued. Also, the setting of optimum parameters is automatically made at steps S29, S33 and S27. After the execution of the required processings, a command for printing is automatically issued at step S27. If a command is issued at step S13 for executing the processing such as editing, working or correction, the above-mentioned steps are executed on the basis of user commands instead of being executed automatically.

Figure 48:
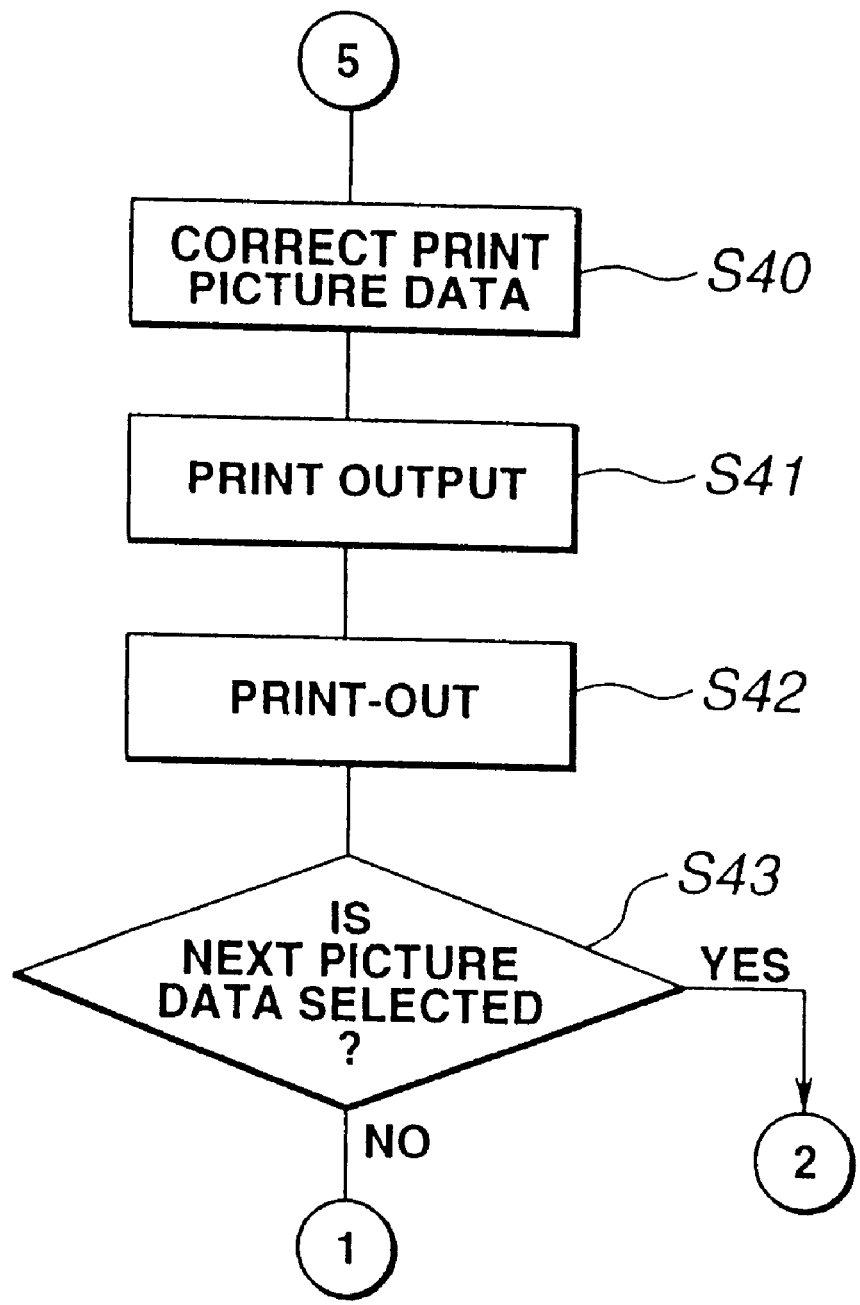
FIG. 48 is a flowchart showing yet another portion of the schematic operation in a printer device according to the present invention.

If it is found at step S27 that a command for executing the printing is issued, or a command for automatic printing is issued at step S113, picture data correction of converting or correcting the picture for printing to a preferred reproduction color is executed at step S40 of FIG. 48. Then, at steps S41 and S42, print outputting processing and printing are executed, respectively, to form a printed picture. At step S43, it is verified whether or not there is selected the picture data printed next. If it is verified that the next picture data has not been selected, the processing menu is again displayed at step S2 shown in FIG. 45 to repeat the above-mentioned respective steps. If it is verified that the next picture data has been selected, the program reverts to step S14 in FIG. 45 to repeat the processing as from the reading of the picture data in question. In the above-described embodiment, it is verified by the picture verification unit whether or not the pre-set first digital picture data is present in a specified range. If the pre-set first digital picture data is present in the specified range, the pre-set picture contents are modified to be arranged in the prescribed region without executing the processing of generating the re-arranged first digital picture data. If this processing is to be executed, it is preferably executed after a sequence of operations of correcting the picture for tilt. Thus, in the present printer device, a sequence of operations are executed easily, while the handling is facilitated. Since the operations are executed by the same processing without regard to the type of the picture inputting means, the user is not perplexed at to the operational sequence.

While the present invention has been described in reference to preferred embodiments thereof, it is understood that these embodiments are merely exemplary and that one skilled in the art can make many changes to the disclosed embodiments without departing from the spirit and scope of the invention as defined by the appended claims.

What is claimed is:

1. A printer comprising:
    a picture data inputting unit for receiving input image information and providing digital image data based thereupon:
    display outputting circuitry for outputting at least one image signal corresponding to said digital image data to a display means;
    a printing unit for printing an image corresponding to said digital image data on a recording medium; and
    a characteristics correction unit for correcting at least one of a display setting prescribing display image quality in the display means and a printing characteristics setting prescribing printing image quality in said printing unit;
    wherein said digital image data is first digital image data, and said printer further comprises:
        a picture processing unit for performing at least one of editing, working, synthesis and correction processing of said first digital image data to thereby generate processed digital image data as second digital image data; and
        said second digital picture data being outputted for display by said display means and being printed on a recording medium by said picture printing unit.

2. The printer according to claim 1 wherein said picture processing unit includes a memory for storing application software for image data processing, said software being executed by said picture processing unit to perform said processing of said first digital image data.

3. The printer according to claim 2 wherein said application software is stored in said memory in a manner capable of being varied, so as to vary at least one of said editing, working, synthesis and correction processing operations carried out in said picture processing unit.

4. The printer according to claim 1 further comprising:
    an image correction unit for correcting at least one of said first digital image data and said second digital image data, said image correction unit correcting at least one data value of said first digital image data and/or at least one data value of said second digital image data to generate third digital image data;
    said third digital picture data being also displayed and outputted to said display means and/or printed by said picture printing unit on the recording medium.

5. The printer according to claim 1 further comprising command input means for inputting an external command.

6. The printer according to claim 1, wherein said display means includes a display integrated with said printer, and at least said picture data inputting unit, said display, said printing unit and said characteristics correction unit are integrated together in a main body unit.

7. The printer according to claim 6 wherein said command input means is integrated with said main body unit.

8. The printer according to claim 6 wherein said picture data inputting unit includes at least one of an analog image signal inputting means and a digital image data inputting means unitary with the main body unit.

9. The printer according to claim 8 wherein said analog image signal inputting means is a scanner having at least one of an analog image signal input port and a photoelectric converting element.

10. The printer according to claim 8 wherein said digital image data inputting means is at least one of a digital image data port, a disc drive and a memory drive.

11. The printer according to claim 1, wherein said picture processing unit has plural image data calculating units for editing, working, synthesizing or correcting the first digital image data.

12. The printer according to claim 11 wherein:
the plural image data calculating units effect the same processing;
each of the image data calculating units is adapted to correspond to a respective pre-set range of the first digital image data; and
each of the image data calculating units performs the same processing on each pre-set range of the first digital image data associated therewith.

13. The printer according to claim 12 wherein the pre-set range corresponds to at least one row or at least one column of the first digital image data.

14. The printer according to claim 12 wherein the pre-set range corresponds to a block of the first digital image data.

15. The printer according to claim 12 wherein the pre-set range is specified by image contents of the first digital image data.

16. The printer according to claim 8 wherein the plural image data calculating units effect different processing;
each of the image data calculating units is adapted to correspond to a respective pre-set range of the first digital image data; and
the image data calculating units perform different processing on the respective pre-set ranges of the first digital image data associated therewith.

17. The printer according to claim 16 wherein the pre-set range corresponds to at least one row or at least one column of the first digital image data.

18. The printer according to claim 16 wherein the pre-set range corresponds to a block of the first digital image data.

19. The printer according to claim 16 wherein the pre-set range is specified by image contents of the first digital image data.

20. The printer according to claim 11 wherein each of the image data calculating units performs sequentially different processing on the first digital image data globally.

21. The printer according to claim 11 wherein the picture processing unit has an image data transfer unit for inputting/outputting data of the first digital image data in a pre-set sequence to or from plural image data calculating units.

22. The printer according to claim 11 wherein the image processing unit has a controller for controlling each image data calculating unit.

23. The printer according to claim 22 wherein the controller controls the image data calculating units as a single unit.

24. The printer according to claim 23 wherein the controller is provided for each of the image data calculating units and individually controls the image data calculating units.

25. The printer according to claim 1 further comprising:
inputting means for inputting an external command;
a program data inputting unit for inputting a program file and/or parameter data; and
a non-volatile memory for storing and holding the program file and/or the parameter data;
at least one of the printing properties correcting unit, the image processing unit and the inputting means being controlled based on the program file and/or the parameter data inputted from the program data inputting unit or stored in the non-volatile memory.

26. The printer according to claim 25 wherein the program data inputting unit is provided in the picture data inputting unit.

27. The printer according to claim 26 wherein the program data inputting unit has a plurality of image inputting means, and conversion of the input image information into first digital image data and inputting of the program file and/or the parameter data being effected by the same image inputting means.

28. The printer according to claim 27 wherein the program data inputting unit has a plurality of image inputting means, and conversion of the input image information into first digital image data and inputting of the program file and/or the parameter data being effected by different ones of said plurality of image inputting means.

29. The printer according to claim 25 wherein at least one of the program files and the parameter data is inputted from the program data inputting unit and stored in the non-volatile memory, whereby updating, rewriting or addition is effected in the controlling method for at least one of the characteristics correction unit, the picture processing unit and the inputting means.

30. The printer according to claim 25 wherein the program data inputting unit comprises a program loading unit having a control program which is invariable.

31. The printer according to claim 25 wherein the program data inputting unit comprises a program loading unit having a control program, a changing priority sequence of the control program of the program loading unit is lower than the change sequence of the program file and/or the parameter data.

32. The printer according to claim 25 wherein program file and the parameter data have the common format, each of them is given a code for identification, respectively.

33. The printer according to claim 25 wherein, in controlling the characteristics correction unit and/or image processing unit and/or inputting means based on the program file and/or the parameter data inputted from the program data inputting unit or stored and held in the non-volatile memory, the starting method and the terminating method of the program file and the accessing information and are unified and/or the parameter data description form are unified.

34. The printer according to claim 11, further comprising:
i) an image verifying unit for verifying the image contents of the first digital image data by extracting and checking a predetermined image component which is at least one of a vertical image component and a horizontal image component,
the vertical image component is approximately in the vertical direction relative to an image frame of the first digital image data;
the horizontal image component is approximately in the horizontal direction relative to the image frame of the first digital image data; and
verifying an angle between at least one of these extracted image components and the vertical direction or the horizontal direction of the image frame,
ii) an input position adjustment unit for generating the first digital image data in the program data inputting unit by rotating and moving inputting position of analog image signals on the basis of the verified angle.

35. The printer according to claim 34 wherein the predetermined one of the image components is the horizontal image component.

36. The printer according to claim 11, further comprising:
an image verifying unit for verifying the image contents of the first digital image data by extracting and checking a predetermined image component which is at least one of a vertical image component and a horizontal image component,
the vertical image component is approximately in the vertical direction relative to an image frame of the first digital image data,
the horizontal image component is approximately in the horizontal direction relative to the image frame of the first digital image data, and
verifying an angle between at least one of these extracted image components and the vertical direction or the horizontal direction of the image frame; and
the image data calculating unit generating an adjusted first digital image data in the program data inputting unit by rotating and moving the first digital image data on the basis of the verified angle.

37. The printer according to claim 36 wherein the predetermined one of the image components is the horizontal image component.

38. The printer according to claim 34 wherein the input position adjustment unit generates the first digital image data in the program data inputting unit by moving an inputting position of analog image signals parallel to the vertical or horizontal direction relative to the image frame on the basis of the verified angle.

39. The printer according to claim 36 wherein the image data calculating unit generates the adjusted first digital image data by controlling the image contents of a sliced pre-set portion of the first digital image data on the basis of the verified angle.

40. The printer according to claim 11 further comprising:
an image verifying unit for verifying whether pre-set image contents of pre-set first digital image data being provided in a specified range of said first digital image data or not; and
an image re-arranging unit for generating re-arranged the pre-set first digital image data by controlling the pre-set image contents provided in the specified range so as to be comprised within a prescribed region.

41. The printer according to claim 40 wherein the controlling method includes at least one of a processing of slicing a portion of the pre-set first digital image data, a processing of enlarging the pre-set first digital image data and a processing of deforming the pre-set first digital image data.

42. The printing system according to claim 40 wherein the pre-set image contents have an area, the image verifying unit for verifying whether a center of gravity of the pre-set image contents of preset first digital image data being provided in a specified range of said first digital image data or not, and
the image re-arranging unit for generating re-arranged the pre-set first digital image data by controlling the center of gravity of the pre-set image contents provided in the specified range so as to be comprised within the prescribed region.

43. The printing system according to claim 40 further comprising a line segment AB interconnecting both ends of a specified direction in the pre-set image contents in the re-arranged first digital image data; a point G on the line segment AB being presupposed; the point G is presupposed so that the length ratio of the line segment AB to a line segment AG or a line segment BG, whichever is longer, to be equal to the length ratio of the longer line segment of AG or BG to the shorter line segment of AG or BG; and the image re-arranging unit controlling the pre-set image contents of the pre-set first digital image data for so as to be provided in the prescribed region having the point G.

44. The printer according to claim 43 wherein the line segment AB is divided by the point G by golden section.

45. The printer according to claim 43 wherein the ratio of the line segment AB to the line segment AG or BG approximately equal to 8:5.

46. The printer according to claim 43 wherein the pre-set first digital image data is of a quadrangle and at least one of the vertical direction, horizontal direction and the diagonal direction is selected as the specified direction of the line segment AB.

* * * * *